United States Patent
Fukui et al.

(10) Patent No.: US 7,638,194 B2
(45) Date of Patent: Dec. 29, 2009

(54) DEVELOPER CARRYING MEMBER, AND DEVELOPING ASSEMBLY

(75) Inventors: Tatsuki Fukui, Yokohama (JP); Tetsuya Yano, Atsugi (JP); Takashi Kenmoku, Fujisawa (JP); Chieko Mihara, Isehara (JP); Ako Kusakari, Atsugi (JP); Norikazu Fujimoto, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 753 days.

(21) Appl. No.: 11/165,358

(22) Filed: Jun. 24, 2005

(65) Prior Publication Data

US 2006/0035098 A1 Feb. 16, 2006

(30) Foreign Application Priority Data

Jun. 25, 2004 (JP) ............................. 2004-188892

(51) Int. Cl.
*B32B 15/00* (2006.01)
(52) U.S. Cl. .................... 428/375; 428/446; 428/474.4; 428/500; 399/239; 399/279; 399/288
(58) Field of Classification Search ................. 428/375, 428/446, 474.4, 500; 399/239, 279, 288
See application file for complete search history.

(56) References Cited

U.S. PATENT DOCUMENTS

| 4,020,192 | A | * | 4/1977 | Nozaki ..................... 430/111.1 |
| 5,434,653 | A | * | 7/1995 | Takizawa et al. ............ 399/284 |
| 7,399,568 | B2 | * | 7/2008 | Fukui et al. ............ 430/111.35 |
| 2003/0162018 | A1 | * | 8/2003 | Saito et al. .................. 428/364 |
| 2005/0287463 | A1 | | 12/2005 | Fukui et al. ............ 430/111.35 |

FOREIGN PATENT DOCUMENTS

| JP | 01-277256 | 11/1989 |
| JP | 02-304468 | 12/1990 |
| JP | 2002/351147 | 12/2002 |
| WO | WO 2004/061530 A1 * | 7/2004 |

OTHER PUBLICATIONS

Padmapriya, A.A., et al.; "A New Method for the Esterification of Sulphonic Acids"; Synthetic Communications, vol. 15, No. 12, 1057-1062 (1985).
Toppet, S., et al.; "Influence of the Reaction Medium on the Composition and the Micro-structure of Styrene-Acrylic Acid Copolymers"; J. Polym. Sci., vol. 13, 1879-1887 (1975).
Mulvaney, J.E., et al.; "Water-Soluble Copolymers Containing N-Vinylcarbazole"; J. Polym. Sci., vol. 15, 585-591 (1977).

* cited by examiner

*Primary Examiner*—Betelhem Shewareged
(74) *Attorney, Agent, or Firm*—Fitzpatrick, Cella, Harper & Scinto

(57) ABSTRACT

A developer carrying member is disclosed which can prevent a toner from being excessively charged in a developing assembly while keeping the charge quantity of the toner at a somewhat higher level, and seldomly causes toner melt adhesion to the developer carrying member. The developer carrying member contains a polymer having a unit represented by the chemical formula (1):

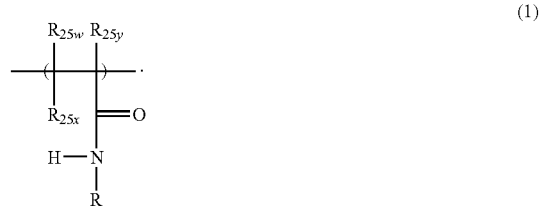

(1)

7 Claims, 1 Drawing Sheet

FIGURE
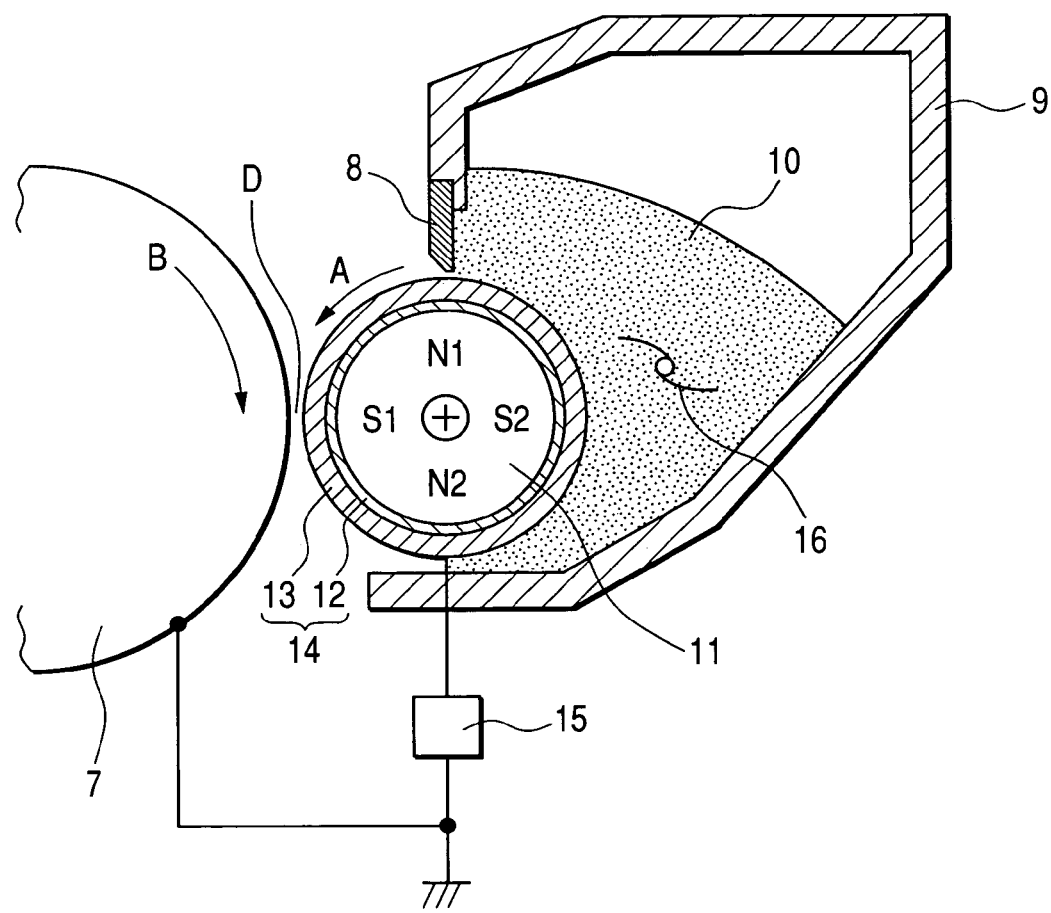

DEVELOPER CARRYING MEMBER, AND DEVELOPING ASSEMBLY

BACKGROUND OF THE INVENTION

1. Field of the Invention

This invention relates to a developing assembly, and a developer carrying member, by means of which a latent image formed on an electrostatic latent image bearing member by electrophotography, electrostatic recording, magnetic recording or the like is developed by the use of a developer to render it visible.

2. Related Background Art

Polymers having a hydrophilic group such as a sulfonic acid group are expected to be applicable to various uses.

The synthesis of such polymers having a sulfonic acid group is commonly limited to what uses specific vinyl monomers containing a sulfonic acid functional group. Specific examples of such monomers may include sulfonated styrenes, or AMPS (2-acrylamido-2-methylpropanesulfonic acid). These are disclosed in, e.g., Japanese Patent Application Laid-open No. 2002-351147.

As for developing assemblies by means of which electrostatic latent images formed on the surface of a photosensitive drum serving as the electrostatic latent image bearing member are rendered visible by the use of a toner, which is a one-component developer, there are conventionally those utilizing a system in which the mutual friction between toner particles themselves, the friction between a developing sleeve as the developer carrying member and the toner particles and the friction between a member which controls the toner coat level on the developing sleeve (a developer layer thickness control member) and the toner particles are utilized to provide the toner particles with positive or negative electric charges, the toner thus charged is applied very thin on the developing sleeve and then transported to a developing zone, and, in this developing zone, the toner is attracted and adheres to electrostatic latent images on the surface of the photosensitive drum to render the electrostatic latent images on the photosensitive drum visible as toner images.

In such conventional developing assemblies described above, developer carrying members are used which are obtained by molding a metal, an alloy or a metal compound into a cylinder and treating its surface by electrolysis, blasting, filing or the like so as to have a stated surface roughness. Meanwhile, in recent years, toners are desired to have a small particle diameter in order to fix developers at low temperature as required for energy saving and to achieve the formation of high definition images. In such toners having small particle diameter, the toner has such a large surface area per unit weight as to tend to have great surface electric charges, and may cling to the developer carrying member because of what is called a charge-up phenomenon, so that the developer having come to be newly fed onto the developer carrying member may be charged with difficulty and the developer is apt to have non-uniform charge quantity.

To cope with this problem, as disclosed in Japanese Patent Application Laid-open No. H01-277256, a method is proposed in which, in order to prevent the developer from having such excess electric charges or prevent the developer from adhering strongly to the developer carrying member, a film or coating (a resin layer) composed of a resin composition obtained by dispersing in a resin a powder of a conductive substance such as carbon or graphite or of a solid lubricant is formed on the developer carrying member. In Japanese Patent Application Laid-open No. H02-304468, a developing sleeve is proposed which has a metallic substrate and provided thereon a conductive resin layer comprising a resin coating layer in which a solid lubricant, a conductive fine powder such as carbon and spherical particles have been dispersed. Also, in Japanese Patent Application Laid-open No. H08-240981, a developing sleeve having a surface layer is proposed in which spherical particles are dispersed in a conductive coat layer so that wear resistance can be improved and the shape of the developing sleeve surface can be made stable, and also so that the charging of the toner can be improved, and the developing sleeve can be kept from being contaminated by the toner or from toner melt adhesion even where the conductive coat layer resin layer has somewhat worn.

These proposals, however, have not been sufficiently effective in overcoming the problems.

SUMMARY OF THE INVENTION

Accordingly, an object of the present invention is to provide a developer carrying member which can prevent the toner from being excessively charged in a developing assembly while keeping the charge quantity of the toner at a somewhat highed level, or seldomly causes the toner melt adhesion to the developer carrying member, and to provide a developing assembly having such a developer carrying member.

Another object of the present invention is to provide a developer carrying member which can keep the toner from being non-uniformly charged on the developer carrying member surface especially when toners having a small particle diameter are used, and can give the toner a proper charge quantity, and provide a developing assembly having such a developer carrying member.

The present invention is directed to a developer carrying member used in a developing assembly by means of which a latent image formed on an electrostatic latent image bearing member is developed and rendered visible by the use of a developer having been transported by a developer carrying member, the developer carrying member having at least a substrate and a resin layer formed on the substrate;

the resin layer comprising a binder resin which contains at least a polymer having a unit represented by the chemical formula (1).

In the formula, R represents $-A_{25}-SO_2R_{25}$, and $R_{25w}$, $R_{25x}$ and $R_{25y}$ are each selected from combinations recited in the following (i) or (ii), where, in the case of (i), $A_{25}$ and $R_{25}$ are each selected from combinations recited in the following (i-A) or (i-B), and, in the case of (ii), $A_{25}$ and $R_{25}$ are each selected from combinations recited in the following (ii-A):

(i) $R_{25w}$ and $R_{25x}$ are each independently a hydrogen atom, and $R_{25y}$ is a $CH_3$ group or a hydrogen atom;

(i-A) $A_{25}$ is a substituted or unsubstituted aliphatic hydrocarbon structure; and $R_{25}$ is a halogen atom or $OR_{25a}$, where $R_{25a}$ is a substituted or unsubstituted aliphatic hydrocarbon structure, a substituted or unsubstituted aromatic ring structure, or a substituted or unsubstituted heterocyclic ring structure;

(i-B) $A_{25}$ is a substituted or unsubstituted aromatic ring structure, or a substituted or unsubstituted heterocyclic ring structure; and $R_{25}$ is OH, a halogen atom, ONa, OK or $OR_{25a}$, where $R_{25a}$ is a substituted or unsubstituted aliphatic hydrocarbon structure, a substituted or unsubstituted aromatic ring structure, or a substituted or unsubstituted heterocyclic ring structure;

(ii) $R_{25w}$ and $R_{25x}$ are each independently a halogen atom or a hydrogen atom, and $R_{25y}$ is a $CH_3$ group, a halogen atom or a hydrogen atom, provided that at least one of $R_{25w}$, $R_{25x}$ and $R_{25y}$ is a halogen atom; and (ii-A) $A_{25}$ is a substituted or unsubstituted aliphatic hydrocarbon structure, a substituted or unsubstituted aromatic ring structure, or a substituted or unsubstituted heterocyclic ring structure; and $R_{25}$ is OH, a halogen atom, ONa, OK or $OR_{25a}$, where $R_{25a}$ is a substituted or unsubstituted aliphatic hydrocarbon structure, a substituted or unsubstituted aromatic ring structure, or a substituted or unsubstituted heterocyclic ring structure.

The present invention is also directed to a developing assembly in which a developer held in a developer container is held on a developer carrying member and a thin layer of the developer is formed on the developer carrying member by the aid of a developer layer thickness control member, during which the developer is transported to a developing zone which faces a latent image bearing member, and, in the developing zone, a latent image formed on the latent image bearing member is developed by the use of the developer so as to be made into a visible image, wherein;

the developer carrying member has at least a substrate and a resin layer formed on the substrate, and the resin layer comprises a binder resin which contains at least a polymer having a unit represented by the chemical formula (1).

(1)

In the formula, R represents $-A_{25}-SO_2R_{25}$, and $R_{25w}$, $R_{25x}$ and $R_{25y}$ are each selected from combination recited in the following (i) or (ii), where, in the case of (i), $A_{25}$ and $R_{25}$ are each selected from combination recited in the following (i-A) or (i-B), and, in the case of (ii), $A_{25}$ and $R_{25}$ are each selected from combination recited in the following (ii-A):

(i) $R_{25w}$ and $R_{25x}$ are each independently a hydrogen atom, and $R_{25y}$ is a $CH_3$ group or a hydrogen atom;

(i-A) $A_{25}$ is a substituted or unsubstituted aliphatic hydrocarbon structure; and $R_{25}$ is a halogen atom or $OR_{25a}$, where $R_{25a}$ is a substituted or unsubstituted aliphatic hydrocarbon structure, a substituted or unsubstituted aromatic ring structure, or a substituted or unsubstituted heterocyclic ring structure;

(i-B) $A_{25}$ is a substituted or unsubstituted aromatic ring structure, or a substituted or unsubstituted heterocyclic ring structure; and $R_{25}$ is OH, a halogen atom, ONa, OK or $OR_{25a}$, where $R_{25a}$ is a substituted or unsubstituted aliphatic hydrocarbon structure, a substituted or unsubstituted aromatic ring structure, or a substituted or unsubstituted heterocyclic ring structure;

(ii) $R_{25w}$ and $R_{25x}$ are each independently a halogen atom or a hydrogen atom, and $R_{25y}$ is a $CH_3$ group, a halogen atom or a hydrogen atom, provided that at least one of $R_{25w}$, $R_{25x}$ and $R_{25y}$ is a halogen atom; and (ii-A) $A_{25}$ is a substituted or unsubstituted aliphatic hydrocarbon structure, a substituted or unsubstituted aromatic ring structure, or a substituted or unsubstituted heterocyclic ring structure; and $R_{25}$ is OH, a halogen atom, ONa, OK or $OR_{25a}$, where $R_{25a}$ is a substituted or unsubstituted aliphatic hydrocarbon structure, a substituted or unsubstituted aromatic ring structure, or a substituted or unsubstituted heterocyclic ring structure.

According to the present invention, a developer carrying member is provided which has been improved in running (extensive operation) performance and can keep a state in which good images can be provided over a long period of time. Further, according to the present invention, a highly durable developer carrying member is provided in which its positive-charge-providing performance can be made stable and the developer layer on the developer carrying member can be made uniform.

BRIEF DESCRIPTION OF THE DRAWING

FIGURE is a sectional view showing an example of a developing assembly making use of the developer carrying member of the present invention.

DESCRIPTION OF THE PREFERRED EMBODIMENTS

At least the polymer having the unit represented by the chemical formula (1) shown previously is used as a polymer which constitutes the resin layer of the developer carrying member according to the present invention. As a more preferred form of the unit of the chemical formula (1), a unit represented by the following chemical formula (2) may be cited.

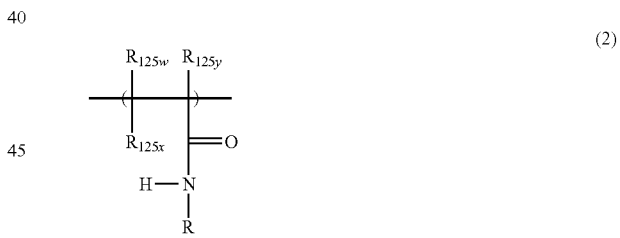

(2)

In the formula, R represents $-A_{125}-SO_2R_{125}$, and $R_{125w}$, $R_{125x}$ and $R_{125y}$ are each selected from combinations recited in the following (i) or (ii), where, in the case of (i), $A_{125}$ and $R_{125}$ are each selected from combinations recited in the following (i-A), and, in the case of (ii), $A_{125}$ and $R_{125}$ are each selected from combinations recited in the following (ii-A):

(i) $R_{125w}$ and $R_{125x}$ are each independently a hydrogen atom, and $R_{125y}$ is a $CH_3$ group or a hydrogen atom;

(i-A) $A_{125}$ is a straight-chain or branched alkylene group having 1 to 8 carbon atoms; and $R_{125}$ is a halogen atom or $OR_{125a}$, where $R_{125a}$ is a straight-chain or branched alkyl group having 1 to 8 carbon atoms or a substituted or unsubstituted phenyl group;

(ii) $R_{125w}$ and $R_{125x}$ are each independently a halogen atom or a hydrogen atom, and $R_{125y}$ is a $CH_3$ group, a halogen atom or a hydrogen atom, provided that at least one of $R_{125w}$, $R_{125x}$ and $R_{125y}$ is a halogen atom; and (ii-A) $A_{125}$ is a straight-chain or branched alkylene group having 1 to 8 carbon atoms; and $R_{125}$ is OH, a halogen atom, ONa, OK or $OR_{125a}$, where $R_{125a}$ is a straight-chain or branched alkyl group having 1 to 8 carbon atoms or a substituted or unsubstituted phenyl group.

As a further preferred unit, a unit represented by the following chemical formula (3) may be cited.

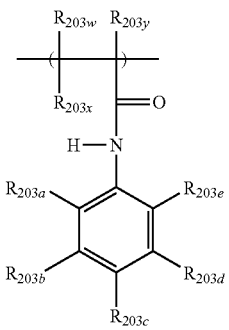

(3)

In the formula, $R_{203w}$ and $R_{203x}$ are each independently a halogen atom or a hydrogen atom; $R_{203y}$ is a $CH_3$ group, a halogen atom or a hydrogen atom; and at least one of $R_{203a}$, $R_{203b}$, $R_{203c}$, $R_{203d}$ and $R_{203e}$ is $SO_2R_{203f}$, where $R_{203f}$ is OH, a halogen atom, ONa, OK or $OR_{203h}$, where $R_{203h}$ is a straight-chain or branched alkyl group having 1 to 8 carbon atoms or a substituted or unsubstituted phenyl group, and $R_{203a}$, $R_{203b}$, $R_{203c}$, $R_{203d}$ and $R_{203e}$ are each independently a hydrogen atom, a halogen atom, an alkyl group having 1 to 20 carbon atoms, an alkoxyl group having 1 to 20 carbon atoms, an OH group, an $NH_2$ group, an $NO_2$ group or $COOR_{203g}$ (where $R_{203g}$ represents a hydrogen atom, an Na atom or a K atom), an acetamide group, an OPh group, an NHPh group, a $CF_3$ group, a $C_2F_5$ group or a $C_3F_7$ group, where Ph is a phenyl group.

As a still further preferred form of the present invention, the unit represented by the above chemical formula (1) is a unit represented by the chemical formula (4a) or (4b).

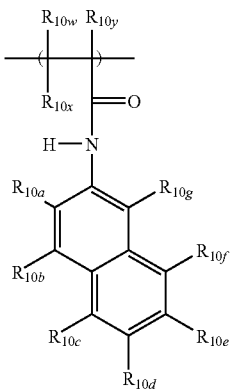

(4a)

In the formula, $R_{10w}$ and $R_{10x}$ are each independently a halogen atom or a hydrogen atom; $R_{10y}$ is a $CH_3$ group, a halogen atom or a hydrogen atom; and at least one of $R_{10a}$, $R_{10b}$, $R_{10c}$, $R_{10d}$, $R_{10e}$, $R_{10f}$ and $R_{10g}$ is $SO_2R_{10o}$, where $R_{10o}$ is OH, a halogen atom, ONa, OK or $OR_{10s}$, where $R_{10s}$ is a straight-chain or branched alkyl group having 1 to 8 carbon atoms or a substituted or unsubstituted phenyl group, and $R_{10a}$, $R_{10b}$, $R_{10c}$, $R_{10d}$, $R_{10e}$, $R_{10f}$ and $R_{10g}$ are each independently a hydrogen atom, a halogen atom, an alkyl group having 1 to 20 carbon atoms, an alkoxyl group having 1 to 20 carbon atoms, an OH group, an $NH_2$ group, an $NO_2$ group or $COOR_{10p}$ (where $R_{10p}$ represents a hydrogen atom, an Na atom or a K atom), an acetamide group, an OPh group, an NHPh group, a $CF_3$ group, a $C_2F_5$ group or a $C_3F_7$ group, where Ph is a phenyl group.

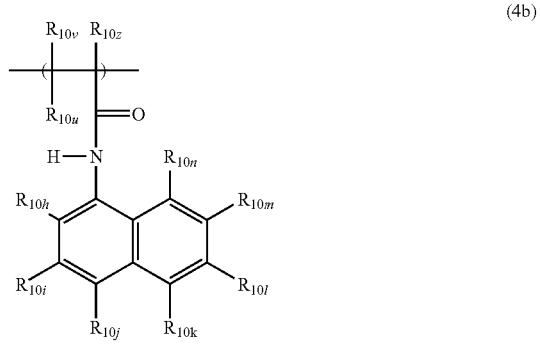

(4b)

In the formula, $R_{10v}$ and $R_{10u}$ are each independently a halogen atom or a hydrogen atom; $R_{10z}$ is a $CH_3$ group, a halogen atom or a hydrogen atom; and at least one of $R_{10h}$, $R_{10i}$, $R_{10j}$, $R_{10k}$, $R_{10l}$, $R_{10m}$ and $R_{10n}$ is $SO_2R_{10q}$, where $R_{10q}$ is OH, a halogen atom, ONa, OK or $OR_{10t}$, where $R_{10t}$ is a straight-chain or branched alkyl group having 1 to 8 carbon atoms or a substituted or unsubstituted phenyl group, and $R_{10h}$, $R_{10i}$, $R_{10j}$, $R_{10k}$, $R_{10l}$, $R_{10m}$ and $R_{10n}$ are each independently a hydrogen atom, a halogen atom, an alkyl group having 1 to 20 carbon atoms, an alkoxyl group having 1 to 20 carbon atoms, an OH group, an $NH_2$ group, an $NO_2$ group or $COOR_{10r}$ (where $R_{10r}$ represents a hydrogen atom, an Na atom or a K atom), an acetamide group, an OPh group, an NHPh group, a $CF_3$ group, a $C_2F_5$ group or a $C_3F_7$ group, where Ph is a phenyl group.

In addition to the unit represented by the above chemical formula (1), the polymer may also contain at least one unit derived from a vinyl monomer, represented by the chemical formula (5).

(5)

In the formula, $R_{108w}$ and $R_{108x}$ are each independently a halogen atom or a hydrogen atom; $R_{108y}$ is a $CH_3$ group, a halogen atom or a hydrogen atom; and $R_{108}$ is a hydrogen atom, a substituted or unsubstituted aliphatic hydrocarbon structure, a substituted or unsubstituted aromatic ring structure, a substituted or unsubstituted heterocyclic ring structure, a halogen atom, $-COR_{108a}$, $-OR_{108b}$, $-COOR_{108c}$, $-OCOR_{108d}$, $-CONR_{108e}R_{108f}$ or a ring structure containing an N atom, where $R_{108a}$, $R_{108b}$, $R_{108c}$, $R_{108d}$, $R_{108e}$ and $R_{108f}$ are each independently a hydrogen atom, a substituted or unsubstituted aliphatic hydrocarbon structure, a substituted or unsubstituted aromatic ring structure, or a substituted or unsubstituted heterocyclic ring structure.

In a more preferred form, the above polymer may have a number-average molecular weight in the range of from 1,000 to 1,000,000. In a still more preferred form, the above resin layer may be a conductive resin layer containing a conductive fine powder and/or a solid lubricant. In particular, it is preferable that particles having a number-average particle diameter of 0.3 μm to 30 μm are further contained in the conductive resin layer in order to form unevenness on the resin layer surface. It is also preferable that the particles for forming unevenness on the resin layer surface have a spherical shape and a true density of 3 g/cm³ or less, and further that the particles for forming unevenness on the resin layer surface are conductive spherical particles. A form is also preferable in which the binder resin used in the conductive resin layer is further incorporated with a resin which is any of a silicone resin, a styrene resin and an acrylic resin.

The present invention is described below in detail by giving preferred embodiments. The present inventors have made extensive studies on the above problems the related background art has had. As a result, they have discovered that the binder resin in the resin layer formed on the developer carrying member surface may be incorporated with at least the polymer having a unit represented by the chemical formula (1):

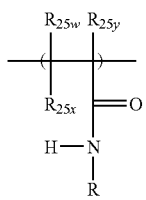

(1)

wherein R represents -$A_{25}$-$SO_2R_{25}$, and $R_{25w}$, $R_{25x}$ and $R_{25y}$ are each selected from combination recited in the following (i) or (ii), where, in the case of (i), $A_{25}$ and $R_{25}$ are each selected from combination recited in the following (i-A) or (i-B), and, in the case of (ii), $A_{25}$ and $R_{25}$ are each selected from combination recited in the following (ii-A):

(i) $R_{25w}$ and $R_{25x}$ are each independently a hydrogen atom, and $R_{25y}$ is a $CH_3$ group or a hydrogen atom;

(i-A) $A_{25}$ is a substituted or unsubstituted aliphatic hydrocarbon structure; and $R_{25}$ is a halogen atom or $OR_{25a}$, where $R_{25a}$ is a substituted or unsubstituted aliphatic hydrocarbon structure, a substituted or unsubstituted aromatic ring structure, or a substituted or unsubstituted heterocyclic ring structure;

(i-B) $A_{25}$ is a substituted or unsubstituted aromatic ring structure, or a substituted or unsubstituted heterocyclic ring structure; and $R_{25}$ is OH, a halogen atom, ONa, OK or $OR_{25a}$, where $R_{25a}$ is a substituted or unsubstituted aliphatic hydrocarbon structure, a substituted or unsubstituted aromatic ring structure, or a substituted or unsubstituted heterocyclic ring structure;

(ii) $R_{25w}$ and $R_{25x}$ are each independently a halogen atom or a hydrogen atom, and $R_{25y}$ is a $CH_3$ group, a halogen atom or a hydrogen atom, provided that at least one of $R_{25w}$, $R_{25x}$ and $R_{25y}$ is a halogen atom; and (ii-A) $A_{25}$ is a substituted or unsubstituted aliphatic hydrocarbon structure, a substituted or unsubstituted aromatic ring structure, or a substituted or unsubstituted heterocyclic ring structure; and $R_{25}$ is OH, a halogen atom, ONa, OK or $OR_{25a}$, where $R_{25a}$ is a substituted or unsubstituted aliphatic hydrocarbon structure, a substituted or unsubstituted aromatic ring structure, or a substituted or unsubstituted heterocyclic ring structure;

thereby making it possible to obtain a developer carrying member which can quickly charge the developer and keep it charged at a somewhat higher level, and nevertheless seldomly causes developing sleeve contamination due to the toner, and can achieve a high charge quantity even in a high humidity environment and is free of excess charging even in a low humidity environment.

Production Process (A) for the Polymer Having the Unit Represented by the Chemical Formula (1):

For example, the polymer having the unit represented by the chemical formula (1) may be produced by the reaction of a polymer having a unit represented by the chemical formula (6) with at least one compound represented by the chemical formula (7), which are used as starting materials.

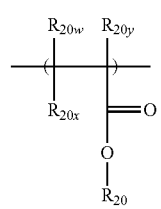

(6)

In the formula, $R_{20w}$ and $R_{20x}$ are each independently a halogen atom or a hydrogen atom; $R_{20y}$ is a $CH_3$ group, a halogen atom or a hydrogen atom; and $R_{20}$ is a hydrogen atom, an Na atom or a K atom. Where a plurality of units are present, $R_{20}$, $R_{20w}$, $R_{20x}$ and $R_{20y}$ are each as defined above, for each unit.

$$H_2N\text{-}A_{21}\text{-}SO_2R_{21} \quad (7)$$

In the formula, $R_{21}$ is OH, a halogen atom, ONa, OK or $OR_{21a}$; and $A_{21}$ and $R_{21a}$ are each independently a substituted or unsubstituted aliphatic hydrocarbon structure, a substituted or unsubstituted aromatic ring structure, or a substituted or unsubstituted heterocyclic ring structure.

Production Process for the Polymer Containing the Unit Represented by the Chemical Formula (6):

The polymer containing the unit having a carboxyl group, represented by the chemical formula (6), may readily be produced by using a known polymerization process and by polymeric reaction, as a copolymer having the unit represented by the chemical formula (6) and a vinyl monomer unit represented by the chemical formula (5).

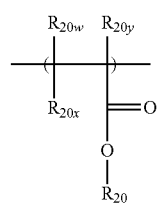

(6)

In the formula, $R_{20w}$ and $R_{20x}$ are each independently a halogen atom or a hydrogen atom; $R_{20y}$ is a $CH_3$ group, a halogen atom or a hydrogen atom; and $R_{20}$ is a hydrogen atom, an Na atom or a K atom. Where a plurality of units are present, $R_{20}$, $R_{20w}$ and $R_{20x}$ and $R_{20y}$ are each as defined above, for each unit.

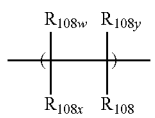

(5)

In the formula, $R_{108w}$ and $R_{108x}$ are each independently a halogen atom or a hydrogen atom; $R_{108y}$ is a $CH_3$ group, a halogen atom or a hydrogen atom; and $R_{108}$ is a hydrogen atom, a substituted or unsubstituted aliphatic hydrocarbon structure, a substituted or unsubstituted aromatic ring structure, a substituted or unsubstituted heterocyclic ring structure, a halogen atom, —$COR_{108a}$, —$OR_{108b}$, —$COOR_{108c}$, —$OCOR_{108d}$, —$CONR_{108e}R_{108f}$ or a ring structure containing an N atom, where $R_{108a}$, $R_{108b}$, $R_{108c}$, $R_{108d}$, $R_{108e}$ and $R_{108f}$ are each independently a hydrogen atom, a substituted or unsubstituted aliphatic hydrocarbon structure, a substituted or unsubstituted aromatic ring structure, or a substituted or unsubstituted heterocyclic ring structure.

Vinyl monomers for introducing the unit represented by the chemical formula (5) may include styrene, and styrene derivatives such as o-methylstyrene, m-methylstyrene, p-methylstyrene, p-methoxystyrene, p-phenylstyrene, p-chlorostyrene, 3,4-dichlorostyrene, p-ethylstyreneе, 2,4-dimethylstyrene, p-n-butylstyrene, p-tert-butylstyrene, p-n-hexylstyrene, p-n-octylstyrene, p-n-nonylstyrene, p-n-decylstyrene and p-n-dodecylstyrene; ethylene unsaturated monoolefins such as ethylene, propylene, butylene and isobutylene; vinyl halides such as vinyl chloride, vinylidene chloride, vinyl bromide and vinyl fluoride; vinyl esters such as vinyl acetate, vinyl propionate and vinyl benzoate; α-methylene aliphatic monocarboxylates such as methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate and diethylaminoethyl methacrylate; acrylic esters such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate and phenyl acrylate; vinyl ethers such as methyl vinyl ether, ethyl vinyl ether and isobutyl vinyl ether; vinyl ketones such as methyl vinyl ketone, hexyl vinyl ketone and methyl isopropenyl ketone; N-vinyl compounds such as N-vinylpyrrole, N-vinylcarbazole, N-vinylindole and N-vinylpyrrolidone; vinylnaphthalenes; and acrylic acid or methacrylic acid derivatives such as acrylonitrile, methacrylonitrile and acrylamide. One or two or more of the above may be appropriately selected and used as occasion.

As an example of the polymer having the unit having a carboxyl group, represented by the chemical formula (6), a homopolymer of a methacrylate or acrylate may partially be hydrolyzed to produce a methacrylate/acrylate copolymer or an acrylate/acrylic acid copolymer, having carboxyl groups.

A copolymer having a carboxyl group may also readily be obtained by synthesizing a copolymer of another polymerizable monomer and an acrylate or methacrylate, followed by de-esterification as in the above.

Besides the foregoing, acrylic acid or methacrylic acid may be polymerized with other polymerizable monomers to obtain a copolymer having a carboxyl group.

Compound Represented by the Chemical Formula (7):

As the compound represented by the chemical formula (7), used in the present invention, the following compound may be cited.

$$H_2N\text{-}A_{21}\text{-}SO_2R_{21} \qquad (7)$$

In the formula, $R_{21}$ is OH, a halogen atom, ONa, OK or $OR_{21a}$; and $A_{21}$ and $R_{21a}$ are each independently a substituted or unsubstituted aliphatic hydrocarbon structure, a substituted or unsubstituted aromatic ring structure, or a substituted or unsubstituted heterocyclic ring structure. More specifically, $A_{21}$ represents a straight-chain or branched alkylene group having 1 to 8 carbon atoms, a substituted or unsubstituted phenyl group, a substituted or unsubstituted naphthyl group, or a substituted or unsubstituted heterocyclic ring structure containing any one or more of N, S and O. Where $A_{21}$ is a ring structure, an unsubstituted ring may further be condensed.

The compound wherein $A_{21}$ is a straight-chain or branched alkylene group having 1 to 8 carbon atoms, may include 2-aminoethanesulfonic acid (taurine), 3-aminopropanesulfonic acid, 4-aminobutanesulfonic acid, 2-amino-2-methylpropanesulfonic acid, and alkali metal salts of these.

Where $A_{21}$ is a substituted or unsubstituted phenyl group, it is represented by the chemical formula (8).

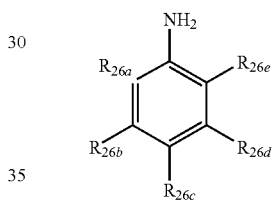

(8)

In the formula, at least one of $R_{26a}$, $R_{26b}$, $R_{26c}$, $R_{26d}$ and $R_{26e}$ is $SO_2R_{26f}$, where $R_{26f}$ is OH, a halogen atom, ONa, OK or $OR_{26h}$, where $R_{26h}$ is a substituted or unsubstituted aliphatic hydrocarbon structure, a substituted or unsubstituted aromatic ring structure, or a substituted or unsubstituted heterocyclic ring structure, and $R_{26a}$, $R_{26b}$, $R_{26c}$, $R_{26d}$ and $R_{26e}$ are each independently selected from a hydrogen atom, a halogen atom, an alkyl group having 1 to 20 carbon atoms, an alkoxyl group having 1 to 20 carbon atoms, an OH group, an $NH_2$ group, an $NO_2$ group or $COOR_{26g}$ (where $R_{26g}$ represents a hydrogen atom, an Na atom or a K atom), an acetamide group, an OPh group, an NHPh group, a $CF_3$ group, a $C_2F_5$ group and a $C_3F_7$ group, where Ph is a phenyl group.

The compound represented by the chemical formula (8) may include various aminobenzenesulfonic acid derivatives and salts thereof, such as p-aminobenzenesulfonic acid (sulfanilic acid), m-aminobenzenesulfonic acid, o-aminobenzenesulfonic acid, m-toluidine-4-sulfonic acid, o-toluidine-4-sulfonic acid, p-toluidine-2-sulfonic acid, 4-methoxyaniline-2-sulfonic acid, o-anisidine-5-sulfonic acid, p-anisidine-5-sulfonic acid, 3-nitroaniline-4-sulfonic acid, 2-nitroaniline-4-sulfonic acid sodium salt, 4-nitroaniline-2-sulfonic acid sodium salt, 1,5-dinitroaniline-4-sulfonic acid, 2-aminophenol-4-hydroxy-5-nitrobenzenesulfonic acid, 2,4-dimethylaniline-4-sulfonic acid sodium salt, 2,4-dimethylaniline-6-sulfonic acid, 3,4-dimethylaniline-5-sulfonic acid, 4-isopropylaniline-6-sulfonic acid, 4-trifluoromethylaniline-6-sulfonic acid, 3-carboxy-4-hydroxyaniline-5-sulfonic acid and 4-carboxyaniline-6-sulfonic acid; and also esterified products such as methyl esterified products or phenyl esterified products of various aminobenzenesulfonic acid derivatives and salts thereof, such as 2-aminobenzenesulfonic acid methyl ester, 4-aminobenzenesulfonic acid methyl ester, 2-aminobenzenesulfonic acid phenyl ester and 4-aminobenzenesulfonic acid phenyl ester. One or two or more of the above may be appropriately selected and used as occasion.

Where $A_{21}$ is a substituted or unsubstituted naphthyl group, it is represented by the chemical formula (9a) or (9b).

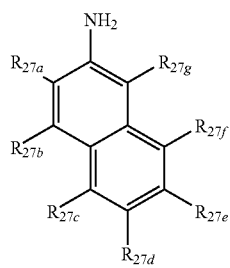

(9a)

In the formula, at least one of $R_{27a}$, $R_{27b}$, $R_{27c}$, $R_{27d}$, $R_{27e}$, $R_{27f}$ and $R_{27g}$ is $SO_2R_{27o}$, where $R_{27o}$ is OH, a halogen atom, ONa, OK or $OR_{27s}$, where $R_{27s}$ is a substituted or unsubstituted aliphatic hydrocarbon structure, a substituted or unsubstituted aromatic ring structure, or a substituted or unsubstituted heterocyclic ring structure, and $R_{27a}$, $R_{27b}$, $R_{27c}$, $R_{27d}$, $R_{27e}$, $R_{27f}$ and $R_{27g}$ are each independently selected from a hydrogen atom, a halogen atom, an alkyl group having 1 to 20 carbon atoms, an alkoxyl group having 1 to 20 carbon atoms, an OH group, an $NH_2$ group, an $NO_2$ group or $COOR_{27p}$ (where $R_{27p}$ represents a hydrogen atom, an Na atom or a K atom), an acetamide group, an OPh group, an NHPh group, a $CF_3$ group, a $C_2F_5$ group and a $C_3F_7$ group, where Ph is a phenyl group.

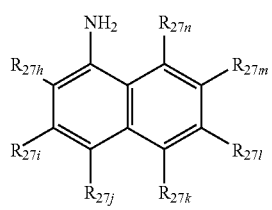

(9b)

In the formula, at least one of $R_{27h}$, $R_{27i}$, $R_{27j}$, $R_{27k}$, $R_{27l}$, $R_{27m}$ and $R_{27n}$ is $SO_2R_{27q}$, where $R_{27q}$ is OH, a halogen atom, ONa, OK or $OR_{27t}$, where $R_{27t}$ is a substituted or unsubstituted aliphatic hydrocarbon structure, a substituted or unsubstituted aromatic ring structure, or a substituted or unsubstituted heterocyclic ring structure, and $R_{27h}$, $R_{27i}$, $R_{27j}$, $R_{27k}$, $R_{27l}$, $R_{27m}$ and $R_{27n}$ are each independently selected from a hydrogen atom, a halogen atom, an alkyl group having 1 to 20 carbon atoms, an alkoxyl group having 1 to 20 carbon atoms, an OH group, an $NH_2$ group, an $NO_2$ group or $COOR_{27r}$ (where $R_{27r}$ represents a hydrogen atom, an Na atom or a K atom), an acetamide group, an OPh group, an NHPh group, a $CF_3$ group, a $C_2F_5$ group and a $C_3F_7$ group, where Ph is a phenyl group.

The compound represented by the chemical formula (9a) or (9b) may include various naphthylaminesulfonic acid derivatives and salts thereof, such as 1-naphthylamine-4-sulfonic acid, 1-naphthylamine-5-sulfonic acid, 1-naphthylamine-6-sulfonic acid, 1-naphthylamine-7-sulfonic acid, 1-naphthylamine-8-sulfonic acid, 2-naphthylamine-1-sulfonic acid, 2-naphthylamine-5-sulfonic acid, 1-naphthylamine-2-ethoxy-6-sulfonic acid, 1-amino-2-naphthol-4-sulfonic acid, 6-amino-1-naphthol-3-sulfonic acid, 1-amino-8-naphthol-2,4-sulfonic acid sodium salt and 1-amino-8-naphthol-3,6-sulfonic acid sodium salt; and also esterified products such as methyl esterified products or phenyl esterified products of various naphthylaminesulfonic acid derivatives and salts thereof, such as 1-naphthylamine-8-sulfonic acid methyl ester, 2-naphthylamine-1-sulfonic acid methyl ester, 1-naphthylamine-8-sulfonic acid phenyl ester and 2-naphthylamine-1-sulfonic acid phenyl ester. One or two or more of the above may be appropriately selected and used as occasion.

Where $A_{21}$ is a substituted or unsubstituted heterocyclic ring structure containing one or more of N, S and O, it may include a pyridine ring, a piperazine ring, a furan ring and a thiol ring. One or two or more of the above may be appropriately selected and used as occasion.

Condensation reaction of the polymer containing the unit represented by the chemical formula (6) with the aminosulfonic acid compound represented by the chemical formula (7) in the present invention is described in detail. For condensation reaction of a carboxyl group with an amino group, any methods may be used, such as a method making use of a condensation agent, a method in which a salt is formed and condensation is carried out by dehydration reaction, a method making use of a dehydrating agent, and a method in which a carboxyl group is converted into an acid chloride to react with an amino group.

First, the method making use of a condensation agent is described in detail.

As the condensation agent, phosphoric acid type condensation agents, carbodiimide type condensation agents, acid chloride type condensation agents or the like are usable. For example, the phosphoric acid type condensation agents may include phosphite type condensation agents, phosphorus chloride type condensation agents, phosphoric anhydride type condensation agents, phosphate type condensation agents, phosphoric acid amide type condensation agents and thionyl chloride type condensation agents. In the reaction in the present invention, it is preferable to use phosphite type condensation agents. Phosphites used here may include triphenyl phosphite, trimethyl phosphite, triethyl phosphite, diphenyl phosphite, tri-o-tolyl phosphite, di-o-tolyl phosphite, tri-m-tolyl phosphite, di-m-tolyl phosphite, tri-p-tolyl phosphite, di-p-tolyl phosphite, di-o-chlorophenyl phosphite and di-p-chlorophenyl phosphite. In particular, triphenyl phosphite may preferably be used. The condensation agent may be used in an amount of 0.1-fold mole or more, and preferably equi-fold mole or more, based on the compound represented by the chemical formula (7). Also, the condensation agent itself may be used as a reaction solvent.

The compound represented by the chemical formula (7), used in this process may be used in an amount ranging from 0.1-fold to 50.0-fold mole, and preferably from 1.0-fold to 20.0-fold mole, based on the unit represented by the chemical formula (6).

In the reaction in the present invention, a solvent may optionally be used. The solvent used may include hydrocarbons such as hexane, cyclohexane and heptane; ketones such as acetone and methyl ethyl ketone; ethers such as dimethyl ether, diethyl ether and tetrahydrofuran; halogenated hydrocarbons such as dichloromethane, chloroform, carbon tetrachloride, dichloroethane and trichloroethane; aromatic hydrocarbons such as benzene and toluene; aprotic polar solvents such as N,N-dimethylformamide and dimethyl sulfoxide; and pyridine derivatives. Pyridine may particularly preferably be used. The solvent may be used in an amount determined appropriately in accordance with the types of starting materials and bases, reaction conditions and so forth.

In this process, there are no particular limitations on the reaction temperature, which may usually be a temperature ranging from 0° C. to the boiling point of the solvent, provided that the reaction may preferably be carried out at an optimum temperature suitable for the condensation agent to be used. In the process in the present invention, the reaction time can not absolutely be prescribed, and may usually be in the range of from 1 hour to 48 hours. Using the standard distillation method, the polymer thus produced, having the unit represented by the chemical formula (1), may be taken out of the reaction fluid containing that polymer. Alternatively, the targeted polymer having the unit represented by the chemical formula (1) may be collected by mixing the reaction fluid and a solvent uniformly soluble therein, not dissolving that polymer, and re-precipitating it with the solvent including water, alcohols such as methanol and ethanol, and ethers such as dimethyl ether, diethyl ether and tetrahydrofuran.

The polymer having the unit represented by the chemical formula (1), obtained here, may optionally be isolated and purified. As for methods for such isolation and purification, there are no particular limitations, including a method in which the polymer having the unit represented by the chemical formula (1) is re-precipitated using a solvent not dissolving that polymer, and a method by column chromatography.

Production Process (B) for the Polymer Having the Unit Represented by the Chemical Formula (1):

The polymer having in its molecule at least one unit represented by the chemical formula (1), may be synthesized by polymerizing a compound represented by the chemical formula (901), alone or with other polymerizable monomers.

Production Process for a Compound Represented by the Chemical Formula (901):

The compound represented by the chemical formula (901) may be produced by the following process.

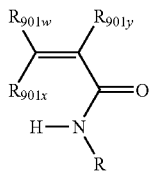

(901)

In the formula, R represents $-A_{901}-SO_2R_{901}$, and $R_{901w}$, $R_{901x}$ and $R_{901y}$ are each selected from combination recited in the following (i) or (ii), where, in the case of (i), $A_{901}$ and $R_{901}$ are each selected from combination recited in the following (i-A) or (i-B), and, in the case of (ii), $A_{901}$ and $R_{901}$ are each selected from combination recited in the following (ii-A):

(i) $R_{901w}$ and $R_{901x}$ are each independently a hydrogen atom, and $R_{901y}$ is a $CH_3$ group or a hydrogen atom;

(i-A) $A_{901}$ is a substituted or unsubstituted aliphatic hydrocarbon structure; and $R_{901}$ is OH, a halogen atom, ONa, OK or $OR_{901a}$, where $R_{901a}$ is a substituted or unsubstituted aliphatic hydrocarbon structure, a substituted or unsubstituted aromatic ring structure, or a substituted or unsubstituted heterocyclic ring structure;

(i-B) $A_{901}$ is a substituted or unsubstituted aromatic ring structure, or a substituted or unsubstituted heterocyclic ring structure; and $R_{901}$ is OH, a halogen atom, ONa, OK or $OR_{901a}$, where $R_{901a}$ is a substituted or unsubstituted aliphatic hydrocarbon structure, a substituted or unsubstituted aromatic ring structure, or a substituted or unsubstituted heterocyclic ring structure;

(ii) $R_{901w}$ and $R_{901x}$ are each independently a halogen atom or a hydrogen atom, and $R_{901y}$ is a $CH_3$ group, a halogen atom or a hydrogen atom, provided that at least one of $R_{901w}$, $R_{901x}$ and $R_{901y}$ is a halogen atom; and (ii-A) $A_{901}$ is a substituted or unsubstituted aliphatic hydrocarbon structure, a substituted or unsubstituted aromatic ring structure, or a substituted or unsubstituted heterocyclic ring structure; and $R_{901}$ is OH, a halogen atom, ONa, OK or $OR_{901a}$, where $R_{901a}$ is a substituted or unsubstituted aliphatic hydrocarbon structure, a substituted or unsubstituted aromatic ring structure, or a substituted or unsubstituted heterocyclic ring structure.

The synthesis process for the compound represented by the chemical formula (901) in the present invention is described in detail. It is synthesized by condensation reaction of an acid chloride polymerizable monomer such as a polymerizable monomer having a carboxyl group, such as acrylic acid or methacrylic acid, an acrylic acid chloride whose carboxyl group is in the form of an acid chloride, or an acid chloride polymerizable monomer such as acrylic acid chloride or methacrylic acid chloride, with a compound of various types which has an amino group, represented by the chemical formula (817) as described later.

For the condensation reaction of a carboxyl group with an amino group, any methods may be used, such as a method making use of a condensation agent, a method in which a salt is formed and condensation is carried out by dehydration reaction, a method making use of a dehydrating agent, and a method in which a carboxyl group is converted into an acid chloride to react with an amino group.

As a production process according to the present invention, the method in which a carboxyl group is converted into an acid chloride to react with an amino group is described in detail.

A polymerizable monomer represented by the chemical formula (717) may be converted into an acid chloride by using thionyl chloride as in a conventional method.

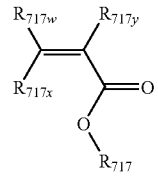

(717)

In the formula, $R_{717w}$ and $R_{717x}$ are each independently a halogen atom or a hydrogen atom, and $R_{717y}$ is a $CH_3$ group, a halogen atom or a hydrogen atom, and $R_{717}$ is a hydrogen atom, an Na atom or a K atom. Where a plurality of units are present, $R_{717}$, $R_{717w}$, $R_{717x}$ and $R_{717y}$ are each as defined above, for each unit.

The thionyl chloride may be used in an amount ranging from 0.1-fold to 50.0-fold mole, and preferably from 1.0-fold to 20.0-fold mole, based on the compound represented by the chemical formula (717). Also, the thionyl chloride itself may be used as a reaction solvent.

The compound represented by the chemical formula (817) as described later, used in this process, may be used in an amount ranging from 0.1-fold to 50.0-fold moles, and preferably from 1.0-fold to 20.0-fold moles, based on the unit represented by the chemical formula (717). In the reaction in the present invention, a solvent may optionally be used. The solvent may include hydrocarbons such as hexane, cyclohexane and heptane; ketones such as acetone and methyl ethyl ketone; ethers such as dimethyl ether, diethyl ether and tetrahydrofuran; halogenated hydrocarbons such as dichloromethane, chloroform, carbon tetrachloride, dichloroethane and trichloroethane; aromatic hydrocarbons such as benzene and toluene; aprotic polar solvents such as N,N-dimethylformamide and dimethyl sulfoxide; pyridine derivatives; and water. The solvent may preferably be one in which the compound represented by the chemical formula (817) as described later is soluble. The solvent may be used in an amount determined appropriately in accordance with the types of starting materials, reaction conditions and so forth.

In this process, there are no particular limitations on the reaction temperature, which may usually be a temperature ranging from −30° C. to the boiling point of the solvent, provided that the reaction may preferably be carried out at an optimum temperature suitable for the compound represented by the chemical formula (817) as described later and the reaction solvent. In the process in the present invention, the reaction time can not absolutely be prescribed, and may usually be in the range of from 1 hour to 48 hours. Using the standard distillation method, the compound represented by the chemical formula (901), thus produced, may be taken out of the reaction fluid containing that polymer.

The compound represented by the chemical formula (901), obtained here, may optionally be isolated and purified. As for methods for such isolation and purification, there are no particular limitations, including a method in which the compound represented by the chemical formula (901) is recrystallized using a solvent in which it is sparingly soluble, and a method by column chromatography.

Compound Represented by the Chemical Formula (817):

The compound represented by the chemical formula (817) may include the following.

$H_2N-A_{817}-SO_2R_{817}$     (817)

In the formula, $R_{817}$ is OH, a halogen atom, ONa, OK or $OR_{817a}$; and $A_{817}$ and $R_{817a}$ are each independently a substituted or unsubstituted aliphatic hydrocarbon structure, a substituted or unsubstituted aromatic ring structure, or a substituted or unsubstituted heterocyclic ring structure. More specifically, $A_{817}$ represents a straight-chain or branched alkylene group having 1 to 8 carbon atoms, a substituted or unsubstituted phenyl group, a substituted or unsubstituted naphthyl group, or a substituted or unsubstituted heterocyclic ring structure containing any one or more of N, S and O. Where $A_{817}$ is a ring structure, an unsubstituted ring may further be condensed.

The compound wherein $A_{817}$ is a straight-chain or branched alkylene group having 1 to 8 carbon atoms, may include 2-aminoethanesulfonic acid (taurine), 3-aminopropanesulfonic acid, 4-aminobutanesulfonic acid, 2-amino-2-methylpropanesulfonic acid, and alkali metal salts of these.

Where $A_{817}$ is a substituted or unsubstituted phenyl group, it is represented by the chemical formula (26).

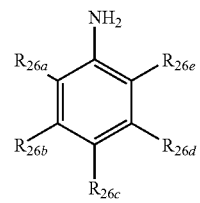

(26)

In the formula, at least one of $R_{26a}$, $R_{26b}$, $R_{26c}$, $R_{26d}$ and $R_{26e}$ is $SO_2R_{26f}$, where $R_{26f}$ is OH, a halogen atom, ONa, OK or $OR_{26h}$, where $R_{26h}$ is a substituted or unsubstituted aliphatic hydrocarbon structure, a substituted or unsubstituted aromatic ring structure, or a substituted or unsubstituted heterocyclic ring structure, and $R_{26a}$, $R_{26b}$, $R_{26c}$, $R_{26d}$ and $R_{26e}$ are each independently selected from a hydrogen atom, a halogen atom, an alkyl group having 1 to 20 carbon atoms, an alkoxyl group having 1 to 20 carbon atoms, an OH group, an $NH_2$ group, an $NO_2$ group or $COOR_{26g}$ (where $R_{26g}$ represents a hydrogen atom, an Na atom or a K atom), an acetamide group, an OPh group, an NHPh group, a $CF_3$ group, a $C_2F_5$ group and a $C_3F_7$ group, where Ph is a phenyl group.

The compound represented by the chemical formula (26) may include various aminobenzenesulfonic acid derivatives and salts thereof, such as p-aminobenzenesulfonic acid (sulfanilic acid), m-aminobenzenesulfonic acid, o-aminobenzenesulfonic acid, m-toluidine-4-sulfonic acid, o-toluidine-4-sulfonic acid, p-toluidine-2-sulfonic acid, 4-methoxyaniline-2-sulfonic acid, o-anisidine-5-sulfonic acid, p-anisidine-5-sulfonic acid, 3-nitroaniline-4-sulfonic acid, 2-nitroaniline-4-sulfonic acid sodium salt, 4-nitroaniline-2-sulfonic acid sodium salt, 1,5-dinitroaniline-4-sulfonic acid, 2-aminophenol-4-hydroxy-5-nitrobenzenesulfonic acid, sodium 2,4-dimethylaniline-4-sulfonate, 2,4-dimethylaniline-6-sulfonic acid, 3,4-dimethylaniline-5-sulfonic acid, 4-isopropylaniline-6-sulfonic acid, 4-trifluoromethylaniline-6-sulfonic acid, 3-carboxy-4-hydroxyaniline-5-sulfonic acid and 4-carboxyaniline-6-sulfonic acid; and also esterified products such as methyl esterified products or phenyl esterified products of various aminobenzenesulfonic acid derivatives and salts thereof, such as 2-aminobenzenesulfonic acid methyl ester, 4-aminobenzenesulfonic acid methyl ester, 2-aminobenzenesulfonic acid phenyl ester and 4-aminobenzenesulfonic acid phenyl ester.

Where $A_{817}$ is a substituted or unsubstituted naphthyl group, it is represented by the chemical formula (27a) or (27b).

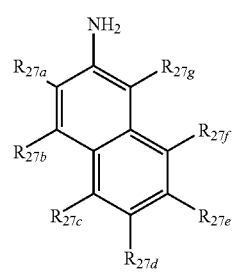

(27a)

In the formula, at least one of $R_{27a}$, $R_{27b}$, $R_{27c}$, $R_{27d}$, $R_{27e}$, $R_{27f}$ and $R_{27g}$ is $SO_2R_{27o}$, where $R_{27o}$ is OH, a halogen atom, ONa, OK or $OR_{27s}$, where $R_{27s}$ is a substituted or unsubstituted aliphatic hydrocarbon structure, a substituted or unsubstituted aromatic ring structure, or a substituted or unsubstituted heterocyclic ring structure, and $R_{27a}$, $R_{27b}$, $R_{27c}$, $R_{27d}$, $R_{27e}$, $R_{27f}$ and $R_{27g}$ are each independently selected from a hydrogen atom, a halogen atom, an alkyl group having 1 to 20 carbon atoms, an alkoxyl group having 1 to 20 carbon atoms, an OH group, an $NH_2$ group, an $NO_2$ group or $COOR_{27p}$ (where $R_{27p}$ represents a hydrogen atom, an Na atom or a K atom), an acetamide group, an OPh group, an NHPh group, a $CF_3$ group, a $C_2F_5$ group and a $C_3F_7$ group, where Ph is a phenyl group.

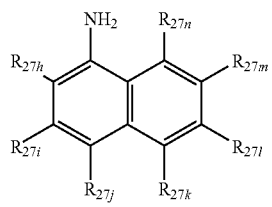

(27b)

In the formula, at least one of $R_{27h}$, $R_{27i}$, $R_{27j}$, $R_{27k}$, $R_{27l}$, $R_{27m}$ and $R_{27n}$ is $SO_2R_{27q}$, where $R_{27q}$ is OH, a halogen atom, ONa, OK or $OR_{27t}$, where $R_{27t}$ is a substituted or unsubstituted aliphatic hydrocarbon structure, a substituted or unsubstituted aromatic ring structure, or a substituted or unsubstituted heterocyclic ring structure, and $R_{27h}$, $R_{27i}$, $R_{27j}$, $R_{27k}$, $R_{27l}$, $R_{27m}$ and $R_{27n}$ are each independently selected from a hydrogen atom, a halogen atom, an alkyl group having 1 to 20 carbon atoms, an alkoxyl group having 1 to 20 carbon atoms, an OH group, an $NH_2$ group, an $NO_2$ group or $COOR_{27r}$ (where $R_{27r}$ represents a hydrogen atom, an Na atom or a K atom), an acetamide group, an OPh group, an NHPh group, a $CF_3$ group, a $C_2F_5$ group and a $C_3F_7$ group, where Ph is a phenyl group.

The compound represented by the chemical formula (27a) or (27b) may include various naphthylaminesulfonic acid derivatives and salts thereof, such as 1-naphthylamine-4-sulfonic acid, 1-naphthylamine-5-sulfonic acid, 1-naphthylamine-6-sulfonic acid, 1-naphthylamine-7-sulfonic acid, 1-naphthylamine-8-sulfonic acid, 2-naphthylamine-1-sulfonic acid, 2-naphthylamine-5-sulfonic acid, 1-naphthylamine-2-ethoxy-6-sulfonic acid, 1-amino-2-naphthol-4-sulfonic acid, 6-amino-1-naphthol-3-sulfonic acid, 1-amino-8-naphthol-2,4-sulfonic acid monosodium salt and 1-amino-8-naphthol-3,6-sulfonic acid monosodium salt; and also esterified products such as methyl esterified products or phenyl esterified products of various naphthylaminesulfonic acid derivatives and salts thereof, such as 1-naphthylamine-8-sulfonic acid methyl ester, 2-naphthylamine-1-sulfonic acid methyl ester, 1-naphthylamine-8-sulfonic acid phenyl ester and 2-naphthylamine-1-sulfonic acid phenyl ester.

Where $A_{817}$ is a substituted or unsubstituted heterocyclic ring structure containing any one or more of N, S and O, it may include a pyridine ring, a piperazine ring, a furan ring and a thiol ring.

Of the compound represented by the chemical formula (901), synthesised by the above process, and where the compound having no sulfonate unit as exemplified by the compound wherein $R_{901}$ is OH, a halogen atom, ONa or OK is used, an esterifying agent such as trimethylsilyldiazomethane, trimethyl orthoformate or triethyl orthoformate may further be used, thereby making it possible to synthesize a compound having a sulfonate unit wherein $R_{901}$ in the chemical formula (901) is represented by $OR_{901a}$.

In this reaction, a solvent may optionally be used. The solvent may include hydrocarbons such as hexane, cyclohexane and heptane; alcohols such as methanol and ethanol; ethers such as dimethyl ether, diethyl ether and tetrahydrofuran; halogenated hydrocarbons such as dichloromethane, chloroform, carbon tetrachloride, dichloroethane and trichloroethane; aromatic hydrocarbons such as benzene and toluene; aproticpolar solvents such as N,N-dimethylformamide and dimethyl sulfoxide; and pyridine derivatives. Chloroform and methanol may particularly preferably be used. The solvent may be used in an amount determined appropriately in accordance with starting materials, reaction conditions and so forth.

The esterifying agent may be used in an amount ranging from 0.1-fold to 50-fold moles, and preferably from 1.0-fold to 20-fold moles, based on the unit wherein $R_{901}$ in the chemical formula (901) is OH, a halogen atom, ONa or OK.

In this process, there are no particular limitations on the reaction temperature, which may usually be a temperature ranging from $-20°$ C. to $30°$ C. The reaction time can not absolutely be prescribed, and may usually be in the range of from 1 hour to 48 hours.

Using the standard distillation method, the compound thus produced, having a sulfonate unit wherein $R_{901}$ in the chemical formula (901) is represented by $OR_{901a}$, may be taken out the reaction fluid containing that polymer.

The compound having a sulfonate unit wherein $R_{901}$ in the chemical formula (901) is represented by $OR_{901a}$, obtained here, may optionally be isolated and purified. As for methods for such isolation and purification, there are no particular limitations thereon, including a method in which the compound having a sulfonate unit wherein $R_{901}$ in the chemical formula (901) is represented by $OR_{901a}$ is recrystallized using a solvent in which that compound is sparingly soluble, and a method by column chromatography.

Polymerization Process for the Compound Represented by the Chemical Formula (901):

In polymerization processes for the compound represented by the chemical formula (901), known various polymerization reactions may be utilized. Copolymerization with various known monomers is also possible.

Examples of such copolymerizable monomers may include styrene, and styrene derivatives such as o-methylstyrene, m-methylstyrene, p-methylstyrene, p-methoxystyrene, p-phenylstyrene, p-chlorostyrene, 3,4-dichlorostyrene, p-ethylstyrenee, 2,4-dimethylstyrene, p-n-butylstyrene, p-tert-butylstyrene, p-n-hexylstyrene, p-n-octylstyrene, p-n-nonylstyrene, p-n-decylstyrene and p-n-dodecylstyrene; ethylene unsaturated monoolefins such as ethylene, propylene, butylene and isobutylene; vinyl halides such as vinyl chloride, vinylidene chloride, vinyl bromide and vinyl fluoride; vinyl esters such as vinyl acetate, vinyl propionate and vinyl benzoate; α-methylene aliphatic monocarboxylates such as methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate and diethylaminoethyl methacrylate; acrylic esters such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate and phenyl acrylate; vinyl ethers such as methyl vinyl ether, ethyl vinyl ether and isobutyl vinyl ether; vinyl ketones such as methyl vinyl ketone, hexyl vinyl ketone and methyl isopropenyl ketone; N-vinyl compounds such as N-vinylpyrrole, N-vinylcarbazole, N-vinylindole and N-vinylpyrrolidone; vinylnaphthalenes; and acrylic acid or methacrylic acid derivatives such as acrylonitrile, methacrylonitrile and acrylamide.

Where, of the compound represented by the chemical formula (901), the compound having no sulfonate unit as exemplified by the compound wherein $R_{901}$ is OH, a halogen atom, ONa or OK is polymerized, it is particularly preferable to use radical polymerization, in which polymerization conditions are relatively easily controllable. Also, where the compound has a sulfonate unit, ionic polymerization may be used.

In using the radical polymerization, a polymerization initiator is used which may include, e.g., t-butyl peroxy-2-ethyl hexanoate, cumin perpivarate, t-butyl peroxylaurate, benzoyl peroxide, lauroyl peroxide, octanoyl peroxide, di-t-butyl peroxide, t-butylcumyl peroxide, dicumyl peroxide, 2,2'-azobisisobutyronitrile, 2,2'-azobis(2-methylbutyronitrile, 2,2'-azobis-(2,4-dimethylvaleronitrile), 2,2'-azobis-(4-methoxy-2,4-dimethylvaleronitrile), 1,1-bis(t-butylperoxy)-3,5,5-trimethylcyclohexane, 1,1-bis(t-butylperoxy)cyclohexane, 1,4-bis(t-butylperoxycarbonyl)cyclohexane, 2,2-bis(t-butylperoxy)octane, n-butyl 4,4-bis(t-butylperoxy)valerate, 2,2-bis(t-butylperoxy)butane, 1,3-bis(t-butylperoxy-isopropyl)benzene, 2,5-dimethyl-2,5-di(t-butylperoxy)hexane, 2,5-dimethyl-2,5-di(t-butylperoxy)hexane, 2,5-dimethyl-2,5-di(t-benzoylperoxy)hexane, di-t-butyl diperoxyisophthalate, 2,2-bis(4,4-di-t-butylperoxycyclohexyl)propane, di-t-butyl peroxy-α-methyl succinate, di-t-butyl peroxydimethyl glutarate, di-t-butyl hexahydroterephthalate, di-t-butyl peroxyazelate, 2,5-dimethyl-2,5-di(t-butylperoxy)hexane, diethylene glycol bis(t-butyl peroxycarbonate), di-t-butyl peroxytrimethyl adipate, tris(t-butylperoxy)triazine, and vinyl tris(t-butylperoxy)silane. Also water-soluble initiators such as potassium persulfate and ammonium persulfate are usable.

Any of these may be used alone or in combination, in an amount ranging from 0.001-fold to 0.5-fold mole based on the total weight of the polymerizable monomer(s). The amount may appropriately be determined in accordance with the type of the monomer to be used, the monomer to be used in copolymerization and the initiator to be used.

In the polymerization reaction in the present invention, a solvent may optionally be used. The solvent may include hydrocarbons such as hexane, cyclohexane and heptane; ketones such as acetone and methyl ethyl ketone; ethers such as dimethyl ether, diethyl ether and tetrahydrofuran; halogenated hydrocarbons such as dichloromethane, chloroform, carbon tetrachloride, dichloroethane and trichloroethane; aromatic hydrocarbons such as benzene and toluene; and aprotic polar solvents such as N,N-dimethylformamide and dimethyl sulfoxide. Particularly preferably used are the aprotic polar solvents such as N,N-dimethylformamide and dimethyl sulfoxide. The solvent may be used in an amount determined appropriately in accordance with the type of the solvent, the monomer to be used in copolymerization, the initiator to be used, reaction conditions and so forth.

In this process, there are no particular limitations on the reaction temperature, which may usually be a temperature ranging from −76° C. to the boiling point of the solvent, provided that the reaction may preferably be carried out at an optimum temperature suitable for the initiator to be used and the monomers to be used in copolymerization. In the process in the present invention, the reaction time can not absolutely be prescribed, and may usually be in the range of from 0.5 hour to 48 hours. Using the standard distillation method, the polymer thus produced, having in the molecule at least one unit represented by the chemical formula (1), may be taken out of the reaction fluid containing that polymer. Alternatively, the targeted polymer having in its molecule at least one unit represented by the chemical formula (1), may be collected by mixing the reaction fluid and a solvent uniformly soluble therein, not dissolving that polymer, and re-precipitating it, with the solvent including water, alcohols such as methanol and ethanol, and ethers such as dimethyl ether, diethyl ether and tetrahydrofuran.

The polymer having in its molecule at least one unit represented by the chemical formula (1), obtained here, may optionally be isolated and purified. As for methods for such isolation and purification, there are no particular limitations, including a method in which the polymer having in its molecule at least one unit represented by the chemical formula (1) is re-precipitated using a solvent not dissolving it, and a method by column chromatography.

Production Process (C) for the Polymer Having the Unit Represented by the Chemical Formula (1):

Of the polymer having the unit represented by the chemical formula (1), and as to a polymer having a unit wherein, as shown in the chemical formula (801), $R_{801}$ is OH, a halogen atom, ONa or OK, an esterifying agent such as trimethylsilyldiazomethane, trimethyl orthoformate or triethyl orthoformate may be used, thereby making it possible to synthesize a polymer having the unit which is represented by the chemical formula (1) and in which R in the chemical formula (802) is $-A_{802}-SO_3R_{802}$.

This reaction is described below in detail.

(1)

In the formula, R represents $-A_{25}-SO_2R_{25}$, and $R_{25w}$, $R_{25x}$ and $R_{25y}$ are each selected from combination recited in the following (i) or (ii), where, in the case of (i), $A_{25}$ and $R_{25}$ are each selected from combination recited in the following (i-A) or (i-B), and, in the case of (ii), $A_{25}$ and $R_{25}$ are each selected from combination recited in the following (ii-A):

(i) $R_{25w}$ and $R_{25x}$ are each independently a hydrogen atom, and $R_{25y}$ is a $CH_3$ group or a hydrogen atom;

(i-A) $A_{25}$ is a substituted or unsubstituted aliphatic hydrocarbon structure; and $R_{25}$ is a halogen atom or $OR_{25a}$, where $R_{25a}$ is a substituted or unsubstituted aliphatic hydrocarbon structure, a substituted or unsubstituted aromatic ring structure, or a substituted or unsubstituted heterocyclic ring structure;

(i-B) $A_{25}$ is a substituted or unsubstituted aromatic ring structure, or a substituted or unsubstituted heterocyclic ring structure; and $R_{25}$ is OH, a halogen atom, ONa, OK or $OR_{25a}$, where $R_{25a}$ is a substituted or unsubstituted aliphatic hydrocarbon structure, a substituted or unsubstituted aromatic ring structure, or a substituted or unsubstituted heterocyclic ring structure;

(ii) $R_{25w}$ and $R_{25x}$ are each independently a halogen atom or a hydrogen atom, and $R_{25y}$ is a $CH_3$ group, a halogen atom or a hydrogen atom, provided that at least one of $R_{25w}$, $R_{25x}$ and $R_{25y}$ is a halogen atom; and (ii-A) $A_{25}$ is a substituted or unsubstituted aliphatic hydrocarbon structure, a substituted or unsubstituted aromatic ring structure, or a substituted or unsubstituted heterocyclic ring structure; and $R_{25}$ is OH, a halogen atom, ONa, OK or $OR_{25a}$, where $R_{25a}$ is a substituted or unsubstituted aliphatic hydrocarbon structure, a substituted or unsubstituted aromatic ring structure, or a substituted or unsubstituted heterocyclic ring structure.

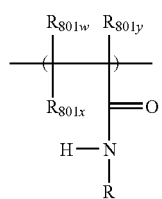

(801)

In the formula, R is $-A_{801}-SO_2R_{801}$, $R_{801w}$ and $R_{801x}$ are each independently a halogen atom or a hydrogen atom, and $R_{801y}$ is a $CH_3$ group, a halogen atom or a hydrogen atom, where $R_{801}$ is OH, a halogen atom, ONa or OK, and $A_{801}$ is a substituted or unsubstituted aliphatic hydrocarbon structure, a substituted or unsubstituted aromatic ring structure, or a substituted or unsubstituted heterocyclic ring structure.

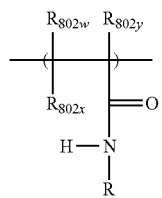

(802)

In the formula, R is $-A_{802}-SO_2R_{802}$, $R_{802w}$ and $R_{802x}$ are each independently a halogen atom or a hydrogen atom, and $R_{802y}$ is a $CH_3$ group, a halogen atom or a hydrogen atom, where $A_{802}$ and $R_{802}$ are each independently a substituted or unsubstituted aliphatic hydrocarbon structure, a substituted or unsubstituted aromatic ring structure, or a substituted or unsubstituted heterocyclic ring structure.

In this reaction, a solvent may optionally be used. The solvent used may include hydrocarbons such as hexane, cyclohexane and heptane; alcohols such as methanol and ethanol; ethers such as dimethyl ether, diethyl ether and tetrahydrofuran; halogenated hydrocarbons such as dichloromethane, chloroform, carbon tetrachloride, dichloroethane and trichloroethane; aromatic hydrocarbons such as benzene and toluene; aproticpolar solvents such as N,N-dimethylformamide and dimethyl sulfoxide; and pyridine derivatives. Chloroform and methanol may particularly preferably be used. The solvent may be used in an amount determined appropriately in accordance with starting materials, reaction conditions and so forth.

The esterifying agent may be used in an amount ranging from 0.1-fold to 50-fold moles, and preferably from 1.0-fold to 20-fold moles, based on the unit represented by the chemical formula (801).

In this process, there are no particular limitations on the reaction temperature, which may usually be a temperature ranging from −20° C. to 30° C. The reaction time can not absolutely be prescribed, and may usually be in the range of from 1 hour to 48 hours.

Using the standard distillation method, the polymer thus produced, having in the molecule at least one unit represented by the chemical formula (801), may be taken out of the reaction fluid containing that polymer. Alternatively, the targeted polymer having in its molecule at least one unit represented by the chemical formula (801), may be collected by mixing the reaction fluid and a solvent uniformly soluble therein, not dissolving that polymer, and re-precipitating it, with the solvent including water, alcohols such as methanol and ethanol, and ethers such as dimethyl ether, diethyl ether and tetrahydrofuran.

The polymer having in the molecule at least one unit represented by the chemical formula (801), obtained here, may optionally be isolated and purified. As for methods for such isolation and purification, there are no particular limitations, including a method in which the polymer having in its molecule at least one unit represented by the chemical formula (801) is re-precipitated using a solvent not dissolving it, and a method by column chromatography.

The above polymer used in the present invention may preferably contain the monomer unit represented by the chemical formula (1) in a proportion of from 0.2% or more to 40% or less in unit ratio, and has a number-average molecular weight of from 1,000 to 200,000. If the unit represented by the chemical formula (1) is in a proportion of less than 0.2%, the polymer may be inferior in the ability to provide the toner with positive charges. If on the other hand the unit represented by the chemical formula (1) is in a proportion of more than 40%, environmental stability such as moisture resistance may become poor, or film properties may deteriorate. If the polymer has a number-average molecular weight of less than 1,000, a low-molecular weight component is so much that the toner tends to adhere or cling to the sleeve and the resin layer may have a low charge-providing performance. If on the other hand the polymer has a number-average molecular weight of more than 200,000, it may be inferior in compatibility with other resin(s) which form(s) the resin layer, so that stabler charging performance may come not to be obtainable because of environmental variations and with time. If it has a too high molecular weight, the resin viscosity in a solvent may come so high as to cause faulty coating and, when a pigment is added, cause faulty dispersion, so that the resin layer formed by coating may have a non-uniform composition to unstably charge the toner, and further the resin coating layer may have unstable surface roughness to cause, e.g., deterioration in wear resistance.

In general, binder resins for toners have a glass transition point of approximately from 50° C. to 70° C. in many cases, and hence, when the above polymer is used, in order to prevent the toner from adhering to the surface of the resin layer formed by coating the substrate, it is preferable that a polymer for coating is prepared selecting materials appropriately so that a coating film (resin layer) having a higher glass transition point than the glass transition point of the toner can be formed.

Another constitution of the developer carrying member of the present invention, having the resin layer composed of the components as described above is described next. The developer carrying member of the present invention has the resin layer formed of the materials described above on the substrate surface. The substrate used for the developer carrying member includes, e.g., a columnar member, a cylindrical member and a beltlike member which are made of a metal, a resin, a rubber or a composite of any of these. Of these, a cylindrical tube may particularly preferably be used. As the cylindrical tube, it is preferable to use, e.g., a non-magnetic metal or alloy such as aluminum, stainless steel or brass molded into a cylindrical shape and thereafter subjected to grinding and polishing. Such a metallic cylindrical tube is used after it has been shaped or worked in a high precision in order to improve the uniformity of images to be formed. For example, it may preferably be 30 µm or less, and more preferably 20 µm or less, in straightness in the lengthwise direction. It may also preferably be 30 µm or less, and more preferably 20 µm or less, in deflection of the gap between the sleeve and the photosensitive drum, e.g., in deflection of the gap formed between the sleeve and a vertical face when the sleeve is rotated in the state that it is placed against the vertical face via a uniform spacer.

In the developer carrying member of the present invention, the resin layer is further formed covering the substrate surface as described above, where the resin layer contains as a binder resin used for the formation the above polymer containing in its molecule at least one unit represented by the chemical formula (1). Here, the polymer containing in its molecule at least one unit represented by the chemical formula (1) may be used in the form of a copolymer. This copolymer may be used in the state that it is optionally incorporated with an additional known resin. As the additional resin used here, the following may be cited, e.g., thermoplastic resins such as styrene resins, vinyl resins, polyether sulfone resins, polycarbonate resins, polyphenylene oxide resins, polyamide resins, fluorine resins, cellulose resins and acrylic resins; and thermo- or photosetting resins such as polyester resins, alkyd resins, polyurethane resins, urea resins and silicone resins. Of the above, it is more preferable to use those having releasability as in silicone resins and fluorine resins, or those having superior mechanical properties as in polyether sulfone resins, polycarbonate resins, polyphenylene oxide resins, styrene resins and acrylic resins.

The resin layer which covers the substrate surface, constituting the developer carrying member of the present invention, may preferably be further incorporated with conductive fine particles and/or a lubricating substance to provide a conductive resin layer. The lubricating substance is a triboelectric charge providing material, and the resin layer with the lubricating substance dispersed therein may be formed on the substrate surface so that the effect of the present invention can be further promoted. The lubricating substance usable here may include, e.g., solid lubricants such as particles of graphite, molybdenum disulfide, boron nitride, mica, graphite fluoride, silver-niobium selenide, calcium chloride-graphite, talc, and fatty acid metal salts such as zinc stearate. In particular, graphite particles may particularly preferably be used because the conductivity of the coating resin layer is not impaired. These solid lubricants may preferably have a number-average particle diameter of approximately from 0.2 µm to 20 µm, and more preferably from 1 µm to 15 µm.

Such a solid lubricant as described above may be added in an amount of from 10 to 120 parts based on 100 parts by weight of the binder resin, to bring about particularly preferable results. More specifically, if it is added in an amount of more than 120 parts by weight, the resin layer may have a low strength and the charge quantity of the toner may be reduced. If on the other hand it is added in an amount of less than 10 parts by weight, the effect of preventing the toner from adhering to the resin layer surface of the developer carrying member of the present invention may decrease, e.g., when used over a long period of time.

In the present invention, in order to control the volume resistivity of the resin layer formed on the substrate surface, the binder resin may dispersedly be incorporated with conductive fine particles in addition to the solid lubricant. Such conductive fine particles used here may preferably be those having a number-average particle diameter of 20 µm or less. Those of 10 µm or less are more preferred. In order to prevent formation of unevenness on the surface, it is preferable to use those of 1 µm or less.

The conductive fine particles usable in the present invention may include, e.g., carbon black such as furnace black, lamp black, thermal black, acetylene black and channel black; particles of metal oxides such as titanium oxide, tin oxide, zinc oxide, molybdenum oxide, potassium titanate, antimony oxide and indium oxide; particles of metals such as aluminum, copper, silver and nickel; graphite particles; and inorganic fillers such as metal fibers and carbon fibers. The above conductive fine particles may be added in an amount of 100 parts by weight or less based on 100 parts by weight of the binder resin. Their addition in such an amount range brings about particularly favorable results. More specifically, if their addition is in an amount of more than 100 parts by weight, the resin layer may have a low strength and the charge quantity of the toner may be reduced.

With a preferable constitution of the resin layer of the developer carrying member according to the present invention, in addition to the additives described above, particles for forming unevenness on the surface of the resin layer formed by coating which have a number-average particle diameter of from 0.3 µm to 30 µm may further be dispersed in the resin layer so as to stabilize the surface roughness of the developer carrying member and optimize the toner coating level on the developer carrying member, thereby making it possible to sufficiently bring out the triboelectric charge providing effect due to the copolymer of the vinyl type polymerizable monomer and the sulfonic-acid or sulfonate-containing acrylamide type monomer. Such particles exhibit the effect of keeping the uniform surface roughness of the resin layer surface of the developer carrying member, and at the same time, the effect of reducing a change in the surface roughness even where the resin layer surface has worn, and the effect of preventing contamination by toner and melt adhesion of toner from easily occurring.

The above particles used to form unevenness on the surface of the resin layer formed on the substrate surface, constituting the developer carrying member of the present invention, have a number-average particle diameter of from 0.3 µm to 30 µm, and preferably from 2 µm to 20 µm may be used. Particles having a number-average particle diameter of less than 0.3 µm are not preferable because the uniform roughness may not effectively be imparted to the surface of the resin layer, the charging performance may not effectively be improved, the rapid and uniform charging of the developer may be insufficient, and charge-up of toner, contamination by toner and melt adhesion of toner may occur due to wear of the resin layer to tend to cause serious ghosts and a decrease in image density. Those having a number average particle diameter of more than 30 µm are also not preferable because the resin layer may have an excessively rough surface to make it difficult for the toner to be sufficiently charged and may be reduced in mechanical strength.

In the present invention, the particles for forming unevenness on the resin layer surface may preferably be spherical particles. The terms "spherical particles" refer to particles having a length/breadth ratio of from 1.0 to 1.5. In the present invention, it is preferable to use particles having a length/breadth ratio of from 1.0 to 1.2. If the spherical particles have a length/breadth ratio of more than 1.5, the surface roughness of the resin layer may become non-uniform. This is not preferable in view of rapid and uniform charging of the toner and strength of the conductive resin layer.

More preferably, the spherical particles may have a true density of 3 g/cm³ or less, preferably 2.7 g/cm³ or less, and more preferably from 0.9 to 2.3 g/cm³. More specifically, if the spherical particles have a true density of more than 3 g/cm³, the dispersibility of the spherical particles in the resin layer may be insufficient to make it difficult to impart a uniform roughness to the surface of the resin layer, and besides, since the resin layer coating material may not be good in storage stability, it is difficult to obtain a triboelectric charge providing member surface which has a uniform surface unevenness. Also in the case where the true density is less than 0.9 g/cm³, the spherical particles have insufficient dispersibility and storage stability in the resin layer.

As the spherical particles used in the present invention, known spherical particles may be used. For example, they may include spherical resin particles, spherical metal oxide particles and spherical carbide particles. As the spherical resin particles, the following are usable, e.g., spherical resin particles obtained by suspension polymerization, dispersion polymerization or the like. In particular, the use of such spherical resin particles is preferable because the surface of the developer carrying member can have a favorable surface roughness and can readily have a more uniform surface state. Such spherical resin particles may include, e.g., particles of acrylic resins such as polyacrylate and polymethacrylate, particles of polyamide resins such as nylon, particles of polyolefin resins such as polyethylene and polypropylene, silicone resin particles, phenol resin particles, polyurethane resin particles, styrene resin particles and benzoguanamine particles. Resin particles obtained by pulverization may also be used after they have been subjected to thermal or physical sphering treatment.

The spherical resin particles enumerated above may also be used after an inorganic fine powder has adhered to their surfaces. The inorganic fine powder usable here may include fine powders of oxides such as $SiO_2$, $SrTiO_3$, $CeO_2$, CrO, $Al_2O_3$, ZnO and MgO; nitrides such as $Si_3N_4$; carbides such as SiC; sulfates such as $CaSO_4$ and $BaSO_4$; and carbonates such as $CaCO_3$. Such inorganic fine powder may be one having been subjected to organic treatment with a coupling agent.

In particular, for the purpose of improving adhesion to the binder resin, for the purpose of imparting hydrophobicity to its particles, and so forth, it is preferable to use an inorganic fine powder having been treated with a coupling agent. The coupling agent used here may include a silane coupling agent, a titanium coupling agent and a zircoaluminate coupling agent. More specifically, for example, the silane coupling agent may include hexamethyldisilazane, trimethylsilane, trimethylchlorosilane, trimethylethoxysilane, dimethyldichlorosilane, methyltrichlorosilane, allyldimethylchlorosilane, allylphenyldichlorosilane, benzyldimethylchlorosilane, bromomethyldimethylchlorosilane, α-chloroethyltri-chlorosilane, β-chloroethyltrichlorosilane, chloromethyldimethylchlorosilane, triorganosilyl mercaptan, trimethylsilyl mercaptan, triorganosilyl acrylate, vinyldimethylacetoxysilane, dimethyldiethoxysilane, dimethyldimethoxysilane, diphenyldiethoxysilane, hexamethyldisiloxane, 1,3-divinyltetramethyldisiloxane, 1,3-diphenyltetramethyldisiloxane, and a dimethylpolysiloxane having 2 to 12 siloxane units per molecule and containing a hydroxyl group bonded to each silicon atom in its units positioned at the terminals.

By using the spherical resin particles and the like to whose surfaces the inorganic fine powder treated with such a coupling agent has adhered, it is possible to improve the dispersibility of the spherical particles into coating materials, uniformity and stain resistance of the surface of the resin layer to be formed, charge-providing performance to the toner, wear resistance of the resin layer, and so forth.

The spherical particles constituted as described above, used in the present invention, may more preferably be those having conductivity. More specifically, with the spherical particles having conductivity, electric charges are not easy to accumulate on the particle surfaces on account of the conductivity. Hence, toner adhesion to the developing sleeve surface can be reduced, and the charge-providing performance to toner can be improved. In the present invention, as the conductivity, the spherical particles may preferably have a volume resistivity of $10^6$ Ωcm or less, and more preferably from $10^{-3}$ to $10^6$ Ωcm. More specifically, if the spherical particles have a volume resistivity of more than $10^6$ Ωcm, spherical particles laid bare on the surface of the resin resin layer as a result of wear become partially insulative, and hence may serve as nuclei around which toner contamination and melt adhesion tend to occur and make it difficult to achieve rapid and uniform charging.

As methods for obtaining conductive spherical particles preferably usable in the present invention, the following may be cited. In order to obtain particularly preferable conductive spherical particles used in the present invention, a method is available in which spherical resin particles or mesocarbon microbeads are fired and carbonized and/or graphitized to obtain spherical carbon particles having a low density and a good conductivity. The resin material used for the spherical resin particles may include, e.g., phenol resins, naphthalene resins, furan resins, xylene resins, divinylbenzene polymers, styrene-divinylbenzene copolymers, and polyacrylonitrile. The mesocarbon microbeads may usually be produced by subjecting spherical crystals formed in the course of heating and firing a mesopitch, to washing with a large quantity of tar or a solvent such as middle oil or quinoline.

In order to obtain more preferable conductive spherical particles, a method is available in which a bulk-mesophase pitch is applied on the surfaces of spherical resin particles such as phenol resin, naphthalene resin, furan resin, xylene resin, divinylbenzene polymer, styrene-divinylbenzene copolymer or polyacrylonitrile particles by a mechanochemical method, and the particles thus obtained are heated in an oxidative atmosphere, followed by firing for carbonization and/or graphitization, producing conductive spherical carbon particles.

The conductive spherical carbon particles obtained by the above methods may preferably be used as the spherical particles having conductivity that are used in the present invention because, in any of the above methods, the conductivity of the spherical carbon particles to be obtained can be controlled to a certain extent by changing conditions for firing. Also, in order to more improve the conductivity, the spherical carbon particles obtained by the above methods may optionally be coated with a conductive metal and/or a metal oxide to such an extent that the true density of the conductive spherical particles does not exceed 3 g/cm³.

In order to obtain the conductive spherical particles preferably used in the present invention, another method is available in which, together with core particles composed of spherical resin particles, conductive fine particles having smaller particle diameters than the core particles are mechanically mixed in a suitable mixing ratio to allow the conductive fine particles to adhere uniformly to the peripheries of the core particles by the action of van der Waals force and electrostatic force, and thereafter the surfaces of the core particles are softened by local temperature rise caused by, e.g., applying mechanical impact force so that the conductive fine particles are formed into coatings on the core particle surfaces, obtaining conductive-treated spherical resin particles.

As the above core particles, it is preferable to use spherical resin particles comprised of an organic compound and having a small true density. The resin therefor may include, e.g., PMMA, acrylic resin, polybutadiene resin, polystyrene resin, polyethylene, polypropylene, polybutadiene, or copolymers of any of these, benzoguanamine resin, phenol resins, polyamide resins, nylons, fluorine resins, silicone resins, epoxy resins and polyester resins. As the conductive fine particles (small particles) used when they are formed into coatings on the surfaces of the core particles (base particles), it is preferable to use small particles having a particle diameter of ⅛ or less of the base particles so that the coatings of conductive fine particles can uniformly be provided.

In order to obtain the conductive spherical particles usable in the present invention, still another method is available in which the conductive fine particles are uniformly dispersed in spherical resin particles to produce conductive spherical particles with the conductive fine particles dispersed therein. As a method for uniformly dispersing the conductive fine particles in the spherical resin particles, the following are available, e.g., a method in which a binder resin and the conductive fine particles are kneaded to disperse the latter conductive fine particles in the former, and thereafter the resulting product is cooled to solidify and then pulverized into particles having a stated particle diameter, followed by mechanical treatment and thermal treatment to produce the conductive fine particles; and a method in which a polymerization initiator, the conductive fine particles and other additives are added to polymerizable monomers and uniformly dispersed therein by means of a dispersion machine to prepare a monomer composition, and the monomer composition is stirred by means of a stirrer to generate particles having a given particle diameter in an aqueous phase containing a dispersion stabilizer, followed by suspension polymerization to produce spherical particles with conductive fine particles dispersed therein.

The conductive spherical particles with the conductive fine particles dispersed therein, obtained by the various methods as described above may further mechanically be mixed with the above conductive fine particles having smaller particle diameters than the core particles in a suitable mixing ratio to allow the conductive fine particles to uniformly adhere to the peripheries of the conductive spherical particles by the action of van der Waals force and electrostatic force, and thereafter the surfaces of the conductive spherical particles with the conductive fine particles dispersed therein are softened by, e.g., local temperature rise caused by applying mechanical impact force so that the conductive fine particles are formed into coatings on the conductive spherical particle surfaces, obtaining spherical resin particles with a higher conductivity.

In the present invention, the number-average particle diameter is measured with Multisizer Model II (manufactured by Coulter) in which a 100 μm aperture (a 50 μm aperture for particles of 3.0 μm or smaller) is set. The particle diameter of the conductive particles is measured with a particle size distribution meter LS-130 Model (manufactured by Coulter) in which a liquid module is set.

The material which is added to the resin layer forming the surface of the developer carrying member according to the present invention to provide the resin layer with conductivity may include commonly known conductive fine powders. For example, such material may include, e.g., powders of metals such as copper, nickel, silver and aluminum or alloys thereof; powders of metal oxides such as antimony oxide, indium oxide, tin oxide and titanium oxide; and conductive fine powders of carbon types such as carbon fiber, carbon black and graphite. The amount of the conductive fine powder may differ depending on a developing system, and when a one-component insulating developer is used in jumping development, it is preferable that the conductive fine powder is added in such an amount as to provide the conductive resin layer with a volume resistivity of $10^3$ Ωcm or less. Carbon black, in particular, conductive amorphous carbon is preferred because it has especially a superior electrical conductivity, may be added in a smaller amount than other substances to provide conductivity, and can attain any desired conductivity to a certain extent by controlling its addition amount.

The developer held on the developer carrying member of the present invention, constituted as described above, is described below. The toner constituting the developer is a fine colored resin powder obtained by primarily melt-kneading a binder resin, a release agent, a charge control agent, a colorant and so forth, and solidifying the kneaded product, followed by pulverization and classification to render particle size distribution uniform.

As the binder resin used in the toner, commonly known binder resins may be used. For example, they may include homopolymers of styrene and styrene derivatives, such as styrene, α-methylstyrene and p-chlorostyrene; styrene copolymers such as a styrene-propylene copolymer, a styrene-vinyltoluene copolymer, a styrene-ethyl acrylate copolymer, a styrene-butyl acrylate copolymer, a styrene-octyl acrylate copolymer, a styrene-dimethylaminoethyl copolymer, a styrene-methyl methacrylate copolymer, a styrene-ethyl methacrylate copolymer, a styrene-butyl methacrylate copolymer, a styrene-dimethylaminoethyl methacrylate copolymer, a styrene-methyl vinyl ether copolymer, a styrene-methyl vinyl ketone copolymer, a styrene-butadiene copolymer, a styrene-isoprene copolymer, a styrene-maleic acid copolymer, and a styrene-maleic acid ester copolymer; polymethyl methacrylate, polybutyl methacrylate, polyvinyl acetate, polyethylene, polypropylene, polyvinyl butyral, polyacrylic resins, rosin, modified rosins, terpene resins, phenol resins, aliphatic or alicyclic hydrocarbon resins, and aromatic petroleum resins. Any of these may be used alone or in the form of a mixture.

The toner may also be incorporated with a pigment as the colorant. As the pigment, the following are usable, e.g., carbon black, Nigrosine dyes, lamp black, Sudan Black SM, Fast Yellow G, Benzidine Yellow, Pigment Yellow, Indian First Orange, Irgazine Red, Para Nitraniline Red, Toluidine Red, Carmine. FB, Permanent Bordeaux FRR, Pigment Orange R, Lithol Red 2G, Lake Red 2G, Rhodamine FB, Rhodamine B Lake, Methyl Violet B Lake, Phthalocyanine Blue, Pigment Blue, Brilliant Green B, Phthalocyanine Green, Oil Yellow GG, Zapon First Yellow CGG, Kayaset Y963, Kayaset YG, Zapon First Orange RR, Oil Scarlet, Aurazole Brown B, Zapon First Scarlet CG, and Oil Pink OP.

To use the toner as a magnetic toner, a magnetic powder is incorporated in toner particles. As the magnetic powder, a material magnetizable when placed in a magnetic field is used. The magnetic powder may include, e.g., powders of ferromagnetic metals such as iron, cobalt and nickel; and powders of alloys or compounds such as magnetite, hematite and ferrite. Any of these magnetic powders may preferably be in a content of from 15 to 70% by weight based on the weight of the toner.

For the purpose of improving releasability at the time of fixing and fixing performance, the toner may also be incorporated with a wax. Such a wax may include paraffin wax and derivatives thereof, microcrystalline wax and derivatives thereof, Fischer-Tropsch wax and derivatives thereof, polyolefin wax and derivatives thereof, and carnauba wax and derivatives thereof. Here, the derivatives may include oxides, block copolymers with vinyl monomers, and graft modified products. Besides, the wax may include alcohols, fatty acids, acid amides, esters, ketones, hardened caster oil and derivatives thereof, vegetable waxes, animal waxes, mineral waxes, and petrolatum.

A charge control agent may further optionally be incorporated in the toner particles. The charge control agent includes negative charge control agents and positive charge control agents. Those capable of controlling the toner to be negatively chargeable may include substances shown below. For example, organic metal complexes or chelate compounds are effective, which may include monoazo metal complexes, acetylacetone metal complexes, metal complexes of aromatic hydroxycarboxylic acids or aromatic dicarboxylic acids. Besides, they may include aromatic hydroxycarboxylic acids, aromatic mono- or polycarboxylic acids and metal salts, anhydrides or esters thereof, and phenol derivatives such as bisphenol.

Substances capable of controlling the toner to be positively chargeable may also include those shown below. For example, they may include Nigrosine and modified products of Nigrosine, modified with a fatty acid metal salt; quaternary ammonium salts such as tributylbenzylammonium 1-hydroxy-4-naphthosulfonate and tetrabutylammonium teterafluoroborate, and analogues of these, including onium salts such as phosphonium salts, and lake pigments of these (lake-forming agents may include tungstophosphoric acid, molybdophosphoric acid, tungstomolybdophosphoric acid, tannic acid, lauric acid, gallic acid, ferricyanides and ferrocyanides); metal salts of higher fatty acids; diorganotin oxides such as dibutyltin oxide, dioctyltin oxide and dicyclohexyltin oxide; diorganotin borates such as dibutyltin borate, dioctyltin borate and dicyclohexyltin borate; guanidine compounds, and imidazole compounds.

For the purposes of improving fluidity and so forth, powder such as an inorganic fine powder may further optionally externally be added to the toner particles (toner base particles). Such a fine powder may include, e.g., inorganic fine powders such as fine silica powder; fine powders of metal oxides such as alumina, titania, germanium oxide and zirconium oxide; fine powders of carbides such as silicon carbide and titanium carbide; and fine powders of nitrides such as silicon nitride and germanium nitride. These inorganic fine powders may further be subjected to organic treatment with an organosilicon compound, a titanium coupling agent or the like. The organosilicon compound usable here may include hexamethyldisilazane, trimethylsilane, trimethylchlorosilane, trimethylethoxysilane, dimethyldichlorosilane, methyltrichlorosilane, allyldimethylchlorosilane, allylphenyldichlorosilane, benzyldimethylchlorosilane, bromomethyldimethylchlorosilane, α-chloroethyltrichlorosilane, β-chloroethyltrichlorosilane, chloromethyldimethylchlorosilane, triorganosilyl mercaptan, trimethylsilyl mercaptan, triorganosilyl acrylate, vinyldimethylacetoxysilane, dimethylethoxysilane, dimethyldimethoxysilane, diphenyldiethoxysilane, hexamethyldisiloxane, 1,3-divinyltetramethyldisiloxane, 1,3-diphenyltetramethyldisiloxane, and a dimethylpolysiloxane having 2 to 12 siloxane units per molecule and containing a hydroxyl group bonded to each Si in its units positioned at the terminals.

Those obtained by treating untreated fine powders with a nitrogen-containing silane coupling agent are also usable. They are favorable especially in the case of positive toners. Examples of such a treating agent may include aminopropyltrimethoxysilane, aminopropyltriethoxysilane, dimethylaminopropyltrimethoxysilane, diethylaminopropyltrimethoxysilane, dipropylaminopropyltrimethoxysilane, dibutylaminopropyltrimethoxysilane, monobutylaminopropyltrimethoxysilane, dioctylaminopropyltrimethoxysilane, dibutylaminopropyldimethoxysilane, dibutylaminopropylmonomethoxysilane, dimethylaminophenyltriethoxysilane, trimethoxysilyl-γ-propylphenylamine, trimethoxysilyl-γ-propylbenzylamine, trimethoxysilyl-γ-propylpiperidine, trimethoxysilyl-γ-propylmorpholine, and trimethoxysilyl-γ-propylimidazole.

As methods by which the inorganic fine powder is treated with the silane coupling agent of various types as shown above, the following are available: 1) spraying, 2) organic solvent treatment and 3) aqueous-solution treatment. The treatment by spraying is carried out commonly by a method in which the inorganic fine powder is agitated and an aqueous solution or solvent solution of the coupling agent is sprayed on the powder being agitated, followed by drying at about 120° C. to 130° C. to remove the water or solvent. The treatment by the organic solvent treatment is carried out by a method in which the coupling agent is dissolved in an organic solvent (e.g., alcohol, benzene, or halogenated hydrocarbons) containing a hydrolysis catalyst together with a small quantity of water, and the inorganic fine powder is immersed in the resultant solution, followed by filtration or pressing to effect solid-liquid separation and then drying at about 120° C. to 130° C. The aqueous solution treatment is carried out by a method in which about 0.5% of the coupling agent is hydrolyzed in water or in a water-solvent mixture with a stated pH and the inorganic fine powder is immersed in the resultant hydrolyzate, followed by solid-liquid separation and then drying.

Another method making use of organic treatment may be carried out using a fine powder treated with a silicone oil. The preferred silicone oil usable here may include silicone oils having a viscosity at 25° C. of from about 0.5 to 10,000 mm$^2$/s, and preferably from 1 to 1,000 mm$^2$/s. Such silicone oils may include, e.g., methylhydrogensilicone oil, dimethylsilicone oil, phenylmethylsilicone oil, chlorophenylmethylsilicone oil, alkyl-modified silicone oil, fatty-acid-modified silicone oil, polyoxyalkylene-modified silicone oil and fluorine-modified silicone oil. A silicone oil having a nitrogen atom in its side chain may also be used.

Especially in the case of positive toners, it is preferable to use those having been subjected to organic treatment with the silicone oil. The treatment with silicone oil may be carried out, e.g., in the following way. The inorganic fine powder is optionally vigorously agitated with heating, and the above silicone oil or its solution is sprayed, or vaporized and then sprayed, or the inorganic fine powder is made into a slurry and the silicone oil or its solution is dropwise added thereto while stirring the slurry. According to such methods, the treatment can be easily carried out. Any of these silicone oils may be used alone or in the form of a mixture of two or more kinds, or after subjected to multiple treatment. This treatment may also be carried out in combination with treatment with the silane coupling agent.

The toner particles (toner base particles) formed as described previously may be used after they have further been subjected to spherical treatment or surface-smoothing treatment, which is preferable because the transfer performance is improved. As method for carrying out such spherical treatment or surface-smoothing treatment, the following are available: a method in which, using an apparatus having an agitation element or blade and a liner or casing, toner particles are allowed to pass through a micro-gap between the blade and the liner, where the surfaces of toner particles are smoothened, or toner particles are rendered spherical, by a mechanical force; a method in which toner particles are suspended in hot water to be rendered spherical; and a method in which toner particles are exposed to a hot-air stream to be rendered spherical.

For producing spherical toner particles, a method is available in which, e.g., a mixture composed chiefly of monomers for forming the binder resin of the toner is suspended in water and the monomers are polymerized to prepare toner particles. A commonly available method is one in which, e.g., a polymerizable monomer, a colorant, a polymerization initiator, and optionally a cross-linking agent, a charge control agent, a release agent and other additives are uniformly dissolved or dispersed to prepare a polymerizable monomer composition, and thereafter this polymerizable monomer composition is dispersed by means of a suitable stirrer in a continuous phase, e.g., an aqueous phase containing a dispersion stabilizer, to generate particles with a proper particle diameter, where polymerization reaction is carried out to produce a toner composed of toner particles having a desired particle diameter.

An example of the developing assembly of the present invention in which the developer carrying member of the present invention is installed to constitute the apparatus is described below with reference to the drawing. FIGURE is a schematic structural view showing an example of the developing assembly of the present invention.

As shown in FIGURE, a latent image bearing member, e.g., an electrophotographic photosensitive drum 7, holding thereon an electrostatic latent image formed by a known process is rotated in the direction of an arrow B. A developing sleeve 14 as the developer carrying member holds thereon, e.g., a one-component type developer, magnetic toner 10 fed through a hopper 9 serving as the developer container, and is rotated in the direction of an arrow A. Thus, the magnetic toner 10 is transported to a developing area D (developing zone) where the developing sleeve 14 and the photosensitive drum 7 face each other. Inside the developing sleeve 14, a magnet 11 is provided so that the magnetic toner 10 is magnetically attracted and held onto the developing sleeve 14. The magnetic toner 10 held on such a developing sleeve 14 obtains triboelectric charges which can develop the electrostatic latent image on the photosensitive drum 7, as a result of friction with the developing sleeve 14.

In the developing assembly exemplified in FIG. 1, in order to control the layer thickness of the magnetic toner 10 transported to the developing zone D, a control blade 8 made of a ferromagnetic metal and serving as the developer layer thickness control member, extends downwards vertically from the hopper 9, in such a manner as to approach the developing sleeve 14, leaving a gap of about 200 to 300 µm wide between them. Thus, the magnetic line of force generated from a magnetic pole N1 of the magnet 11 in the developing sleeve 14 converges on the blade 8 to form on the developing sleeve 14 a thin layer of the magnetic toner 10. In addition, a non-magnetic blade may also be used as the blade 8.

In the present invention, the thickness of the thin layer of the magnetic toner 10, thus formed on the developing sleeve 14, may preferably be much smaller than the minimum gap between the developing sleeve 14 and the photosensitive drum 7 at the developing zone D. The present invention is especially effective in the developing assembly of the type in which the electrostatic latent image is developed through such a toner thin layer, i.e., a non-contact type developing assembly. However, of course, the developing assembly of the present invention may also be used in a developing assembly of the type in which the thickness of the toner layer is larger than the minimum gap between the developing sleeve 14 and the photosensitive drum 7 at the developing zone D, i.e., a contact type developing assembly. To avoid complicacy of description, the non-contact developing assembly is taken as an example in the following description.

In the developing sleeve 14 preferred in the present invention, constituted as described above, in order to attract the magnetic toner 10 held on its surface, a development bias voltage is applied through a power source 15. In the present invention, when a DC voltage is used as this development bias voltage, a voltage having a value intermediate between the potential at electrostatic latent image areas (the region rendered visible upon attraction of the magnetic toner 10) and the potential at back ground areas may preferably be applied to the developing sleeve 14. In order to enhance the density of developed images or improve the gradation thereof, an alternating bias voltage may be applied to the developing sleeve 14 to generate in the developing zone D a vibrating electric field whose direction alternately reverses. In such a case, an alternating bias voltage formed by superimposing the DC voltage component having a value intermediate between the potential at image areas and the potential at back ground areas may preferably be applied to the developing sleeve 14.

In the case of what is called regular development, where a toner is attracted to high-potential areas of an electrostatic latent image having high-potential areas and low-potential areas, a toner charged at a polarity reverse to the polarity of the electrostatic latent image may preferably be used. On the other hand, in the case of what is called reverse development, where a toner is attracted to low-potential areas of the electrostatic latent image, a toner charged at the same polarity as the polarity of the electrostatic latent image may preferably be used. In addition, what is meant by the high-potential areas or the low-potential areas refers to the absolute value. In any case, the magnetic toner 10 is charged electrostatically at the polarity for developing the electrostatic latent image, upon friction with the developing sleeve 14. Silica added externally to the magnetic toner 10 is also charged upon friction with the developing sleeve 14. Reference numeral 13 denotes the resin layer; and 16, an agitator.

EXAMPLES

The present invention is described below in greater detail by giving working examples. First, production processes for polymers used in Examples are shown below (Preparation Examples A to I).

Thereafter, the utility of the present invention is demonstrated by Examples 1 to 48 while giving Comparative Examples.

The polymers or compounds according to the present invention and production processes for these are by no means limited only to the following working examples.

In addition, "%" and "parts" shown in Preparation Examples and Examples are % by weight and part(s) by weight in all occurrences.

In the following experiments, the structures of polymers obtained were, unless particularly noted, determined by NMR (FT-NMR: Bruker DPX400; resonance frequency: 400 MHz; measurement nuclei species: $^1$H; measurement temperature: room temperature) measurement, using DMSO-$d_6$ (dimethyl sulfoxide) as the solvent.

Analyses were also made on Fourier transformation-infrared absorption (FT-IR) spectra (Nicolet AVATAR360 FT-IR).

Average molecular weights of polymers obtained were evaluated by gel permeation chromatography (GPC; Toso Corporation; columns; Polymer Laboratories PLgel 5μ MIXED-C; solvent: DMF/LiBr 0.1% (w/v); in terms of polystyrene)

As to acid value titration, a potential difference titrator AT510 (manufactured by Kyoto Electronics Manufacturing Co., Ltd.) was used.

Preparation Example A-1

With reference to Makromol. Chem, 186, 1711-1720 (1985), a polymer (Copolymer) containing units represented by the following Formula (A-0):

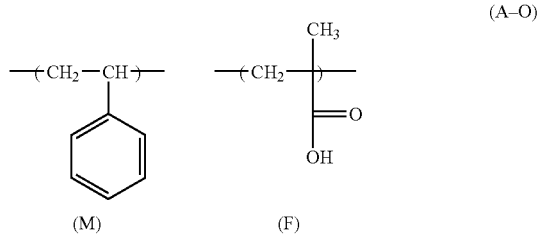

in a content ratio (mole %) of (M):(F)=90:10 was synthesized and used in the following experiment.

In an atmosphere of nitrogen, 1.4998 g of this raw-material polymer and 1.3710 g of p-toluidine-2-sulfonic acid were put into a 200 ml three-necked flask, and 56.5 ml of pyridine was added, which were then stirred, and thereafter 3.84 ml of triphenyl phosphite was added and heated at 120° C. for 6 hours. After the reaction was completed, the reaction product was re-precipitated in 565 ml of ethanol and then collected. The polymer obtained was washed with 1N hydrochloric acid for a day, and thereafter washed by stirring in water for a day, followed by drying under reduced pressure.

As a result of IR (infrared absorption spectroscopy) measurement, a peak at 1,695 cm$^{-1}$ due to the carboxylic acid was seen to decrease and newly a peak due to the amide group was seen at 1,658 cm$^{-1}$.

From the results of $^1$H-NMR, it was ascertained that, since a peak due to the methyl group of the p-toluidine-2-sulfonic acid had shifted, the polymer obtained was a polymer (copolymer) containing 10 mole % of a unit represented by the following formula (A-1).

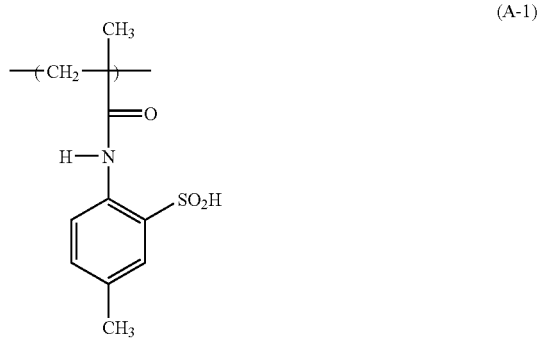

The polymer obtained had an average molecular weight of: number-average molecular weight Mn=22,000 and weight-average molecular weight Mw=56,000.

Preparation Example A-2

0.9980 g of the polymer having the unit represented by the chemical formula (A-1), obtained in Preparation Example A-1, was put into a 300 ml round-bottomed flask, and 70 ml of chloroform and 17.5 ml of methanol were added to dissolve it, followed by cooling to 0° C. To the resultant mixture, 4.89 ml of a 2 mol/l trimethylsilyldiazomethane-hexane solution (available from Aldrich Chemical Co., Inc.) was added, and stirred for 4 hours. After the reaction was completed, the solvent was distilled away by means of an evaporator, and thereafter the polymer obtained was collected. Further, 70 ml of chloroform and 17.5 ml of methanol were added to dissolve the polymer again, and then the solvent was distilled away by means of the evaporator. This procedure was repeated three times. The polymer collected here was dried under reduced pressure to yield 0.9772 g of a polymer.

From the results of $^1$H-NMR, it was ascertained that, since a peak due to methyl sulfonate was seen at 3 to 4 ppm, the polymer obtained was a polymer (copolymer) containing 10 mole % of a unit represented by the following formula (A-2).

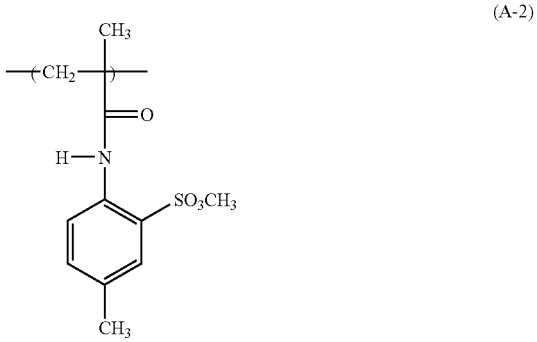

Acid value titration revealed that the sulfonic acid was transformed into methyl sulfonate because no equivalent point derived from the sulfonic acid was observed.

The polymer obtained had an average molecular weight of: number-average molecular weight Mn=22,000 and weight-average molecular weight Mw=54,000. A series of preparation procedures was scaled up to produce the polymer in a large quantity, which was designated as Polymer (a).

Preparation Example B-1

The same raw-material polymer as in Preparation Example A-1 was used.

In an atmosphere of nitrogen, 1.5052 g of the raw-material polymer and 1.1200 g of 2-amino-2-methylpropanesulfonic acid were put into a 200 ml three-necked flask, and 56.5 ml of pyridine was added and stirred, and thereafter 3.84 ml of triphenyl phosphite was added and heated at 120° C. for 6 hours. After the reaction was completed, the reaction product was re-precipitated in 565 ml of ethanol and then collected. The polymer obtained was washed with 1N hydrochloric acid for a day, and thereafter washed by stirring in water for a day, followed by drying under reduced pressure.

As a result of IR measurement, a peak at 1,695 cm$^{-1}$ due to the carboxylic acid was seen to decrease and newly a peak due to the amide group was seen at 1,668 cm$^{-1}$.

From the results of ¹H-NMR, it was ascertained that, since a peak due to the methyl group of the 2-amino-2-methylpropanesulfonic acid had shifted, the polymer obtained was a polymer (copolymer) containing 8 mole % of a unit represented by the following formula (B-1).

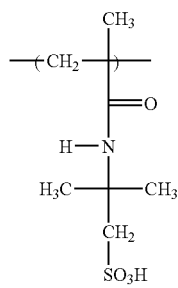

(B-1)

The polymer obtained had an average molecular weight of: number-average molecular weight Mn=20,000 and weight-average molecular weight Mw=46,000.

Preparation Example B-2

0.9985 g of the polymer having the unit represented by the chemical formula (B-1), obtained in Preparation Example B-1, was put into a 300 ml round-bottomed flask, and 70 ml of chloroform and 17.5 ml of methanol were added to dissolve it, followed by cooling to 0° C. To the resultant mixture, 4.89 ml of a 2 mol/l trimethylsilyldiazomethane-hexane solution (available from Aldrich Chemical Co., Inc.) was added, and stirred for 4 hours. After the reaction was completed, the solvent was distilled away by means of an evaporator, and thereafter the polymer obtained was collected. Further, 70 ml of chloroform and 17.5 ml of methanol were added to dissolve the polymer again, and then the solvent was distilled away by means of the evaporator. This procedure was repeated three times. The polymer collected here was dried under reduced pressure to obtain 0.9350 g of a polymer.

From the results of ¹H-NMR, it was ascertained that, since a peak due to methyl sulfonate was seen at 3 to 4 ppm, the polymer obtained was a polymer (copolymer) containing 8 mole % of a unit represented by the following formula (B-2).

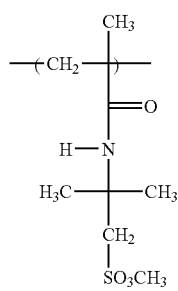

(B-2)

Acid value titration revealed that the sulfonic acid was transformed into methyl sulfonate because no equivalent point derived from the sulfonic acid was observed.

The polymer obtained had an average molecular weight of: number-average molecular weight Mn=18,000 and weight-average molecular weight Mw=38,000. A series of preparation procedures was scaled up to obtain the polymer in a large quantity, which was designated as Polymer (b).

Preparation Example C-1

The same raw-material polymer as in Preparation Example A-1 was used.

In an atmosphere of nitrogen, 1.5060 g of this raw-material polymer and 1.6342 g of 1-naphthylamine-8-sulfonic acid were put into a 200 ml three-necked flask, and 56.5 ml of pyridine was added and stirred, and thereafter 3.84 ml of triphenyl phosphite was added. These were heated at 120° C. for 6 hours. After the reaction was completed, the reaction product was re-precipitated in 565 ml of ethanol and then collected. The polymer obtained was washed with 1N hydrochloric acid for a day, and thereafter washed by stirring in water for a day, followed by drying under reduced pressure.

As a result of IR measurement, a peak at 1,695 cm⁻¹ due to the carboxylic acid was seen to decrease and newly a peak due to the amide group was seen at 1,658 cm⁻¹.

From the results of ¹H-NMR, it was ascertained that, since a peak due to the naphthyl structure of the 1-naphthylamine-8-sulfonic acid had shifted, the polymer obtained was a polymer (copolymer) containing 7 mole % of a unit represented by the following formula (C-1).

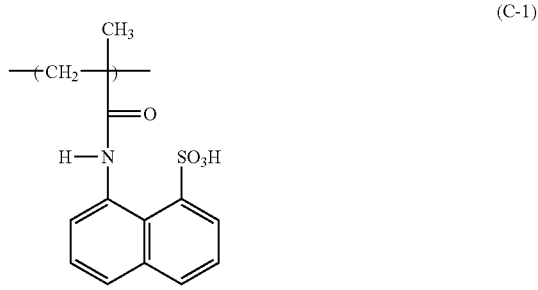

(C-1)

The polymer obtained had an average molecular weight of: number-average molecular weight Mn=21,000 and weight-average molecular weight Mw=48,000.

Preparation Example C-2

1.0025 g of the polymer having the unit represented by the chemical formula (C-1), obtained in Preparation Example C-1, was put into a 300 ml round-bottomed flask, and 70 ml of chloroform and 17.5 ml of methanol were added to dissolve it, followed by cooling to 0° C. To the resultant mixture, 4.89 ml of a 2 mol/l trimethylsilyldiazomethane-hexane solution (available from Aldrich Chemical Co., Inc.) was added, and stirred for 4 hours. After the reaction was completed, the solvent was distilled away by means of an evaporator, and thereafter the polymer obtained was collected. Further, 70 ml of chloroform and 17.5 ml of methanol were added to dissolve the polymer again, and then the solvent was distilled away by means of the evaporator. This procedure was repeated three times. The polymer collected here was dried under reduced pressure to yield 0.9668 g of a polymer.

From the results of ¹H-NMR, it was ascertained that, since a peak due to methyl sulfonate was seen at 3 to 4 ppm, the polymer obtained was a polymer (copolymer) containing 7 mole % of a unit represented by the following formula (C-2).

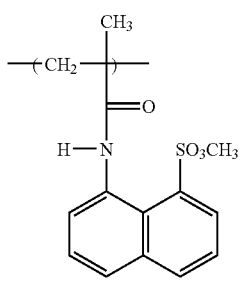

(C-2)

Acid value titration revealed that the sulfonic acid was transformed into methyl sulfonate because no equivalent point derived from the sulfonic acid was observed.

The polymer obtained had an average molecular weight of: number-average molecular weight Mn=20,000 and weight-average molecular weight Mw=46,000. A series of preparation procedures was scaled up to produce the polymer in a large quantity, which was designated as Polymer (c).

Preparation Example D-1

Poly(methyl methacrylate-co-methacrylic acid) available from Aldrich Chemical Co., Inc. was used as a raw-material polymer and dissolved in chloroform, and re-precipitated in methanol, which was repeated three times, and thereafter the polymer obtained was used in reaction.

In an atmosphere of nitrogen, 1.5024 g of the polymer and 3.3612 g of 2-aminobenzenesulfonic acid were put into a 200 ml three-necked flask, and 56.5 ml of pyridine was added and stirred, and thereafter 10.17 ml of triphenyl phosphite was added and heated at 120° C. for 6 hours. After the reaction was completed, the reaction product was re-precipitated in 565 ml of ethanol and then collected. The polymer obtained was washed with 1N hydrochloric acid for a day, and thereafter washed by stirring in water for a day, followed by drying under reduced pressure.

As a result of IR measurement, a peak at 1,695 cm$^{-1}$ due to the carboxylic acid was seen to decrease and a peak due to the amide group newly appeared at 1,658 cm$^{-1}$.

From the results of $^1$H-NMR, it was ascertained that, since a peak due to the aromatic ring of the 2-aminobenzenesulfonic acid structure had shifted, the polymer obtained was a polymer (copolymer) containing 25 mole % of a unit represented by the following formula (D-1)

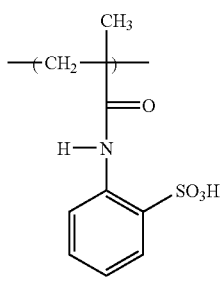

(D-1)

The polymer obtained had an average molecular weight of: number-average molecular weight Mn=14,000 and weight-average molecular weight Mw=33,000.

Preparation Example D-2

1.0020 g of the polymer obtained in Preparation Example D-1 was put into a 300 ml round-bottomed flask, and 70 ml of chloroform and 17.5 ml of methanol was added to dissolve it, followed by cooling to 0° C. To the resultant mixture, 12.94 ml of a 2 mol/l trimethylsilyldiazomethane-hexane solution (available from Aldrich Chemical Co., Inc.) was added and stirred for 4 hours. After the reaction was completed, the solvent was distilled away by means of an evaporator, and thereafter the polymer obtained was collected. Further, 70 ml of chloroform and 17.5 ml of methanol were added to dissolve the polymer again, and then the solvent was distilled away by means of the evaporator. This procedure was repeated three times. The polymer collected here was dried under reduced pressure to yield 0.9445 g of a polymer.

From the results of $^1$H-NMR, it was ascertained that, since a peak due to methyl sulfonate was seen at 3 to 4 ppm, the polymer obtained was a polymer (copolymer) containing 24 mole % of a unit represented by the following formula (D-2).

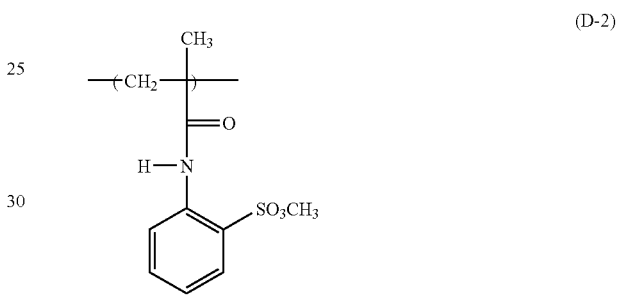

(D-2)

Acid value titration revealed that the sulfonic acid was transformed into methyl sulfonate because no equivalent point derived from the sulfonic acid was observed.

The polymer obtained had an average molecular weight of: number-average molecular weight Mn=13,000 and weight-average molecular weight Mw=32,000. A series of preparation procedures was scaled up to produce the polymer in a large quantity, which was designated as Polymer (d).

Preparation Example E-1

The same raw-material polymer as that in Preparation Example D-1 was used.

In an atmosphere of nitrogen, 1.4889 g of this raw-material polymer and 4.8381 g of 2-aminobenzenesulfonic acid phenyl ester were put into a 200 ml three-necked flask, and 56.5 ml of pyridine was added, which were then stirred, and thereafter 10.17 ml of triphenyl phosphite was added and heated at 120° C. for 6 hours. After the reaction was completed, the reaction product was re-precipitated in 565 ml of ethanol and then collected. The polymer obtained was washed with 1N hydrochloric acid for a day, and thereafter washed by stirring in water for a day, followed by drying under reduced pressure.

As a result of IR measurement, a peak at 1,695 cm$^{-1}$ due to the carboxylic acid was seen to decrease and a peak due to the amide group newly appeared at 1,658 cm$^{-1}$.

From the results of $^1$H-NMR, it was ascertained that, since a peak due to the aromatic ring of the 2-aminobenzenesulfonic acid phenyl ester structure had shifted, the polymer obtained was a polymer (copolymer) containing 22 mole % of a unit represented by the following formula (E-1).

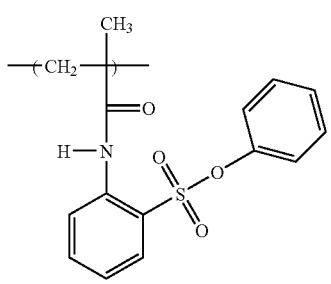

(E-1)

The polymer obtained had an average molecular weight of: number-average molecular weight Mn=13,000 and weight-average molecular weight Mw=33,000. A series of preparation procedures was scaled up to produce the polymer in a large quantity, which was designated as Polymer (e).

Preparation Example F-1

The same raw-material polymer as in Preparation Example D-1 was used.

In an atmosphere of nitrogen, 1.5001 g of this raw-material polymer and 4.3320 g of 2-amino-1-naphthalenesulfonic acid were put into a 200 ml three-necked flask, and 56.5 ml of pyridine was added and stirred, and thereafter 10.17 ml of triphenyl phosphite was added and heated at 120° C. for 6 hours. After the reaction was completed, the reaction product was re-precipitated in 565 ml of ethanol and then collected. The polymer obtained was washed with 1N hydrochloric acid for a day, and thereafter washed by stirring in water for a day, followed by drying under reduced pressure.

As a result of IR measurement, a peak at 1,695 cm$^{-1}$ due to the carboxylic acid was seen to decrease and a peak due to the amide group newly appeared at 1,658 cm$^{-1}$.

From the results of $^1$H-NMR, it was ascertained that, since a peak due to the naphthyl structure of the 2-amino-1-naphthalenesulfonic acid had shifted, the polymer obtained was a polymer (copolymer) containing 20 mole % of a unit represented by the following formula (F-1).

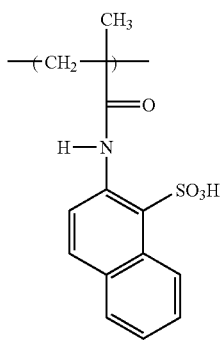

(F-1)

The polymer obtained had an average molecular weight of: number-average molecular weight Mn=12,000 and weight-average molecular weight Mw=34,000.

Preparation Example F-2

0.9879 g of the polymer having the unit represented by the chemical formula (F-1), obtained in Preparation Example F-1, was put into a 300 ml round-bottomed round-bottomed flask, and 70 ml of chloroform and 17.5 ml of methanol were added to dissolve it, followed by cooling to 0° C. To the resultant mixture, 12.94 ml of a 2 mol/l trimethylsilyldiazomethane-hexane solution (available from Aldrich Chemical Co., Inc.) was added, and stirred for 4 hours. After the reaction was completed, the solvent was distilled away by means of an evaporator, and thereafter the polymer obtained was collected. Further, 70 ml of chloroform and 17.5 ml of methanol were added to dissolve the polymer again, and then the solvent was distilled away by means of the evaporator. This procedure was repeated three times. The polymer collected here was dried under reduced pressure to yield 0.9662 g of a polymer.

From the results of $^1$H-NMR, it was ascertained that, since a peak due to methyl sulfonate was seen at 3 to 4 ppm, the polymer obtained was a polymer (copolymer) containing 20 mole % of a unit represented by the following formula (F-2).

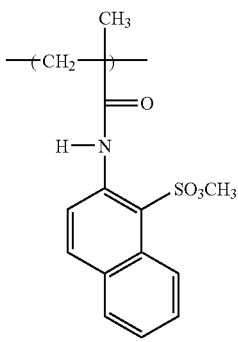

(F-2)

Acid value titration revealed that the sulfonic acid was transformed into methyl sulfonate because no equivalent point derived from the sulfonic acid was observed.

The polymer obtained had an average molecular weight of: number-average molecular weight Mn=11,000 and weight-average molecular weight Mw=32,000. A series of preparation procedures was scaled up to produce the polymer in a large quantity, which was designated as Polymer (f).

Preparation Example G-1

Making reference to JOURNAL OF POLYMER SCIENCE: Polymer Chemistry Edition, 15, pp. 585-591 (1977), a compound represented by the following formula (G-0):

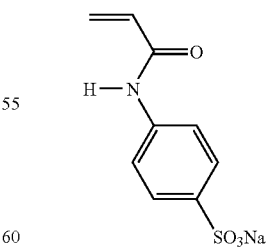

(G-0)

was synthesized, and used in the experiment.

The compound obtained was desalted using an ion-exchanged resin, and making reference to SYNTHETIC COMMUNICATIONS, 15(12), 21, pp. 1057-1062 (1985), a desalted product represented by the following formula (G-1):

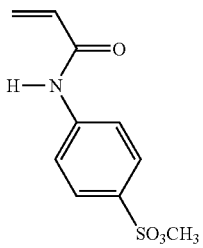

(G-1)

was synthesized.

In an atmosphere of nitrogen, 2.0010 g of the desalted product of the compound represented by the chemical formula (G-0), 20 ml of trimethyl orthoformate and p-benzoquinone as a polymerization inhibitor were put into a flask, and heated at 70° C. for 5 hours. The reaction mixture obtained was cooled, and condensed under reduced pressure. The resultant product was washed with 3 liters of water twice, then washed with 3 liters of hexane twice, thereafter dissolved again in chloroform, and thereafter dried with magnesium sulfuric anhydride, and then the solvent was distilled away.

From the results of $^1$H-NMR, it was revealed that, since a peak due to methyl sulfonate was seen at 3 to 4 ppm, the sulfonic acid turned into methyl sulfonate.

According to elementary analysis, it was suggested that since Na abundance was not more than detection limit, methyl esterification proceeded.

It was further revealed that, since no equivalence point due to sulfonic acid was seen, the sulfonic acid turned into methyl sulfonate.

This monomer was used in the following polymerization.

Preparation Example G-2

0.3015 g of the monomer obtained in Preparation Example G-1 and 2.8 ml of styrene were put into a 30 ml test tube with a joint, and 20 ml of DMSO was added thereto to dissolve them. Then, nitrogen bubbling was carried out for 12 hours to effect deaeration. As an initiator, 41.2 mg of 2,2'-azobis (isobutyronitrile) was dissolved in 5.0 ml of DMSO, and the solution obtained was put into a test tube, followed by stirring with heating at 70° C. After 9 hours, the polymer obtained was re-precipitated with methanol, followed by washing with water to remove unreacted monomers and the homopolymer of the formula (G-1), thus 0.9681 g of a polymer was collected.

From the results of $^1$H-NMR, it was ascertained that the polymer obtained was a polymer (copolymer) containing 5 mole % of a unit represented by the following formula (G-2).

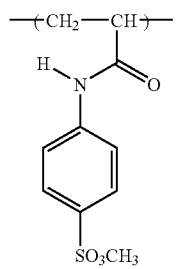

(G-2)

Acid value titration revealed that methyl sulfonate was polymerized without being deesterified because no equivalent point derived from the sulfonic acid was observed. The polymer obtained had an average molecular weight of: number-average molecular weight Mn=10,000 and weight-average molecular weight Mw=22,000.

A series of preparation procedures was scaled up to produce the polymer in a large quantity, which was designated as Polymer (g).

Preparation Example H-0

Making reference to JOURNAL OF POLYMER SCIENCE: Polymer Chemistry Edition, 15, pp. 585-591 (1977), a compound represented by the following formula (H-0):

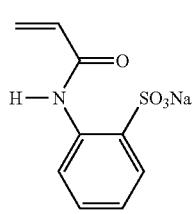

(H-0)

was synthesized.

50 g of the compound of the formula (H-0) 2-aminobenzenesulfonic acid as a raw material was dissolved in 120 ml of ion-exchanged water, and 12 g of sodium hydroxide was added thereto. To the solution obtained, 24.5 g of sodium hydrogencarbonate was added, further 1.8 g of pycric acid was added, and thereafter 26.1 g of acrylic-acid chloride was added. The solution obtained was stirred for 30 minutes, followed by filtration to collect crystals. The crystals were further washed with methanol, thus white crystals were obtained.

The structure of the compound thus obtained was determined by $^1$H-NMR. The monomer obtained here was used in the following polymerization.

Preparation Example H-1

0.3117 g of the monomer obtained in Preparation Example H-0 and 2.7 ml of styrene were put into a 30 ml test tube with a joint, and 20 ml of DMSO was added thereto to dissolve them. Then, nitrogen bubbling was carried out for 12 hours to effect deaeration. As an initiator, 41.2 mg of 2,2'-azobis (isobutyronitrile) was dissolved in 5.0 ml of DMSO, and the solution obtained was put into a test tube, followed by stirring with heating at 70° C. After 9 hours, the polymer obtained was purified using a dialysis membrane, followed by washing with water and hydrochloric acid to remove unreacted monomers and the homopolymer of the formula (H-0), thus 0.9681 g of a polymer was collected.

From the results of $^1$H-NMR, it was ascertained that, since a peak due to the phenyl structure of the compound of the formula (H-0) had shifted, the polymer obtained was a polymer (copolymer) containing units represented by the following formula (H-1):

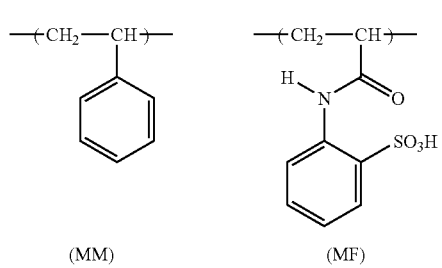

(MM)  (MF)  (H-1)

in a content ratio (mole %) of (MM):(MF)=95:5.

The polymer obtained had average molecular weight of: number-average molecular weight Mn=11,600 and weight-average molecular weight Mw=23,500.

Preparation Example H-2

0.2995 g of the polymer obtained in Preparation Example H-1 was put into a 100 ml round-bottomed flask, and 21 ml of chloroform and 5.25 ml of methanol were added thereto to dissolve it, followed by cooling to 0° C. To the resultant mixture, 0.68 ml of a 2 mol/l trimethylsilyldiazomethane-hexane solution (available from Aldrich Chemical Co., Inc.) was added, and stirred for 4 hours. After the reaction was completed, the solvent was distilled away by means of an evaporator, and thereafter the polymer obtained was collected. Further, 21 ml of chloroform and 5.25 ml of methanol were added to dissolve the polymer again, and then the solvent was distilled away by means of the evaporator. This procedure was repeated three times. The polymer collected here was dried under reduced pressure to yield 0.2880 g of a polymer.

From the results of $^1$H-NMR, it was ascertained that, since a peak due to methyl sulfonate was seen at 3 to 4 ppm, the polymer obtained was a polymer (copolymer) containing 5 mole % of a unit represented by the following formula (H-2).

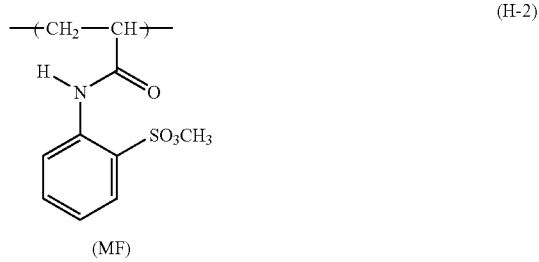

(MF)  (H-2)

Acid value titration revealed that the sulfonic acid was transformed into methyl sulfonate because no equivalent point derived from the sulfonic acid was observed. The polymer obtained had an average molecular weight of: number-average molecular weight Mn=11,000 and weight-average molecular weight Mw=23,000.

A series of preparation procedures was scaled up to produce the polymer in a large quantity, which was designated as Polymer (h).

Preparation Example I-1

Making reference to JOURNAL OF POLYMER SCIENCE: Polymer Chemistry Edition, 13, 1879-1887 (1975), a polymer (copolymer) containing units represented by the following formula (I-0):

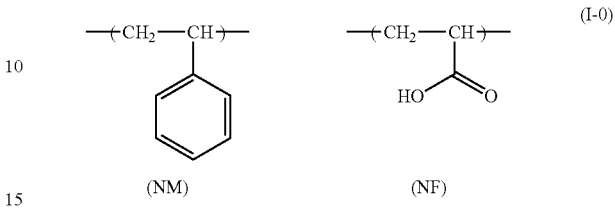

(NM)  (NF)  (I-0)

in a content ratio (mole %) of (NM):(NF)=94:6 was synthesized, and used in the following experiment.

In an atmosphere of nitrogen, 1.5012 g of this polymer and 1.2868 g of 2-aminobenzenesulfonic acid were put into a 200 ml three-necked flask, and 56.5 ml of pyridine was added thereto, which were then stirred, and thereafter 3.89 ml of triphenyl phosphite was added and heated at 120° C. for 6 hours. After the reaction was completed, pyridine was distilled away, and the reaction product was dissolved in 150 ml of ethyl acetate, where separatory washing with 2N hydrochloric acid was repeated three times to effect purification. Further, the solvent was distilled away. The resultant polymer was dissolved in 15 ml of THF (tetrahydrofuran), re-precipitated in 200 ml of 2-propanol and thereafter collected by filtration, followed by drying under reduced pressure.

From the results of $^1$H-NMR, it was ascertained that, since a peak due to the phenyl group of the 2-aminobenzenesulfonic acid had shifted, the polymer obtained was a polymer (copolymer) containing 6 mole % of a unit represented by the following formula (I-1).

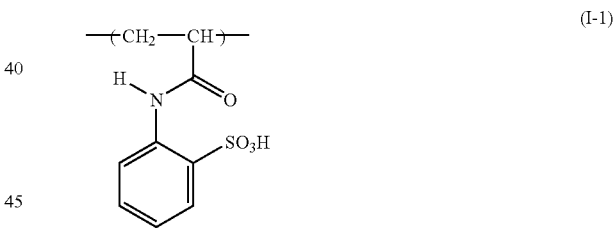

(I-1)

The polymer obtained had an average molecular weight of: number-average molecular weight Mn=23,000 and weight-average molecular weight Mw=54,000.

Preparation Example I-2

0.9980 g of the polymer obtained in Preparation Example I-1 was put into a 300 ml round-bottomed flask, and 70 ml of chloroform and 17.5 ml of methanol were added thereto to dissolve it, followed by cooling to 0° C. To the resultant mixture, 4.95 ml of a 2 mol/l trimethylsilyldiazomethane-hexane solution (available from Aldrich Chemical Co., Inc.) was added, and stirred for 4 hours. After the reaction was completed, the solvent was distilled away by means of an evaporator, and thereafter the polymer obtained was collected. Further, 70 ml of chloroform and 17.5 ml of methanol were added to dissolve the polymer again, and then the solvent was distilled away by means of the evaporator. This procedure was repeated three times. The polymer collected here was dried under reduced pressure to yield 0.9898 g of a polymer.

From the results of ¹H-NMR, it was ascertained that, since a peak due to methyl sulfonate was seen at 3 to 4 ppm, the polymer obtained was a polymer (copolymer) containing 6 mole % of a unit represented by the following formula (I-2).

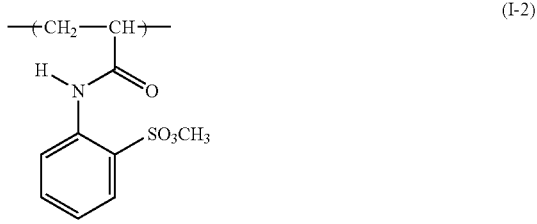

(I-2)

Acid value titration revealed that the sulfonic acid was transformed into methyl sulfonate because no equivalent point derived from the sulfonic acid was observed.

The polymer obtained had an average molecular weight of: number-average molecular weight Mn=22,000 and weight-average molecular weight Mw=54,000.

A series of preparation procedures was scaled up to produce the polymer in a large quantity, which was designated as Polymer (i).

The utility of the present invention is demonstrated below by giving Examples 1 to 48 and Comparative Examples.

Example 1

|  | (by weight) |
| --- | --- |
| Carbon black | 1 part |
| Crystalline graphite | 9 parts |
| Polymer (a) | 25 parts |
| Toluene | 65 parts |

To the above materials, zirconia beads of 1 mm in diameter were added to carry out dispersion treatment for 2 hours by means of a sand mill, and the beads were separated by using a sieve to prepare a coating dispersion. Using the coating dispersion, a coating layer was formed on the surface of a developing sleeve of a copying machine NP-6035 (manufactured by CANON INC.) by spraying, and subsequently heated at 150° C. for 30 minutes by means of a hot-air dryer to effect curing. Thus, a developer carrying member of this Example, having a resin layer on the developing sleeve surface, was produced. The constitution of the resin layer of the developer carrying member obtained was as shown in Table 1. Also, the developer carrying member of this Example was evaluated by the following methods and according to the following criteria. The results of evaluation were as shown in Tables 3 and 4.

In the evaluation, a toner was used which was prepared using the following raw materials.

|  | (by weight) |
| --- | --- |
| Styrene-acrylic resin (Tg: 56° C.) | 100 parts |
| Magnetite | 80 parts |
| Positive charge control agent | 2 parts |
| Low-molecular weight polypropylene | 4 parts |

The above constituent materials were melt-kneaded, followed by pulverization and classification to obtain positively chargeable toner particles with a weight-average particle diameter of 6 μm. To the toner particles obtained, 0.9% by weight of colloidal silica subjected to coupling treatment with trimethoxysilyl-γ-propylbenzylamine was externally added as a positively chargeable external additive to prepare a positively chargeable one-component magnetic developer, Toner A.

Using the developer carrying member of this Example and the above Toner A, image reproduction tests were conducted using NP-6035 (manufactured by CANON INC.) in environments of H/H (high temperature and high humidity) and N/L (normal temperature and low humidity). The results of evaluation in the N/L environment and the results of evaluation in the H/H environment were as shown in Table 3 and Table 4, respectively. In addition, similar evaluation methods are used also concerning the evaluation results shown in Tables 6 and 7 as well.

—Evaluation—

(1) Image Density:

The density of solid black areas of images obtained was measured with a reflection densitometer RD918 (manufactured by Macbeth Co.), and measured values were used to make evaluation on decrease in image density.

(2) Triboelectricity:

The triboelectricity of the developer on the developer carrying member was measured by the following suction method. To measure triboelectric values by the suction method, first, using a measuring container having a cylindrical paper filter, to which a suction mouth made of a metal is fitted along the shape of the developer carrying member surface, the developer is sucked while controlling suction pressure so that the developer layer held on the developer carrying member surface immediately after image formation (preferably within 5 minutes) can uniformly be sucked in just proportion. Then, the charge quantity Q of the developer sucked at this point is measured with 616 Digital Electrometer (manufactured by Keithley Instruments Inc.), and is calculated by Q/M (mC/kg) (where M is mass) to find the triboelectric values.

(3) Reversal Fog:

The reflectance of solid white images in proper images was measured, and further, the reflectance of a unused transfer sheet was measured. The value of (worst value of reflectance of solid white image)–(maximum value of reflectance of unused transfer sheet) was regarded as the reversal-fog density. Further, images of the two were visually inspected, and taking them together, evaluation was made according to the following criteria. As the transfer sheet, cardboard of 127.9 g/m² in basis weight was used, and the reflectance was measured with TC-6DS (manufactured by Tokyo Denshoku Co., Ltd.).

AA: Reversal-fog density is 1.5 or less, and difference is hardly recognizable.

A: Reversal-fog density is from more than 1.5 to 2.5 or less, and difference is not recognizable unless viewed carefully.

B: Reversal-fog density is from more than 2.5 to 3.5 or less, and fog becomes gradually recognizable with progress of image reproduction.

BC: Reversal-fog density is from more than 3.5 to 4.0 or less, which is the lower limit of practical-use tolerance, and fog is recognizable at first glance.

C: Reversal-fog density is from more than 4.0 to 5.0 or less, which is considerably bad.

(4) Faulty Images (Lines, Non-Uniformity, Blotches):

Various images such as solid black images, halftone images and line images were examined, and also any faulty toner coating states on sleeve, such as lines, wavy non-uniformity and blotches (spotty non-uniformity) were visually inspected on the sleeve. Making reference to the results of observation, evaluation was made according to the following criteria.

AA: No faults are observable at all on both images and the sleeve.

A: Faults are slightly observable on the sleeve, but are almost unobservable on images.

AB: Faults are observable on one sheet out of several tens of sheets, when the sheets were held up against light.

BA: Faults are observable on the first sheet of halftone images or solid black images and in the first round of the sleeve revolution.

B: Faults are observable on halftone images or solid black images. The lower limit of practical-use tolerance.

BC: Faulty images are observable on the whole solid black images. Outside practical-use tolerance.

C: Faults are observable on solid white images as well.

(5) Abrasion Level of Conductive Resin Layer (Coating Abrasion):

After image reproduction was evaluated in each environment, the developing sleeve was detached, and its external diameter was measured with a laser measuring instrument Y-CFT Model (manufactured by Magara Keisoku Kaihatsu K.K.). From this measured value and the measured value of the external diameter of the developing sleeve before image reproduction, the level of abrasion of the conductive resin layer was calculated, and an average value at 30 spots was found and regarded as coating abrasion (μm).

Example 2

A developer carrying member of this Example was produced by the same operation as that in Example 1 except that, in Example 1, Polymer (a) was changed for Polymer (b). The constitution of the resin layer of the developer carrying member obtained was as shown in Table 1. Then, using the developer carrying member obtained, image reproduction tests were conducted in the same manner as the case of Example 1 and while feeding Toner A, to make evaluation. The results of evaluation were as shown in Tables 3 and 4.

Example 3

A developer carrying member of this Example was produced by the same operation as in Example 1 except that Polymer (a) was changed to Polymer (c). The constitution of the resin layer of the developer carrying member obtained was as shown in Table 1. Then, using the developer carrying member obtained, image reproduction tests were conducted in the same manner as in Example 1 and while feeding Toner A, to make evaluation. The results of evaluation were as shown in Tables 3 and 4.

Example 4

The same materials as in Example 1 were subjected to dispersion by the same operation, and thereafter 5 parts of conductive spherical carbon particles of 5 μm in number-average particle diameter were further added, followed by dispersion over 1 hour in the presence of glass beads of 3 mm in diameter. The beads were separated by using a sieve to prepare a coating dispersion. Next, the resin layer was formed by the same operation as in Example 1 to produce a developer carrying member of this Example. The constitution of the resin layer of the developer carrying member obtained was as shown in Table 1.

Using the developer carrying member obtained, image reproduction tests were conducted in the same manner as in Example 1 and while feeding Toner A, to make evaluation. The results of evaluation were as shown in Tables 3 and 4.

The conductive spherical carbon particles used in this Example were obtained in the following way: The surfaces of 100 parts of spherical phenol resin particles of 5.5 μm in number-average particle diameter were uniformly coated with 14 parts of coal type bulk-mesophase pitch powder of 1.5 μm or less in number-average particle diameter by means of an automated mortar (automatic stone mill, manufactured by Ishikawa Kojo), followed by heat stabilization treatment in an oxidizing atmosphere and thereafter firing at 2,200° C. to effect graphitization. The conductive spherical carbon particles obtained had a number-average particle diameter of 5 μm, a true density of 1.50 g/cm$^3$, a volume resistivity of 7.5×10$^{-2}$ Ωcm and a length/breadth ratio of 1.15.

Example 5

|  | (by weight) |
| --- | --- |
| Carbon black | 1 part |
| Crystalline graphite | 9 parts |
| PMMA (polymethyl methacrylate) resin | 25 parts |
| Polymer (a) | 5 parts |
| Toluene | 65 parts |

Using the above materials, dispersion was carried out by the same operation as in Example 1, and thereafter the resin layer was formed by the same operation to produce a developer carrying member of this Example. The constitution of the resin layer of the developer carrying member obtained was as shown in Table 1. Then, using the developer carrying member obtained, image reproduction tests were conducted in the same manner as in Example 1 and while feeding Toner A, to make evaluation. The results of evaluation were as shown in Tables 3 and 4.

Example 6

A developer carrying member of this Example was produced by the same operation as in Example 5 except that Polymer (a) was changed to Polymer (b) in forming the resin layer. The constitution of the resin layer of the developer carrying member obtained was as shown in Table 1. Then, using the developer carrying member obtained, image reproduction tests were conducted in the same manner as in Example 1 and while feeding Toner A, to make evaluation. The results of evaluation were as shown in Tables 3 and 4.

Example 7

A developer carrying member of this Example was produced by the same operation as in Example 5 except that Polymer (a) was changed to Polymer (c) in forming the resin layer. The constitution of the resin layer of the developer carrying member obtained was as shown in Table 1. Then, using the developer carrying member obtained, image reproduction tests were conducted in the same manner as in Example 1 and while feeding Toner A, to make evaluation. The results of evaluation were as shown in Tables 3 and 4.

Example 8

The same materials as those in Example 5 were subjected to dispersion by the same operation, and thereafter 5 parts of conductive spherical carbon particles of 5 μm in number-average particle diameter were added, followed by dispersion for 1 hour in the presence of glass beads of 3 mm in diameter. The beads were separated by using a sieve to prepare a coating dispersion. Next, the resin layer was formed by the same operation as in Example 1 to produce a developer carrying member of this Example. The constitution of the resin layer of the developer carrying member obtained was as shown in Table 1.

Then, using the developer carrying member obtained, image reproduction tests were conducted in the same manner as in Example 1 and while feeding Toner A, to make evaluation. The results of evaluation were as shown in Tables 3 and 4.

The conductive spherical carbon particles used in this Example were obtained in the following way: 100 parts of spherical phenol resin particles of 5.5 μm in number-average particle diameter were uniformly coated with 14 parts of coal type bulk-mesophase pitch powder of 1.5 μm or less in number-average particle diameter by means of an automated mortar (automatic stone mill, manufactured by Ishikawa Kojo), followed by heat stabilization treatment in an oxidizing atmosphere and thereafter firing at 2,200° C. to effect graphitization. The conductive spherical carbon particles obtained had a number-average particle diameter of 5 μm, a true density of 1.50 g/cm$^3$, a volume resistivity of 7.5×10$^{-2}$ Ωcm and a length/breadth ratio of 1.15.

Example 9

A developer carrying member of this Example was produced by the same operation as in Example 8 except that, in place of the conductive spherical carbon particles of 5 μm in number-average particle diameter as used in Example 8, 7.5 parts of conductive spherical carbon particles of 2 μm in number-average particle diameter were added in forming the resin layer. The constitution of the resin layer of the developer carrying member obtained was as shown in Table 1.

Then, using the developer carrying member obtained, image reproduction tests were conducted in the same manner as in Example 1 and while feeding Toner A, to make evaluation. The results of evaluation were as shown in Tables 3 and 4.

The conductive spherical carbon particles of 2 μm in number-average particle diameter as used in this Example were obtained in the following way: 100 parts of spherical phenol resin particles of 2.3 μm in number-average particle diameter were uniformly coated with 14 parts of coal type bulk-mesophase pitch powder of 0.3 μm or less in number-average particle diameter by means of an automated mortar (automatic stone mill, manufactured by Ishikawa Kojo), followed by heat stabilization treatment in an oxidizing atmosphere and thereafter firing at 2,200° C. to effect graphitization. The conductive spherical carbon particles obtained had a true density of 1.52 g/cm$^3$ a volume resistivity of 7.2×10$^{-2}$ Ωcm and a length/breadth ratio of 1.12.

Example 10

A developer carrying member of this Example was produced by the same operation as in Example 8 except that, in place of the conductive spherical carbon particles of 5 μm in number-average particle diameter as used in Example 8, 2.5 parts of conductive spherical carbon particles of 20 μm in number-average particle diameter were added in forming the resin layer. The constitution of the resin layer of the developer carrying member obtained was as shown in Table 1.

Then, using the developer carrying member obtained, image reproduction tests were conducted in the same manner as in Example 1 and while feeding Toner A, to make evaluation. The results of evaluation were as shown in Tables 3 and 4.

The conductive spherical carbon particles of 20 μm in number-average particle diameter as used in this Example were obtained in the following way: 100 parts of spherical phenol resin particles of 24 μm in number-average particle diameter were uniformly coated with 14 parts of coal type bulk-mesophase pitch powder of 3 μm or less in number-average particle diameter by means of an automated mortar (automatic stone mill, manufactured by Ishikawa Kojo), followed by heat stabilization treatment in an oxidizing atmosphere and thereafter firing at 2,200° C. to effect graphitization. The conductive spherical carbon particles obtained had a true density of 1.45 g/cm$^3$, a volume resistivity of 9.6×10$^{-2}$ Ωcm and a length/breadth ratio of 1.18.

Example 11

A developer carrying member of this Example was produced by the same operation as in Example 8 except that, in place of the conductive spherical carbon particles of 5 μm in number-average particle diameter as used in Example 8, carbon black coated PMMA particles of 5 μm in number-average particle diameter were used in forming the resin layer. The constitution of the resin layer of the developer carrying member obtained was as shown in Table 1.

Then, using the developer carrying member obtained, image reproduction tests were conducted in the same manner as in Example 1 and while feeding Toner A, to make evaluation. The results of evaluation were as shown in Tables 3 and 4.

The carbon black coated PMMA particles of 5 μm in number-average particle diameter as used in this Example were conductive spherical PMMA particles obtained by coating 100 parts of PMMA particles of 4.8 μm in number-average particle diameter with 5 parts of conductive carbon black by means of Hybridizer (manufactured by Nara Machinery Co., Ltd.), and had a true density of 1.20 g/cm$^3$, a volume resistivity of 6.8×10$^{-1}$ Ωcm and a length/breadth ratio of 1.06.

Example 12

A developer carrying member of this Example was produced by the same operation as in Example 8 except that, in place of the conductive spherical carbon particles of 5 μm in number-average particle diameter as used in Example 8, carbon black dispersed resin particles of 5 μm in number-average particle diameter were used in forming the resin layer. The constitution of the resin layer of the developer carrying member obtained was as shown in Table 1.

Then, using the developer carrying member obtained, image reproduction tests were conducted in the same manner as in Example 1 and while feeding Toner A, to make evaluation. The results of evaluation were as shown in Tables 3 and 4.

The carbon black dispersed resin particles of 5 μm in number-average particle diameter as used in this Example were obtained by using materials shown below and by carrying out kneading, pulverization and classification to produce conductive resin particles of 5.3 μm in number-average particle diameter, followed by sphering treatment using Hybridizer (manufactured by Nara Machinery Co., Ltd.). The carbon black dispersed resin particles obtained had a true density of 1.21 g/cm$^3$, a volume resistivity of $5.2 \times 10^{-1}$ Ωcm and a length/breadth ratio of 1.20.

|  | (by weight) |
|---|---|
| Styrene-dimethylaminoethyl methacrylate-divinylbenzene copolymer (copolymerization ratio: 90:10:0.05) | 100 parts |
| Carbon black | 25 parts |

Example 13

A developer carrying member of this Example was produced by the same operation as in Example 8 except that, in place of the conductive spherical carbon particles of 5 μm in number-average particle diameter as used in Example 8, PMMA particles of 5 μm in number-average particle diameter were used in forming the resin layer. The constitution of the resin layer of the developer carrying member obtained was as shown in Table 1. Then, using the developer carrying member obtained, image reproduction tests were conducted in the same manner as in Example 1 and while feeding Toner A, to make evaluation. The results of evaluation were as shown in Tables 3 and 4.

Example 14

A developer carrying member of this Example was produced by the same operation as that in Example 8 except that, in place of the PMMA resin used in Example 8, silicone resin was used in forming the resin layer. The constitution of the resin layer of the developer carrying member obtained was as shown in Table 1. Then, using the developer carrying member obtained, image reproduction tests were conducted in the same manner as in Example 1 and while feeding Toner A, to make evaluation. The results of evaluation were as shown in Tables 3 and 4.

Example 15

A developer carrying member of this Example was produced by the same operation as in Example 8 except that, in place of the PMMA resin used in Example 8, styrene-acrylic resin was used in forming the resin layer. The constitution of the resin layer of the developer carrying member obtained was as shown in Table 1. Then, using the developer carrying member obtained, image reproduction tests were conducted in the same manner as in Example 1 and while feeding Toner A, to make evaluation. The results of evaluation were as shown in Tables 3 and 4.

Example 16

A developer carrying member of this Example was produced by the same operation as that in Example 8 except that, in place of the PMMA resin used in Example 8, polyester resin was used in forming the resin layer. The constitution of the resin layer of the developer carrying member obtained was as shown in Table 1. Then, using the developer carrying member obtained, image reproduction tests were conducted in the same manner as in Example 1 and while feeding Toner A, to make evaluation. The results of evaluation were as shown in Tables 3 and 4.

Comparative Example 1

A developer carrying member of this Comparative Example was produced in the same manner as in Example 1 except that the resin layer was not formed and an FGB sleeve obtained by sand-blasting the substrate surface by the use of glass beads of #300 in particle diameter was used. The constitution of the resin layer (none) of the developer carrying member obtained was as shown in Table 2. Then, using the developer carrying member obtained, image reproduction tests were conducted in the same manner as in Example 1 and while feeding Toner A, to make evaluation. The results of evaluation were as shown in Tables 3, 4, 6 and 7.

Comparative Example 2

A developer carrying member of this Comparative Example was produced in the same manner as in Example 5 except that Polymer (a) was removed in forming the resin layer. The constitution of the resin layer of the developer carrying member obtained was as shown in Table 2. Then, using the developer carrying member obtained, image reproduction tests were conducted in the same manner as in Example 1 and while feeding Toner A, to make evaluation. The results of evaluation were as shown in Tables 3, 4, 6 and 7.

Comparative Example 3

A developer carrying member of this Comparative Example was produced in the same manner as in Example 14 except that Polymer (a) and the conductive spherical carbon particles were removed in forming the resin layer. The constitution of the resin layer of the developer carrying member obtained was as shown in Table 2. Then, using the developer carrying member obtained, image reproduction tests were conducted in the same manner as in Example 1 and while feeding Toner A, to make evaluation. The results of evaluation were as shown in Tables 3, 4, 6 and 7.

Comparative Example 4

A developer carrying member of this Comparative Example was produced in the same manner as in Example 16 except that Polymer (a) and the conductive spherical carbon particles were removed in forming the resin layer. The constitution of the resin layer of the developer carrying member obtained was as shown in Table 2. Then, using the developer carrying member obtained, image reproduction tests were conducted in the same manner as in Example 1 and while feeding Toner A, to make evaluation. The results of evaluation were as shown in Tables 3, 4, 6 and 7.

Comparative Example 5

A developer carrying member of this Comparative Example was produced in the same manner as in Example 4 except that in place of Polymer (a), PMMA was used and in place of the conductive spherical carbon particles, a chromium complex of azonaphthol which contains chlorophenol was used in forming the resin layer. The constitution of the resin layer of the developer carrying member obtained was as shown in Table 2. Then, using the developer carrying member obtained, image reproduction tests were conducted in the same manner as in Example 1 and while feeding Toner A, to make evaluation. The results of evaluation were as shown in Tables 3, 4, 6 and 7.

Comparative Example 6

A developer carrying member of this Comparative Example was produced in the same manner as in Example 5 except that in place of Polymer (a), the above quaternary ammonium salt was used in forming the resin layer. The constitution of the resin layer of the developer carrying member obtained was as shown in Table 2. Then, using the developer carrying member obtained, image reproduction tests were conducted in the same manner as in Example 1 and while feeding Toner A, to make evaluation. The results of evaluation were as shown in Tables 3, 4, 6 and 7.

TABLE 1

Constitution of Developing Sleeve Surface Resin Layer

| Example: | *1 P/B/CA/R ratio | Roughness Ra (μm) | Binder resin Polymer | Other resin | Spherical particles added (number-average particle diameter) |
|---|---|---|---|---|---|
| 1  | 1/0.0/2.5/0.0  | 0.58 | (a) | None     | None |
| 2  | 1/0.0/2.5/0.0  | 0.58 | (b) | None     | None |
| 3  | 1/0.0/2.5/0.0  | 0.58 | (c) | None     | None |
| 4  | 1/0.0/2.5/0.5  | 0.59 | (a) | None     | Conductive spherical carbon particles (5 μm) |
| 5  | 1/2.5/0.5/0.0  | 0.61 | (a) | PMMA     | None |
| 6  | 1/2.5/0.5/0.0  | 0.60 | (b) | PMMA     | None |
| 7  | 1/2.5/0.5/0.0  | 0.61 | (c) | PMMA     | None |
| 8  | 1/2.5/0.5/0.5  | 0.70 | (a) | PMMA     | Conductive spherical carbon particles (5 μm) |
| 9  | 1/2.5/0.5/0.75 | 0.61 | (a) | PMMA     | Conductive spherical carbon particles (2 μm) |
| 10 | 1/2.5/0.5/0.25 | 1.02 | (a) | PMMA     | Conductive spherical carbon particles (20 μm) |
| 11 | 1/2.5/0.5/0.5  | 0.76 | (a) | PMMA     | CB coated spherical PMMA particles (5 μm) |
| 12 | 1/2.5/0.5/0.5  | 0.72 | (a) | PMMA     | CB dispersed spherical resin particles (5 μm) |
| 13 | 1/2.5/0.5/0.5  | 0.65 | (a) | PMMA     | Spherical PMMA particles (5 μm) |
| 14 | 1/2.5/0.5/0.5  | 0.78 | (a) | Silicone | Conductive spherical carbon particles (5 μm) |
| 15 | 1/2.5/0.5/0.5  | 0.73 | (a) | St-Ac *2 | Conductive spherical carbon particles (5 μm) |
| 16 | 1/2.5/0.5/0.5  | 0.71 | (a) | Polyester | Conductive spherical carbon particles (5 μm) |

*1 P: Conductive fine powder (CB: carbon black, GF: crystalline graphite, CB/GF = 1/9) B: other resin, CA: polymer, R: spherical particles
*2 St-Ac: styrene-acrylic resin

TABLE 2

Constitution of Developing Sleeve Surface Resin Layer

| Comparative Example: | *1 P/B/CA/R ratio | Roughness Ra (μm) | Binder resin Other resin | Particles added |
|---|---|---|---|---|
| 1 | No resin layer. Sleeve of Ra = 0.55 sand-blasted using glass beads of #300 in particle diameter. | | | |
| 2 | 1/2.5/0.0/0.0 | 0.51 | PMMA     | None |
| 3 | 1/2.5/0.0/0.0 | 0.50 | Silicone | None |
| 4 | 1/2.5/0.0/0.0 | 0.58 | Polyester | None |
| 5 | 1/2.5/0.0/0.5 | 0.63 | PMMA     | Azonaphthol chromium complex containing chlorophenol |
| 6 | 1/2.5/0.0/0.5 | 0.65 | PMMA     | Quaternary ammonium salt compound |

*1) P: Conductive fine powder (CB: carbon black, GF: crystalline graphite, CB/GF = 1/9) B: other resin, CA: Polymer, R: spherical particles

TABLE 3

Results of Evaluation in N/L Environment

| | Initial stage (after 1,000 sheets) | | | | | After running (100,000 sheets) | | | | | Coat abrasion (μm) |
|---|---|---|---|---|---|---|---|---|---|---|---|
| | Image density | Reversal fog | Q/M (mC/kg) | Lines, non-uniformity | Blotch | Image density | Reversal fog | Q/M (mC/kg) | Lines, non-uniformity | Blotch | |
| Example: | | | | | | | | | | | |
| 1 | 1.35 | A  | 17.7 | AA | A  | 1.38 | AA | 17.5 | A  | AA | -3.1 |
| 2 | 1.35 | A  | 17.3 | A  | A  | 1.37 | AA | 17.4 | A  | AA | -3.2 |
| 3 | 1.35 | A  | 17.5 | AA | A  | 1.38 | AA | 17.1 | A  | AA | -3.0 |
| 4 | 1.35 | A  | 17.5 | AA | AA | 1.36 | AA | 16.4 | A  | AA | -2.1 |
| 5 | 1.35 | A  | 15.2 | AA | AA | 1.36 | AA | 14.9 | A  | AA | -2.0 |
| 6 | 1.34 | AA | 15.0 | AA | AA | 1.35 | AA | 14.5 | A  | AA | -2.5 |
| 7 | 1.34 | A  | 15.1 | AA | AA | 1.36 | AA | 14.8 | AA | AA | -2.0 |

TABLE 3-continued

Results of Evaluation in N/L Environment

| | Initial stage (after 1,000 sheets) | | | | | After running (100,000 sheets) | | | | | Coat abrasion (μm) |
|---|---|---|---|---|---|---|---|---|---|---|---|
| | Image density | Reversal fog | Q/M (mC/kg) | Lines, non-uniformity | Blotch | Image density | Reversal fog | Q/M (mC/kg) | Lines, non-uniformity | Blotch | |
| 8 | 1.37 | AA | 16.0 | AA | AA | 1.39 | AA | 15.5 | AA | AA | −1.4 |
| 9 | 1.34 | A | 15.9 | AA | AA | 1.34 | AA | 15.4 | A | AA | −2.0 |
| 10 | 1.31 | A | 15.0 | AB | A | 1.33 | AA | 14.9 | AB | A | −1.9 |
| 11 | 1.34 | A | 14.6 | AA | AA | 1.34 | AA | 14.0 | AA | AA | −2.4 |
| 12 | 1.31 | A | 14.4 | A | AA | 1.35 | AA | 14.3 | A | AA | −2.5 |
| 13 | 1.28 | B | 13.6 | AB | A | 1.29 | A | 13.9 | AB | A | −3.3 |
| 14 | 1.34 | A | 15.4 | AA | AA | 1.39 | AA | 14.8 | AA | AA | −1.7 |
| 15 | 1.33 | A | 14.9 | AA | AA | 1.35 | AA | 14.8 | AA | AA | −2.2 |
| 16 | 1.25 | A | 13.7 | B | A | 1.28 | A | 13.6 | A | A | −3.4 |
| Comparative Example: | | | | | | | | | | | |
| 1 | 1.24 | BC | 7.5 | B | BC | 1.19 | B | 6.6 | BC | C | — |
| 2 | 1.24 | BC | 7.7 | B | BA | 1.17 | B | 7.1 | B | B | −2.8 |
| 3 | 1.25 | C | 7.2 | B | BA | 1.18 | B | 6.5 | BC | C | −2.5 |
| 4 | 1.23 | BC | 7.5 | B | BC | 1.16 | B | 6.8 | B | B | −2.8 |
| 5 | 1.25 | C | 7.7 | B | BA | 1.15 | B | 7.0 | BC | B | −5.7 |
| 6 | 1.24 | BC | 7.8 | B | BA | 1.17 | B | 7.1 | BC | B | −6.4 |

TABLE 4

Results of Evaluation in H/H Environment

| | Initial stage (after 1,000 sheets) | | | | | After running (100,000 sheets) | | | | | Coat abrasion (μm) |
|---|---|---|---|---|---|---|---|---|---|---|---|
| | Image density | Reversal fog | Q/M (mC/kg) | Lines, non-uniformity | Blotch | Image density | Reversal fog | Q/M (mC/kg) | Lines, non-uniformity | Blotch | |
| Example: | | | | | | | | | | | |
| 1 | 1.33 | AA | 16.4 | A | A | 1.34 | AA | 16.0 | A | AA | −3.1 |
| 2 | 1.30 | A | 16.3 | A | A | 1.35 | AA | 16.0 | AA | AA | −3.3 |
| 3 | 1.33 | AA | 16.4 | A | A | 1.35 | AA | 16.1 | A | AA | −3.2 |
| 4 | 1.32 | AA | 16.1 | AA | AA | 1.35 | A | 15.9 | AA | AA | −2.0 |
| 5 | 1.31 | A | 14.5 | A | AA | 1.36 | AA | 14.0 | A | AA | −2.5 |
| 6 | 1.31 | AA | 14.1 | AA | AA | 1.34 | AA | 13.8 | A | AA | −2.8 |
| 7 | 1.33 | A | 14.4 | A | A | 1.36 | AA | 13.9 | AA | AA | −2.7 |
| 8 | 1.34 | AA | 14.9 | AA | AA | 1.35 | AA | 14.5 | AA | AA | −1.9 |
| 9 | 1.33 | AA | 14.6 | AA | AA | 1.32 | AA | 14.1 | AA | AA | −2.1 |
| 10 | 1.30 | A | 13.9 | A | A | 1.33 | AA | 13.5 | AA | A | −2.0 |
| 11 | 1.30 | AA | 13.0 | AB | AA | 1.31 | AA | 12.7 | AB | A | −2.8 |
| 12 | 1.30 | A | 13.0 | AA | AA | 1.32 | AA | 12.9 | AB | AA | −3.1 |
| 13 | 1.26 | A | 12.7 | A | A | 1.30 | AA | 12.0 | BA | A | −3.9 |
| 14 | 1.32 | AA | 14.5 | A | AA | 1.35 | AA | 13.9 | AA | AA | −2.1 |
| 15 | 1.30 | A | 13.5 | AA | AA | 1.30 | AA | 13.4 | AA | AA | −2.4 |
| 16 | 1.21 | B | 10.9 | A | A | 1.24 | A | 10.6 | B | A | −5.4 |
| Comparative Example: | | | | | | | | | | | |
| 1 | 1.06 | BC | 6.5 | B | AB | 1.02 | B | 6.1 | BC | B | — |
| 2 | 1.09 | B | 6.4 | AB | AB | 1.04 | A | 6.0 | BA | BA | −3.3 |
| 3 | 1.12 | B | 6.5 | BA | B | 1.08 | A | 6.2 | BA | AB | −3.0 |
| 4 | 1.09 | B | 6.5 | AB | AB | 1.05 | A | 6.1 | B | BA | −3.0 |
| 5 | 1.10 | B | 6.9 | AB | AB | 1.09 | A | 6.4 | B | BA | −6.1 |
| 6 | 1.12 | B | 7.0 | BA | AB | 1.05 | A | 6.5 | B | BA | −6.8 |

Example 17

A developer carrying member of this Example was produced in the same manner as in Example 1 except that a resin layer was formed in which in place of Polymer (a), Polymer (d) was used. The constitution of the resin layer of the developer carrying member obtained was as shown in Table 5. Then, using the developer carrying member obtained, image reproduction tests were conducted in the same manner as in Example 1 and while feeding Toner A, to make evaluation. The results of evaluation were as shown in Tables 6 and 7.

Example 18

A developer carrying member of this Example was produced by the same operation as that in Example 17 except that Polymer (d) was changed to Polymer (e) in forming the resin layer. The constitution of the resin layer of the developer carrying member obtained was as shown in Table 5. Then, using the developer carrying member obtained, image reproduction tests were conducted in the same manner as the case of Example 1 and while feeding Toner A, to make evaluation. The results of evaluation were as shown in Tables 6 and 7.

Example 19

A developer carrying member of this Example was produced by the same operation as in Example 17 except that Polymer (d) was changed to Polymer (f) in forming the resin layer. The constitution of the resin layer of the developer carrying member obtained was as shown in Table 5. Then, using the developer carrying member obtained, image reproduction tests were conducted in the same manner as in Example 1 and while feeding Toner A, to make evaluation. The results of evaluation were as shown in Tables 6 and 7.

Example 20

The same materials as those in Example 17 were subjected to dispersion by the same operation, and further 5 parts of conductive spherical carbon particles of 5 µm in number-average particle diameter were added, followed by dispersion over a period of 1 hour in the presence of glass beads of 3 mm in diameter. The beads were separated out using a sieve to prepare a coating dispersion. Next, the resin layer was formed by the same operation as in Example 17 to produce a developer carrying member of this Example. The constitution of the resin layer of the developer carrying member obtained was as shown in Table 5.

Then, using the developer carrying member obtained, image reproduction tests were conducted in the same manner as in Example 1 and while feeding Toner A, to make evaluation. The results of evaluation were as shown in Tables 6 and 7. As the conductive spherical carbon particles used in this Example, those prepared entirely in the same manner as in Example 4 were used.

Example 21

A developer carrying member of this Example was produced in the same manner as in Example 5 except that a resin layer was formed in which in place of Polymer (a) Polymer (d) was used. The constitution of the resin layer of the developer carrying member obtained was as shown in Table 5. Then, using the developer carrying member obtained, image reproduction tests were conducted in the same manner as in Example 1 and while feeding Toner A, to make evaluation. The results of evaluation were as shown in Tables 6 and 7.

Example 22

A developer carrying member of this Example was produced by the same operation as in Example 21 except that Polymer (d) was changed for Polymer (e) in forming the resin layer. The constitution of the resin layer of the developer carrying member obtained was as shown in Table 5. Then, using the developer carrying member obtained, image reproduction tests were conducted in the same manner as in Example 1 and while feeding Toner A, to make evaluation. The results of evaluation were as shown in Tables 6 and 7.

Example 23

A developer carrying member of this Example was produced by the same operation as in Example 21 except that Polymer (d) was changed for Polymer (f) in forming the resin layer. The constitution of the resin layer of the developer carrying member obtained was as shown in Table 5. Then, using the developer carrying member obtained, image reproduction tests were conducted in the same manner as in Example 1 and while feeding Toner A, to make evaluation. The results of evaluation were as shown in Tables 6 and 7.

Example 24

The same materials as those in Example 21 were used and subjected to dispersion by the same operation, and further 5 parts of conductive spherical carbon particles of 5 µm in number-average particle diameter were added, followed by dispersion for 1 hour in the presence of glass beads of 3 mm in diameter. The beads were separated by using a sieve to obtain a coating dispersion. Next, the resin layer was formed by the same operation as in Example 17 to produce a developer carrying member of this Example. The constitution of the resin layer of the developer carrying member obtained was as shown in Table 5.

Then, using the developer carrying member obtained, image reproduction tests were conducted in the same manner as in Example 1 and while feeding Toner A, to make evaluation. The results of evaluation were as shown in Tables 6 and 7. As the conductive spherical carbon particles used in this Example, those prepared entirely in the same manner as in Example 8 were used.

Example 25

A developer carrying member of this Example was produced in the same manner as in Example 24 except that, in place of the conductive spherical carbon particles of 5 µm in number-average particle diameter as used in Example 24, 7.5 parts of conductive spherical carbon particles of 2 µm in number-average particle diameter were added. The constitution of the resin layer of the developer carrying member obtained was as shown in Table 5.

Then, using the developer carrying member obtained, image reproduction tests were conducted in the same manner as in Example 1 and while feeding Toner A, to make evaluation. The results of evaluation were as shown in Tables 6 and 7. As the conductive spherical carbon particles of 2 µm in number-average particle diameter as used in this Example, those prepared entirely in the same manner as in Example 9 were used.

Example 26

A developer carrying member of this Example was produced in the same manner as in Example 24 except that, in place of the conductive spherical carbon particles of 5 µm in number-average particle diameter as used in Example 24, 2.5 parts of conductive spherical carbon particles of 20 µm in number-average particle diameter were added. The constitution of the resin layer of the developer carrying member obtained was as shown in Table 5.

Then, using the developer carrying member obtained, image reproduction tests were conducted in the same manner as in Example 1 and while feeding Toner A, to make evaluation. The results of evaluation were as shown in Tables 6 and 7. As the conductive spherical carbon particles of 20 µm in number-average particle diameter as used in this Example, those prepared entirely in the same manner as in Example 10 were used.

Example 27

A developer carrying member of this Example was produced in the same manner as in Example 24 except that, in place of the conductive spherical carbon particles of 5 µm in number-average particle diameter as used in Example 24, carbon black coated PMMA particles of 5 µm in number-average particle diameter were used in forming the resin layer. The constitution of the resin layer of the developer carrying member obtained was as shown in Table 5.

Then, using the developer carrying member obtained, image reproduction tests were conducted in the same manner as in Example 1 and while feeding Toner A, to make evaluation. The results of evaluation were as shown in Tables 6 and 7. As the carbon black coated PMMA particles of 5 µm in number-average particle diameter as used in this Example, those prepared entirely in the same manner as in Example 11 were used.

Example 28

A developer carrying member of this Example was produced by the same operation as that in Example 24 except that, in place of the conductive spherical carbon particles of 5 µm in number-average particle diameter as used in Example 24, carbon black dispersed resin particles of 5 µm in number-average particle diameter were used in forming the resin layer. The constitution of the resin layer of the developer carrying member obtained was as shown in Table 5.

Then, using the developer carrying member obtained, image reproduction tests were conducted in the same manner as in Example 1 and while feeding Toner A, to make evaluation. The results of evaluation were as shown in Tables 6 and 7. As the carbon black dispersed resin particles of 5 µm in number-average particle diameter as used in this Example, those prepared entirely in the same manner as in Example 12 were used.

Example 29

A developer carrying member of this Example was produced by the same operation as in Example 24 except that, in place of the conductive spherical carbon particles of 5 µm in number-average particle diameter as used in Example 24, PMMA particles of 5 µm in number-average particle diameter were used in forming the resin layer. The constitution of the resin layer of the developer carrying member obtained was as shown in Table 5.

Then, using the developer carrying member obtained, image reproduction tests were conducted in the same manner as in Example 1 and while feeding Toner A, to make evaluation. The results of evaluation were as shown in Tables 6 and 7.

Example 30

A developer carrying member of this Example was produced by the same operation as in Example 24 except that, in place of the PMMA resin used in Example 24, silicone resin was used in forming the resin layer. The constitution of the resin layer of the developer carrying member obtained was as shown in Table 5. Then, using the developer carrying member obtained, image reproduction tests were conducted in the same manner as in Example 1 and while feeding Toner A, to make evaluation. The results of evaluation were as shown in Tables 6 and 7.

Example 31

A developer carrying member of this Example was produced by the same operation as that in Example 24 except that, in place of the PMMA resin used in Example 24, styrene-acrylic resin was used in forming the resin layer. The constitution of the resin layer of the developer carrying member obtained was as shown in Table 5. Then, using the developer carrying member obtained, image reproduction tests were conducted in the same manner as in Example 1 and while feeding Toner A, to make evaluation. The results of evaluation were as shown in Tables 6 and 7.

Example 32

A developer carrying member of this Example was produced by the same operation as in Example 24 except that, in place of the PMMA resin used in Example 24, polyester resin was used in forming the resin layer. The constitution of the resin layer of the developer carrying member obtained was as shown in Table 5. Then, using the developer carrying member obtained, image reproduction tests were conducted in the same manner as in Example 1 and while feeding Toner A, to make evaluation. The results of evaluation were as shown in Tables 6 and 7.

TABLE 5

Constitution of Developing Sleeve Surface Resin Layer

| Example: | *1 P/B/CA/R ratio | Roughness Ra (µm) | Binder resin | Other Polymer resin | Spherical particles added (number-average particle diameter) |
|---|---|---|---|---|---|
| 17 | 1/0.0/2.5/0.0 | 0.55 | (d) | None | None |
| 18 | 1/0.0/2.5/0.0 | 0.57 | (e) | None | None |
| 19 | 1/0.0/2.5/0.0 | 0.55 | (f) | None | None |
| 20 | 1/0.0/2.5/0.5 | 0.61 | (d) | None | Conductive spherical carbon particles (5 µm) |
| 21 | 1/2.5/0.5/0.0 | 0.62 | (d) | PMMA | None |
| 22 | 1/2.5/0.5/0.0 | 0.59 | (e) | PMMA | None |
| 23 | 1/2.5/0.5/0.0 | 0.60 | (f) | PMMA | None |
| 24 | 1/2.5/0.5/0.5 | 0.71 | (d) | PMMA | Conductive spherical carbon particles (5 µm) |
| 25 | 1/2.5/0.5/0.75 | 0.62 | (d) | PMMA | Conductive spherical carbon particles (2 µm) |
| 26 | 1/2.5/0.5/0.25 | 1.01 | (d) | PMMA | Conductive spherical carbon particles (20 µm) |
| 27 | 1/2.5/0.5/0.5 | 0.74 | (d) | PMMA | CB coated spherical PMMA particles (5 µm) |
| 28 | 1/2.5/0.5/0.5 | 0.72 | (d) | PMMA | CB dispersed spherical resin particles (5 µm) |
| 29 | 1/2.5/0.5/0.5 | 0.65 | (d) | PMMA | Spherical PMMA particles (5 µm) |
| 30 | 1/2.5/0.5/0.5 | 0.77 | (d) | silicone | Conductive spherical carbon particles (5 µm) |

TABLE 5-continued

Constitution of Developing Sleeve Surface Resin Layer

| Example: | *1 P/B/CA/R ratio | Roughness Ra (μm) | Binder resin Other Polymer resin | | Spherical particles added (number-average particle diameter) |
|---|---|---|---|---|---|
| 31 | 1/2.5/0.5/0.5 | 0.71 | (d) | St-Ac *2 | Conductive spherical carbon particles (5 μm) |
| 32 | 1/2.5/0.5/0.5 | 0.72 | (d) | Polyester | Conductive spherical carbon particles (5 μm) |

*1 P: Conductive fine powder (CB: carbon black, GF: crystalline graphite, CB/GF = 1/9) B: other resin, CA: Polymer, R: spherical particles
*2 St-Ac: styrene-acrylic resin

TABLE 6

Results of Evaluation in N/L Environment

| | Initial stage (after 1,000 sheets) | | | | | After running (100,000 sheets) | | | | | |
|---|---|---|---|---|---|---|---|---|---|---|---|
| | Image density | Reversal fog | Q/M (mC/kg) | Lines, non-uniformity | Blotch | Image density | Reversal fog | Q/M (mC/kg) | Lines, non-uniformity | Blotch | Coat abrasion (μm) |
| Example: | | | | | | | | | | | |
| 17 | 1.36 | A | 17.3 | AA | A | 1.34 | AA | 16.9 | A | AA | −3.2 |
| 18 | 1.34 | A | 17.1 | A | A | 1.35 | AA | 16.6 | A | AA | −3.6 |
| 19 | 1.35 | A | 17.4 | AA | A | 1.37 | AA | 16.9 | A | AA | −3.2 |
| 20 | 1.36 | A | 16.9 | AA | AA | 1.34 | AA | 16.0 | AA | AA | −1.9 |
| 21 | 1.36 | AA | 15.0 | AA | AA | 1.36 | AA | 14.5 | AA | AA | −2.3 |
| 22 | 1.33 | A | 14.4 | A | AA | 1.34 | A | 14.0 | A | AA | −2.4 |
| 23 | 1.36 | A | 14.8 | A | AA | 1.35 | AA | 14.4 | A | AA | −2.2 |
| 24 | 1.38 | A | 15.6 | AA | AA | 1.37 | AA | 15.2 | AA | AA | −1.5 |
| 25 | 1.31 | A | 15.4 | AA | A | 1.34 | AA | 15.2 | A | AA | −2.2 |
| 26 | 1.31 | A | 14.5 | AA | A | 1.30 | A | 14.5 | A | A | −1.8 |
| 27 | 1.33 | A | 14.2 | A | AA | 1.33 | AA | 14.0 | AA | AA | −2.5 |
| 28 | 1.30 | A | 14.0 | A | A | 1.35 | AA | 14.5 | A | AA | −2.7 |
| 29 | 1.27 | B | 13.4 | AB | A | 1.27 | A | 13.2 | AB | AA | −3.1 |
| 30 | 1.35 | A | 15.0 | AA | AA | 1.39 | AA | 14.5 | AA | AA | −1.8 |
| 31 | 1.34 | A | 14.7 | AA | AA | 1.36 | AA | 14.4 | AA | AA | −2.4 |
| 32 | 1.25 | B | 13.2 | A | A | 1.24 | A | 13.3 | A | AA | −3.4 |
| Comparative Example: | | | | | | | | | | | |
| 1 | 1.24 | BC | 7.5 | B | BC | 1.19 | B | 6.6 | BC | C | — |
| 2 | 1.24 | BC | 7.7 | B | BA | 1.17 | B | 7.1 | B | B | −2.8 |
| 3 | 1.25 | C | 7.2 | B | BA | 1.18 | B | 6.5 | BC | C | −2.5 |
| 4 | 1.23 | BC | 7.5 | B | BC | 1.16 | B | 6.8 | B | B | −2.8 |
| 5 | 1.25 | C | 7.7 | B | BA | 1.15 | B | 7.0 | BC | B | −5.7 |
| 6 | 1.24 | BC | 7.8 | B | BA | 1.17 | B | 7.1 | BC | B | −6.4 |

TABLE 7

Results of Evaluation in H/H Environment

| | Initial stage (after 1,000 sheets) | | | | | After running (100,000 sheets) | | | | | |
|---|---|---|---|---|---|---|---|---|---|---|---|
| | Image density | Reversal fog | Q/M (mC/kg) | Lines, non-uniformity | Blotch | Image density | Reversal fog | Q/M (mC/kg) | Lines, non-uniformity | Blotch | Coat abrasion (μm) |
| Example: | | | | | | | | | | | |
| 17 | 1.30 | AA | 16.1 | A | A | 1.34 | AA | 15.5 | A | AA | −3.3 |
| 18 | 1.29 | AA | 15.8 | A | A | 1.30 | AA | 15.4 | A | AA | −3.6 |
| 19 | 1.31 | A | 16.1 | A | A | 1.32 | AA | 15.8 | A | A | −3.3 |
| 20 | 1.32 | AA | 15.9 | AA | AA | 1.32 | AA | 15.7 | AA | AA | −2.3 |
| 21 | 1.30 | A | 14.0 | AA | A | 1.33 | AA | 13.7 | A | AA | −2.7 |
| 22 | 1.29 | A | 13.9 | A | AA | 1.33 | AA | 13.0 | A | AA | −2.9 |
| 23 | 1.31 | A | 14.1 | A | A | 1.35 | AA | 13.4 | AA | A | −2.8 |
| 24 | 1.33 | AA | 14.4 | AA | AA | 1.33 | AA | 14.2 | AA | AA | −2.0 |
| 25 | 1.30 | AA | 14.4 | AA | AA | 1.30 | AA | 13.7 | AA | AA | −2.4 |
| 26 | 1.28 | A | 13.7 | A | A | 1.29 | A | 13.1 | AA | A | −2.4 |
| 27 | 1.30 | A | 12.7 | AB | AA | 1.30 | AA | 12.5 | AA | AA | −2.9 |

TABLE 7-continued

Results of Evaluation in H/H Environment

| | Initial stage (after 1,000 sheets) | | | | | After running (100,000 sheets) | | | | | Coat abrasion (μm) |
|---|---|---|---|---|---|---|---|---|---|---|---|
| | Image density | Reversal fog | Q/M (mC/kg) | Lines, non-uniformity | Blotch | Image density | Reversal fog | Q/M (mC/kg) | Lines, non-uniformity | Blotch | |
| 28 | 1.27 | AA | 12.7 | A | AA | 1.29 | AA | 12.5 | AB | AA | −3.1 |
| 29 | 1.23 | A | 12.6 | BA | A | 1.28 | A | 11.8 | BA | A | −3.8 |
| 30 | 1.33 | AA | 13.9 | A | AA | 1.31 | A | 13.5 | AA | AA | −2.2 |
| 31 | 1.28 | A | 13.1 | AA | AA | 1.28 | AA | 13.0 | AA | AA | −2.7 |
| 32 | 1.22 | B | 10.5 | A | A | 1.21 | A | 10.2 | B | AB | −5.5 |
| Comparative Example: | | | | | | | | | | | |
| 1 | 1.06 | BC | 6.5 | B | AB | 1.02 | B | 6.1 | BC | B | — |
| 2 | 1.09 | B | 6.4 | AB | AB | 1.04 | A | 6.0 | BA | BA | −3.3 |
| 3 | 1.12 | B | 6.5 | BA | B | 1.08 | A | 6.2 | BA | AB | −3.0 |
| 4 | 1.09 | B | 6.5 | AB | AB | 1.05 | A | 6.1 | B | BA | −3.0 |
| 5 | 1.10 | B | 6.9 | AB | AB | 1.09 | A | 6.4 | B | BA | −6.1 |
| 6 | 1.12 | B | 7.0 | BA | AB | 1.05 | A | 6.5 | B | BA | −6.8 |

Example 33

A developer carrying member of this Example was produced in the same manner as in Example 1 except that a resin layer was formed in which in place of Polymer (a), Polymer (g) was used. The constitution of the resin layer of the developer carrying member obtained was as shown in Table 8. Then, using the developer carrying member obtained, image reproduction tests were conducted in the same manner as in Example 1 and while feeding Toner A, to make evaluation. The results of evaluation were as shown in Tables 9 and 10.

Example 34

A developer carrying member of this Example was produced in the same manner as in Example 33 except that Polymer (g) was changed to Polymer (h) in forming the resin layer. The constitution of the resin layer of the developer carrying member obtained was as shown in Table 8. Then, using the developer carrying member obtained, image reproduction tests were conducted in the same manner as in Example 1 and while feeding Toner A, to make evaluation. The results of evaluation were as shown in Tables 9 and 10.

Example 35

A developer carrying member of this Example was produced by the same operation as in Example 33 except that Polymer (g) was changed to Polymer (i) in forming the resin layer. The constitution of the resin layer of the developer carrying member obtained was as shown in Table 8. Then, using the developer carrying member obtained, image reproduction tests were conducted in the same manner as in Example 1 and while feeding Toner A, to make evaluation. The results of evaluation were as shown in Tables 9 and 10.

Example 36

The same materials as in Example 33 were subjected to dispersion by the same operation, and further 5 parts of conductive spherical carbon particles of 5 μm in number-average particle diameter were added, followed by dispersion over 1 hour in the presence of glass beads of 3 mm in diameter. The beads were separated by using a sieve to prepare a coating dispersion. Next, the resin layer was formed by the same operation as in Example 33 to produce a developer carrying member of this Example. The constitution of the resin layer of the developer carrying member obtained was as shown in Table 8.

Then, using the developer carrying member obtained, image reproduction tests were conducted in the same manner as in Example 1 and while feeding Toner A, to make evaluation. The results of evaluation were as shown in Tables 9 and 10. As the conductive spherical carbon particles used in this Example, those prepared entirely in the same manner as in Example 4 were used.

Example 37

A developer carrying member of this Example was produced in the same manner as in Example 5 except that a resin layer was formed in which in place of Polymer (a), Polymer (g) was used. The constitution of the resin layer of the developer carrying member obtained was as shown in Table 8. Then, using the developer carrying member obtained, image reproduction tests were conducted in the same manner as in Example 1 and while feeding Toner A, to make evaluation. The results of evaluation were as shown in Tables 9 and 10.

Example 38

A developer carrying member of this Example was produced by the same operation as in Example 37 except that Polymer (g) was changed to Polymer (h) in forming the resin layer. The constitution of the resin layer of the developer carrying member obtained was as shown in Table 8. Then, using the developer carrying member obtained, image reproduction tests were conducted in the same manner as in Example 1 and while feeding Toner A, to make evaluation. The results of evaluation were as shown in Tables 9 and 10.

Example 39

A developer carrying member of this Example was produced by the same operation as in Example 37 except that Polymer (g) was changed to Polymer (i) in forming the resin layer. The constitution of the resin layer of the developer carrying member obtained was as shown in Table 8. Then, using the developer carrying member obtained, image reproduction tests were conducted in the same manner as in Example 1 and while feeding Toner A, to make evaluation. The results of evaluation were as shown in Tables 9 and 10.

Example 40

The same materials as those in Example 37 were used and subjected to dispersion by the same operation, and further 5 parts of conductive spherical carbon particles of 5 µm in number-average particle diameter were added, followed by dispersion for 1 hour in the presence of glass beads of 3 mm in diameter. The beads were separated by using a sieve to prepare a coating dispersion. Next, the resin layer was formed by the same operation as in Example 33 to produce a developer carrying member of this Example. The constitution of the resin layer of the developer carrying member obtained was as shown in Table 8.

Then, using the developer carrying member obtained, image reproduction tests were conducted in the same manner as in Example 1 and while feeding Toner A, to make evaluation. The results of evaluation were as shown in Tables 9 and 10. As the conductive spherical carbon particles used in this Example, those prepared entirely in the same manner as in Example 8 were used.

Example 41

A developer carrying member of this Example was produced in the same manner as in Example 40 except that, in place of the conductive spherical carbon particles of 5 µm in number-average particle diameter as used in Example 40, 7.5 parts of conductive spherical carbon particles of 2 µm in number-average particle diameter were added. The constitution of the resin layer of the developer carrying member obtained was as shown in Table 8.

Then, using the developer carrying member obtained, image reproduction tests were conducted in the same manner as in Example 1 and while feeding Toner A, to make evaluation. The results of evaluation were as shown in Tables 9 and 10. As the conductive spherical carbon particles of 2 µm in number-average particle diameter as used in this Example, those prepared entirely in the same manner as in Example 9 were used.

Example 42

A developer carrying member of this Example was produced in the same manner as in Example 40 except that, in place of the conductive spherical carbon particles of 5 µm in number-average particle diameter as used in Example 40, 2.5 parts of conductive spherical carbon particles of 20 µm in number-average particle diameter were added. The constitution of the resin layer of the developer carrying member obtained was as shown in Table 8.

Then, using the developer carrying member obtained, image reproduction tests were conducted in the same manner as in Example 1 and while feeding Toner A, to make evaluation. The results of evaluation were as shown in Tables 9 and 10. As the conductive spherical carbon particles of 20 µm in number-average particle diameter as used in this Example, those prepared entirely in the same manner as in Example 10 were used.

Example 43

A developer carrying member of this Example was produced in the same manner as in Example 40 except that, in place of the conductive spherical carbon particles of 5 µm in number-average particle diameter as used in Example 40, carbon black coated PMMA particles of 5 µm in number-average particle diameter were used in forming the resin layer. The constitution of the resin layer of the developer carrying member obtained was as shown in Table 8.

Then, using the developer carrying member obtained, image reproduction tests were conducted in the same manner as the case of Example 1 and while feeding Toner A, to make evaluation. The results of evaluation were as shown in Tables 9 and 10. As the carbon black coated PMMA particles of 5 µm in number-average particle diameter as used in this Example, those prepared entirely in the same manner as in Example 11 were used.

Example 44

A developer carrying member of this Example was produced by the same operation as that in Example 40 except that, in place of the conductive spherical carbon particles of 5 µm in number-average particle diameter as used in Example 40, carbon black dispersed resin particles of 5 µm in number-average particle diameter were used in forming the resin layer. The constitution of the resin layer of the developer carrying member obtained was as shown in Table 8.

Then, using the developer carrying member obtained, image reproduction tests were conducted in the same manner as in Example 1 and while feeding Toner A, to make evaluation. The results of evaluation were as shown in Tables 9 and 10. As the carbon black dispersed resin particles of 5 µm in number-average particle diameter as used in this Example, those prepared entirely in the same manner as in Example 12 were used.

Example 45

A developer carrying member of this Example was produced by the same operation as in Example 40 except that, in place of the conductive spherical carbon particles of 5 µm in number-average particle diameter as used in Example 40, PMMA particles of 5 µm in number-average particle diameter were used in forming the resin layer. The constitution of the resin layer of the developer carrying member obtained was as shown in Table 8.

Then, using the developer carrying member obtained, image reproduction tests were conducted in the same manner as in Example 1 and while feeding Toner A, to make evaluation. The results of evaluation were as shown in Tables 9 and 10.

Example 46

A developer carrying member of this Example was produced by the same operation as in Example 40 except that, in place of the PMMA resin used in Example 40, silicone resin was used in forming the resin layer. The constitution of the resin layer of the developer carrying member obtained was as shown in Table 8. Then, using the developer carrying member obtained, image reproduction tests were conducted in the same manner as the case of Example 1 and while feeding Toner A, to make evaluation. The results of evaluation were as shown in Tables 9 and 10.

Example 47

A developer carrying member of this Example was produced by the same operation as in Example 40 except that, in place of the PMMA resin used in Example 40, styrene-acrylic resin was used in forming the resin layer. The constitution of the resin layer of the developer carrying member obtained was as shown in Table 8. Then, using the developer carrying member obtained, image reproduction tests were conducted in the same manner as in Example 1 and while feeding Toner A, to make evaluation. The results of evaluation were as shown in Tables 9 and 10.

Example 48

A developer carrying member of this Example was produced by the same operation as that in Example 40 except that, in place of the PMMA resin used in Example 40, polyester resin was used in forming the resin layer. The constitution of the resin layer of the developer carrying member obtained was as shown in Table 8. Then, using the developer carrying member obtained, image reproduction tests were conducted in the same manner as the case of Example 1 and while feeding Toner A, to make evaluation. The results of evaluation were as shown in Tables 9 and 10.

TABLE 8

Constitution of Developing Sleeve Surface Resin Layer

| Example: | *1 P/B/CA/R ratio | Roughness Ra (μm) | Binder resin | | Spherical particles added (number-average particle diameter) |
|---|---|---|---|---|---|
| | | | | Other Polymer resin | |
| 33 | 1/0.0/2.5/0.0 | 0.54 | (g) | None | None |
| 34 | 1/0.0/2.5/0.0 | 0.56 | (h) | None | None |
| 35 | 1/0.0/2.5/0.0 | 0.56 | (i) | None | None |
| 36 | 1/0.0/2.5/0.5 | 0.60 | (g) | None | Conductive spherical carbon particles (5 μm) |
| 37 | 1/2.5/0.5/0.0 | 0.63 | (g) | PMMA | None |
| 38 | 1/2.5/0.5/0.0 | 0.60 | (h) | PMMA | None |
| 39 | 1/2.5/0.5/0.0 | 0.59 | (i) | PMMA | None |
| 40 | 1/2.5/0.5/0.5 | 0.72 | (g) | PMMA | Conductive spherical carbon particles (5 μm) |
| 41 | 1/2.5/0.5/0.75 | 0.63 | (g) | PMMA | Conductive spherical carbon particles (2 μm) |
| 42 | 1/2.5/0.5/0.25 | 1.00 | (g) | PMMA | Conductive spherical carbon particles (20 μm) |
| 43 | 1/2.5/0.5/0.5 | 0.73 | (g) | PMMA | CB coated spherical PMMA particles (5 μm) |
| 44 | 1/2.5/0.5/0.5 | 0.72 | (g) | PMMA | CB dispersed spherical resin particles (5 μm) |
| 45 | 1/2.5/0.5/0.5 | 0.66 | (g) | PMMA | Spherical PMMA particles (5 μm) |
| 46 | 1/2.5/0.5/0.5 | 0.75 | (g) | Silicone | Conductive spherical carbon particles(5 μm) |
| 47 | 1/2.5/0.5/0.5 | 0.69 | (g) | St-Ac *2 | Conductive spherical carbon particles(5 μm) |
| 48 | 1/2.5/0.5/0.5 | 0.74 | (g) | Polyester | Conductive spherical carbon particles(5 μm) |

*1 P: Conductive fine powder (CB: carbon black, GF: crystalline graphite, CB/GF = 1/9) B: other resin, CA: Polymer, R: spherical particles
*2 St-Ac: styrene-acrylic resin

TABLE 9

Results of Evaluation in N/L Environment

| | Initial stage (after 1,000 sheets) | | | | | After running (100,000 sheets) | | | | | Coat abrasion (μm) |
|---|---|---|---|---|---|---|---|---|---|---|---|
| | Image density | Reversal fog | Q/M (mC/kg) | Lines, non-uniformity | Blotch | Image density | Reversal fog | Q/M (mC/kg) | Lines, non-uniformity | Blotch | |
| Example: | | | | | | | | | | | |
| 33 | 1.35 | AA | 17.3 | A | A | 1.33 | AA | 16.8 | A | A | −3.0 |
| 34 | 1.33 | AA | 17.0 | A | A | 1.33 | AA | 16.7 | A | A | −3.5 |
| 35 | 1.35 | AA | 17.3 | A | A | 1.38 | AA | 17.0 | A | AA | −3.2 |
| 36 | 1.35 | AA | 17.0 | AA | AA | 1.34 | A | 16.3 | AA | AA | −2.0 |
| 37 | 1.36 | A | 14.9 | AA | AA | 1.36 | A | 14.7 | AA | AA | −2.3 |
| 38 | 1.32 | A | 14.4 | A | AA | 1.34 | A | 14.0 | A | AA | −2.4 |
| 39 | 1.34 | A | 14.9 | A | AA | 1.34 | A | 14.8 | A | AA | −2.1 |
| 40 | 1.39 | A | 15.5 | AA | AA | 1.38 | A | 15.2 | AA | AA | −1.5 |
| 41 | 1.31 | A | 15.5 | AA | A | 1.34 | A | 15.3 | A | AA | −2.2 |
| 42 | 1.30 | B | 14.2 | AA | A | 1.30 | A | 14.4 | AA | A | −1.7 |
| 43 | 1.32 | A | 14.1 | A | AA | 1.30 | AA | 14.0 | AA | AA | −2.5 |
| 44 | 1.31 | A | 14.2 | A | AA | 1.32 | AA | 14.4 | A | AA | −2.8 |
| 45 | 1.29 | A | 13.5 | AB | A | 1.28 | AA | 13.2 | AB | A | −3.1 |
| 46 | 1.34 | B | 14.8 | AA | AA | 1.38 | A | 14.5 | AA | AA | −2.0 |
| 47 | 1.33 | A | 14.9 | AA | AA | 1.34 | A | 14.5 | AA | AA | −2.4 |
| 48 | 1.27 | A | 13.1 | A | A | 1.25 | A | 13.3 | A | AA | −3.5 |
| Comparative Example: | | | | | | | | | | | |
| 1 | 1.24 | BC | 7.5 | B | BC | 1.19 | B | 6.6 | BC | C | — |
| 2 | 1.24 | BC | 7.7 | B | BA | 1.17 | B | 7.1 | B | B | −2.8 |
| 3 | 1.25 | C | 7.2 | B | BA | 1.18 | B | 6.5 | BC | C | −2.5 |
| 4 | 1.23 | BC | 7.5 | B | BC | 1.16 | B | 6.8 | B | B | −2.8 |
| 5 | 1.25 | C | 7.7 | B | BA | 1.15 | B | 7.0 | BC | B | −5.7 |
| 6 | 1.24 | BC | 7.8 | B | BA | 1.17 | B | 7.1 | BC | B | −6.4 |

TABLE 10

Results of Evaluation in H/H Environment

| | Initial stage (after 1,000 sheets) | | | | | After running (100,000 sheets) | | | | | Coat abrasion (μm) |
|---|---|---|---|---|---|---|---|---|---|---|---|
| | Image density | Reversal fog | Q/M (mC/kg) | Lines, non-uniformity | Blotch | Image density | Reversal fog | Q/M (mC/kg) | Lines, non-uniformity | Blotch | |
| Example: | | | | | | | | | | | |
| 33 | 1.29 | AA | 16.0 | A | A | 1.33 | AA | 15.4 | A | A | −3.2 |
| 34 | 1.31 | AA | 15.9 | A | A | 1.30 | AA | 15.5 | A | AA | −3.6 |
| 35 | 1.30 | A | 16.0 | A | A | 1.33 | AA | 15.9 | A | A | −3.4 |
| 36 | 1.31 | AA | 15.8 | AA | AA | 1.33 | AA | 15.6 | AA | AA | −2.4 |
| 37 | 1.29 | A | 14.1 | AA | A | 1.33 | AA | 13.7 | A | A | −2.7 |
| 38 | 1.28 | A | 13.8 | A | AA | 1.34 | AA | 13.2 | A | AA | −2.9 |
| 39 | 1.30 | A | 14.0 | A | A | 1.36 | A | 13.4 | A | A | −2.9 |
| 40 | 1.32 | AA | 14.5 | AA | AA | 1.34 | AA | 14.0 | AA | AA | −2.0 |
| 41 | 1.31 | AA | 14.4 | AA | AA | 1.33 | AA | 13.9 | AA | AA | −2.4 |
| 42 | 1.29 | A | 13.7 | A | A | 1.30 | A | 13.0 | AA | A | −2.5 |
| 43 | 1.31 | A | 12.9 | AB | AA | 1.30 | A | 12.5 | A | AA | −2.9 |
| 44 | 1.29 | AA | 12.5 | A | AA | 1.29 | AA | 12.3 | AB | AA | −3.1 |
| 45 | 1.25 | A | 12.6 | BA | A | 1.29 | A | 11.8 | BA | A | −3.8 |
| 46 | 1.33 | AA | 14.0 | A | AA | 1.31 | A | 13.5 | AA | AA | −2.2 |
| 47 | 1.27 | A | 13.2 | AA | AA | 1.29 | A | 12.9 | AA | AA | −2.7 |
| 48 | 1.23 | B | 10.4 | A | A | 1.21 | A | 10.2 | B | AB | −5.4 |
| Comparative Example: | | | | | | | | | | | |
| 1 | 1.06 | BC | 6.5 | B | AB | 1.02 | B | 6.1 | BC | B | — |
| 2 | 1.09 | B | 6.4 | AB | AB | 1.04 | A | 6.0 | BA | BA | −3.3 |
| 3 | 1.12 | B | 6.5 | BA | B | 1.08 | A | 6.2 | BA | AB | −3.0 |
| 4 | 1.09 | B | 6.5 | AB | AB | 1.05 | A | 6.1 | B | BA | −3.0 |
| 5 | 1.10 | B | 6.9 | AB | AB | 1.09 | A | 6.4 | B | BA | −6.1 |
| 6 | 1.12 | B | 7.0 | BA | AB | 1.05 | A | 6.5 | B | BA | −6.8 |

This application claims priority from Japanese Patent Application No. 2004-188892 filed Jun. 25, 2004, which is hereby incorporated by reference herein.

What is claimed is:

1. A developer carrying member used in a developing assembly by means of which a latent image formed on an electrostatic latent image bearing member is developed and rendered visible by using a developer having been transported by a developer carrying member; the developer carrying member having at least a substrate and a resin layer formed on the substrate;

said resin layer comprising a binder resin which contains at least a polymer having a unit represented by the following chemical formula (1):

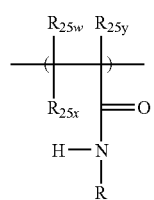

(1)

wherein R represents $-A_{25}-SO_2R_{25}$, and $R_{25w}$, $R_{25x}$ and $R_{25y}$ are each selected from combination recited in the following (i) or (ii), where, in the case of (i), $A_{25}$ and $R_{25}$ are each selected from combination recited in the following (i-A) or (i-B), and, in the case of (ii), $A_{25}$ and $R_{25}$ are each selected from combination recited in the following (ii-A):

(i) $R_{25w}$ and $R_{25x}$ are each independently a hydrogen atom, and $R_{25y}$ is a $CH_3$ group or a hydrogen atom;

(i-A) $A_{25}$ is a substituted or unsubstituted aliphatic hydrocarbon structure; and $R_{25}$ is a halogen atom or $OR_{25a}$, where $R_{25a}$ is a substituted or unsubstituted aliphatic hydrocarbon structure, a substituted or unsubstituted aromatic ring structure, or a substituted or unsubstituted heterocyclic ring structure;

(i-B) $A_{25}$ is a substituted or unsubstituted aromatic ring structure, or a substituted or unsubstituted heterocyclic ring structure; and $R_{25}$ is OH, a halogen atom, ONa, OK or $OR_{25a}$, where $R_{25a}$ is a substituted or unsubstituted aliphatic hydrocarbon structure, a substituted or unsubstituted aromatic ring structure, or a substituted or unsubstituted heterocyclic ring structure;

(ii) $R_{25w}$ and $R_{25x}$ are each independently a halogen atom or a hydrogen atom, and $R_{25y}$ is a $CH_3$ group, a halogen atom or a hydrogen atom, provided that at least one of $R_{25w}$, $R_{25x}$ and $R_{25y}$ is a halogen atom; and (ii-A) $A_{25}$ is a substituted or unsubstituted aliphatic hydrocarbon structure, a substituted or unsubstituted aromatic ring structure, or a substituted or unsubstituted heterocyclic ring structure; and $R_{25}$ is OH, a halogen atom, ONa, OK or $OR_{25a}$, where $R_{25a}$ is a substituted or unsubstituted aliphatic hydrocarbon structure, a substituted or unsubstituted aromatic ring structure, or a substituted or unsubstituted heterocyclic ring structure.

2. The developer carrying member according to claim 1, wherein the unit represented by the chemical formula (1) is a unit represented by the following chemical formula (2):

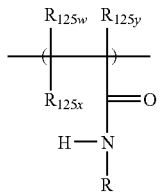

(2)

wherein R represents $-A_{125}-SO_2R_{125}$, and $R_{125w}$, $R_{125x}$ and $R_{125y}$ are each selected from combination recited in the following (i) or (ii), where, in the case of (i), $A_{125}$ and $R_{125}$ are each selected from combination recited in the following (i-A), and, in the case of (ii), $A_{125}$ and $R_{125}$ are each selected from combination recited in the following (ii-A):

(i) $R_{125w}$ and $R_{125x}$ are each independently a hydrogen atom, and $R_{125y}$ is a $CH_3$ group or a hydrogen atom;

(i-A) $A_{125}$ is a straight-chain or branched alkylene group having 1 to 8 carbon atoms; and $R_{125}$ is a halogen atom or $OR_{125a}$, where $R_{125a}$ is a straight-chain or branched alkyl group having 1 to 8 carbon atoms, or a substituted or unsubstituted phenyl group;

(ii) $R_{125w}$ and $R_{125x}$ are each independently a halogen atom or a hydrogen atom, and $R_{125y}$ is a $CH_3$ group, a halogen atom or a hydrogen atom, provided that at least one of $R_{125w}$, $R_{125x}$ and $R_{125y}$ is a halogen atom; and (ii-A) $A_{125}$ is a straight-chain or branched alkylene group having 1 to 8 carbon atoms; and $R_{125}$ is OH, a halogen atom, ONa, OK or $OR_{125a}$, where $R_{125a}$ is a straight-chain or branched alkyl group having 1 to 8 carbon atoms, or a substituted or unsubstituted phenyl group.

3. The developer carrying member according to claim 1, wherein the unit represented by the chemical formula (1) is a unit represented by the following chemical formula (3):

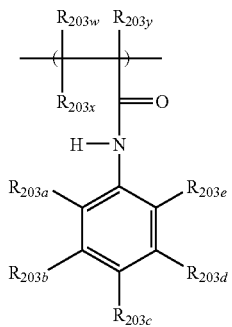

(3)

wherein $R_{203w}$ and $R_{203x}$ are each independently a halogen atom or a hydrogen atom; $R_{203y}$ is a $CH_3$ group, a halogen atom or a hydrogen atom; and at least one of $R_{203a}$, $R_{203b}$, $R_{203c}$, $R_{203d}$ and $R_{203e}$ is $SO_2R_{203f}$, where $R_{203f}$ is OH, a halogen atom, ONa, OK or $OR_{203h}$, where $R_{203h}$ is a straight-chain or branched alkyl group having 1 to 8 carbon atoms, or a substituted or unsubstituted phenyl group, and $R_{203a}$, $R_{203b}$, $R_{203c}$, $R_{203d}$ and $R_{203e}$ are each independently a hydrogen atom, a halogen atom, an alkyl group having 1 to 20 carbon atoms, an alkoxyl group having 1 to 20 carbon atoms, an OH group, an $NH_2$ group, an $NO_2$ group or $COOR_{203g}$ (where $R_{203g}$ represents a hydrogen atom, an Na atom or a K atom), an acetamide group, an OPh group, an NHPh group, a $CF_3$ group, a $C_2F_5$ group or a $C_3F_7$ group, where Ph is a phenyl group.

4. The developer carrying member according to claim 1, wherein the unit represented by the chemical formula (1) is a unit represented by the following chemical formula (4a) or (4b):

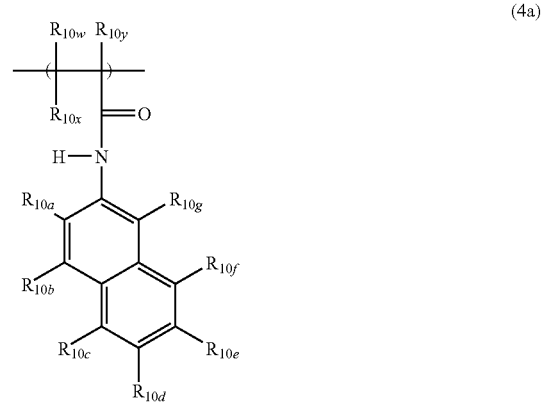

(4a)

wherein $R_{10w}$ and $R_{10x}$ are each independently a halogen atom or a hydrogen atom; $R_{10y}$ is a $CH_3$ group, a halogen atom or a hydrogen atom; and at least one of $R_{10a}$, $R_{10b}$, $R_{10c}$, $R_{10d}$, $R_{10e}$, $R_{10f}$ and $R_{10g}$ is $SO_2R_{10o}$, where $R_{10o}$ is OH, a halogen atom, ONa, OK or $OR_{10s}$, where $R_{10s}$ is a straight-chain or branched alkyl group having 1 to 8 carbon atoms, or a substituted or unsubstituted phenyl group, and $R_{10a}$, $R_{10b}$, $R_{10c}$, $R_{10d}$, $R_{10e}$, $R_{10f}$ and $R_{10g}$ are each independently a hydrogen atom, a halogen atom, an alkyl group having 1 to 20 carbon atoms, an alkoxyl group having 1 to 20 carbon atoms, an OH group, an $NH_2$ group, an $NO_2$ group or $COOR_{10p}$ (where $R_{10p}$ represents a hydrogen atom, an Na atom or a K atom), an acetamide group, an OPh group, an NHPh group, a $CF_3$ group, a $C_2F_5$ group or a $C_3F_7$ group, where Ph is a phenyl group; or

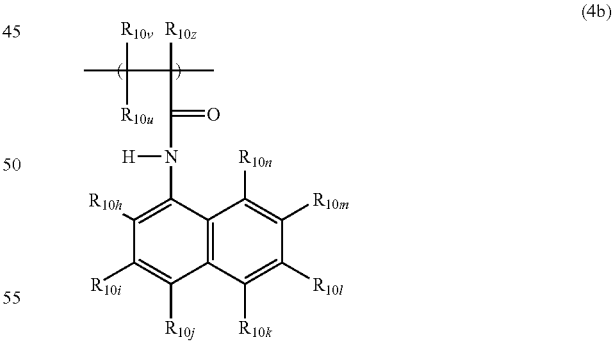

(4b)

wherein $R_{10v}$ and $R_{10u}$ are each independently a halogen atom or a hydrogen atom; $R_{10z}$ is a $CH_3$ group, a halogen atom or a hydrogen atom; and at least one of $R_{10h}$, $R_{10i}$, $R_{10j}$, $R_{10k}$, $R_{10l}$, $R_{10m}$ and $R_{10n}$ is $SO_2R_{10q}$, where $R_{10q}$ is OH, a halogen atom, ONa, OK or $OR_{10t}$, where $R_{10t}$ is a straight-chain or branched alkyl group having 1 to 8 carbon atoms, or a substituted or unsubstituted phenyl group, and $R_{10h}$, $R_{10i}$, $R_{10j}$, $R_{10k}$, $R_{10l}$, $R_{10m}$ and $R_{10n}$ are each independently a hydrogen atom, a halogen atom, an alkyl group having 1 to 20 carbon atoms, an alkoxyl group having 1 to 20 carbon atoms, an OH group, an $NH_2$ group, an $NO_2$ group or $COOR_{10r}$ (where $R_{10r}$ represents a hydrogen atom, an Na atom or a K atom), an acetamide group, an OPh group, an NHPh group, a $CF_3$ group, a $C_2F_5$ group or a $C_3F_7$ group, where Ph is a phenyl group.

5. The developer carrying member according to any one of claims 1 to 4, wherein said polymer contains, in addition to the unit represented by the chemical formula (1), at least one unit derived from a vinyl monomer, represented by the following chemical formula (5):

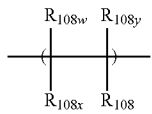
(5)

wherein $R_{108w}$ and $R_{108x}$ are each independently a halogen atom or a hydrogen atom; $R_{108y}$ is a $CH_3$ group, a halogen atom or a hydrogen atom; and $R_{108}$ is a hydrogen atom, a substituted or unsubstituted aliphatic hydrocarbon structure, a substituted or unsubstituted aromatic ring structure, a substituted or unsubstituted heterocyclic ring structure, a halogen atom, $—COR_{108a}$, $—OR_{108b}$, $—COOR_{108c}$, $—OCOR_{108d}$, $—CONR_{108e}R_{108f}$ or a ring structure containing an N atom, where $R_{108a}$, $R_{108b}$, $R_{108c}$, $R_{108d}$, $R_{108e}$ and $R_{108f}$ are each independently a hydrogen atom, a substituted or unsubstituted aliphatic hydrocarbon structure, a substituted or unsubstituted aromatic ring structure, or a substituted or unsubstituted heterocyclic ring structure.

6. The developer carrying member according to claim 1, wherein said polymer has a number-average molecular weight within a range of from 1,000 to 1,000,000.

7. A developing assembly in which a developer held in a developer container is held on a developer carrying member and a thin layer of the developer is formed on the developer carrying member by the aid of a developer layer thickness control member, during which the developer is transported to a developing zone which faces a latent image bearing member and in which a latent image formed on the latent image bearing member is developed into a visible image by using the developer, wherein;

said developer carrying member has at least a substrate and a resin layer formed on the substrate, and the resin layer comprises a binder resin which contains at least a polymer having a unit represented by the following following formula (1):

(1)

wherein R represents $-A_{25}-SO_2R_{25}$, and $R_{25w}$, $R_{25x}$ and $R_{25y}$ are each selected from combination recited in the following (i) or (ii), where, in the case of (i), $A_{25}$ and $R_{25}$ are each selected from combination recited in the following (i-A) or (i-B), and, in the case of (ii), $A_{25}$ and $R_{25}$ are each selected from combination recited in the following (ii-A):

(i) $R_{25w}$ and $R_{25x}$ are each independently a hydrogen atom, and $R_{25y}$ is a $CH_3$ group or a hydrogen atom;

(i-A) $A_{25}$ is a substituted or unsubstituted aliphatic hydrocarbon structure; and $R_{25}$ is a halogen atom or $OR_{25a}$, where $R_{25a}$ is a substituted or unsubstituted aliphatic hydrocarbon structure, a substituted or unsubstituted aromatic ring structure, or a substituted or unsubstituted heterocyclic ring structure;

(i-B) $A_{25}$ is a substituted or unsubstituted aromatic ring structure, or a substituted or unsubstituted heterocyclic ring structure; and $R_{25}$ is OH, a halogen atom, ONa, OK or $OR_{25a}$, where $R_{25a}$ is a substituted or unsubstituted aliphatic hydrocarbon structure, a substituted or unsubstituted aromatic ring structure, or a substituted or unsubstituted heterocyclic ring structure;

(ii) $R_{25w}$ and $R_{25x}$ are each independently a halogen atom or a hydrogen atom, and $R_{25y}$ is a $CH_3$ group, a halogen atom or a hydrogen atom, provided that at least one of $R_{25w}$, $R_{25x}$ and $R_{25y}$ is a halogen atom; and (ii-A) $A_{25}$ is a substituted or unsubstituted aliphatic hydrocarbon structure, a substituted or unsubstituted aromatic ring structure, or a substituted or unsubstituted heterocyclic ring structure; and $R_{25}$ is OH, a halogen atom, ONa, OK or $OR_{25a}$, where $R_{25a}$ is a substituted or unsubstituted aliphatic hydrocarbon structure, a substituted or unsubstituted aromatic ring structure, or a substituted or unsubstituted heterocyclic ring structure.

* * * * *